US012731703B2

(12) United States Patent
Lee et al.

(10) Patent No.: US 12,731,703 B2
(45) Date of Patent: Sep. 8, 2026

(54) SYSTEMS, DEVICES, AND METHODS FOR VARIABLE COLLIMATION OF A NEUTRON BEAM

(71) Applicant: TAE Life Sciences, LLC, Irvine, CA (US)

(72) Inventors: Charles Leon Lee, Irvine, CA (US); Jedediah Styron, Wildomar, CA (US); Matthew Alan Core, Reno, NV (US); Mark Joseph Rouillard, Mission Viejo, CA (US); Vijay P Patel, Eastvale, CA (US)

(73) Assignee: TAE Life Sciences, LLC, Irvine, CA (US)

( * ) Notice: Subject to any disclaimer, the term of this patent is extended or adjusted under 35 U.S.C. 154(b) by 406 days.

(21) Appl. No.: 18/479,714

(22) Filed: Oct. 2, 2023

(65) Prior Publication Data

US 2024/0120126 A1 Apr. 11, 2024

Related U.S. Application Data

(60) Provisional application No. 63/412,821, filed on Oct. 3, 2022.

(51) Int. Cl.
*G21K 1/02* (2006.01)

(52) U.S. Cl.
CPC .................................... *G21K 1/025* (2013.01)

(58) Field of Classification Search
CPC ........ G21K 1/025; G21K 1/04; A61N 5/1077; A61N 2005/109; A61N 2005/1095

(Continued)

(56) References Cited

U.S. PATENT DOCUMENTS 3,781,564 A 12/1973 Lundberg
4,450,578 A * 5/1984 Hill .......................... G21F 5/04
378/150

(Continued)

FOREIGN PATENT DOCUMENTS

| | | |
|---|---|---|
| AU | 2020258593 | 11/2021 |
| EP | 0682268 | 11/1995 |
| WO | WO 2023/076407 | 5/2023 |

OTHER PUBLICATIONS

International Search Report and Written Opinion in International Appln. No. PCT/US2022/047912, mailed on May 30, 2023, 12 pages.

(Continued)

*Primary Examiner* — Kiet T Nguyen
(74) *Attorney, Agent, or Firm* — ALSTON & BIRD LLP

(57) ABSTRACT

Systems, devices, and methods for collimating a neutron beam to specified deliverable formats having targeted beam diameters and direction are described. Examples of a neutron collimator assembly can include numerous components based on location, function, dimension, and/or constituent material. The components can include, neutron beam collimators, a beam stop, a mounting assembly, electro-mechanical actuators, an electronic controller, a safety interlock system, a moveable radiation shield, a safety cover, and an adjustable patient platform. In addition, examples of variable aperture neutron beam collimators such as nested neutron beam collimators and collimators with a diaphragm iris are described. Materials are also described.

83 Claims, 40 Drawing Sheets

(58) Field of Classification Search
USPC .......................................................... 250/505.1
See application file for complete search history.

(56) References Cited

U.S. PATENT DOCUMENTS

| | | | | |
|---|---|---|---|---|
| 10,629,318 | B1 | 4/2020 | Corning | |
| 2003/0080192 | A1 | 5/2003 | Tsikos et al. | |
| 2010/0061500 | A1 | 3/2010 | Lou et al. | |
| 2014/0239204 | A1 | 8/2014 | Orton et al. | |
| 2018/0318607 | A1 | 11/2018 | Wilbur et al. | |
| 2020/0282238 | A1 | 9/2020 | Liu et al. | |
| 2021/0060360 | A1 | 3/2021 | Liu | |
| 2022/0093285 | A1* | 3/2022 | Burns | A61N 5/1077 |
| 2023/0125432 | A1 | 4/2023 | Lee et al. | |

OTHER PUBLICATIONS

International Search Report and Written Opinion in International Appln. No. PCT/US2023/075726, mailed on Apr. 24, 2024, 10 pages.

Torres-Sánchez et al., "Optimized beam shaping assembly for a 2.1-MeV proton-accelerator-based neutron source for boron neutron capture therapy," Scientific Reports, Apr. 7, 2021, 11:7576.

* cited by examiner

Beam System 100

SECTION A-A

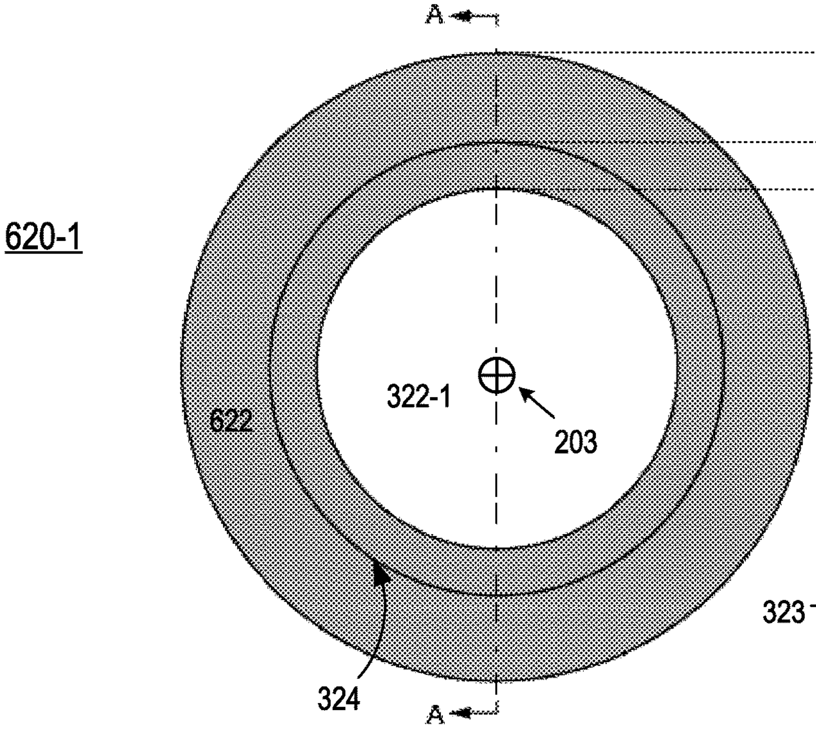
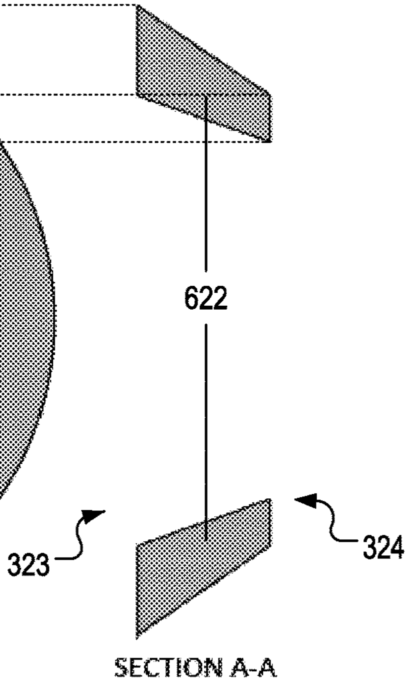
FIG. 10A
FIG. 10B
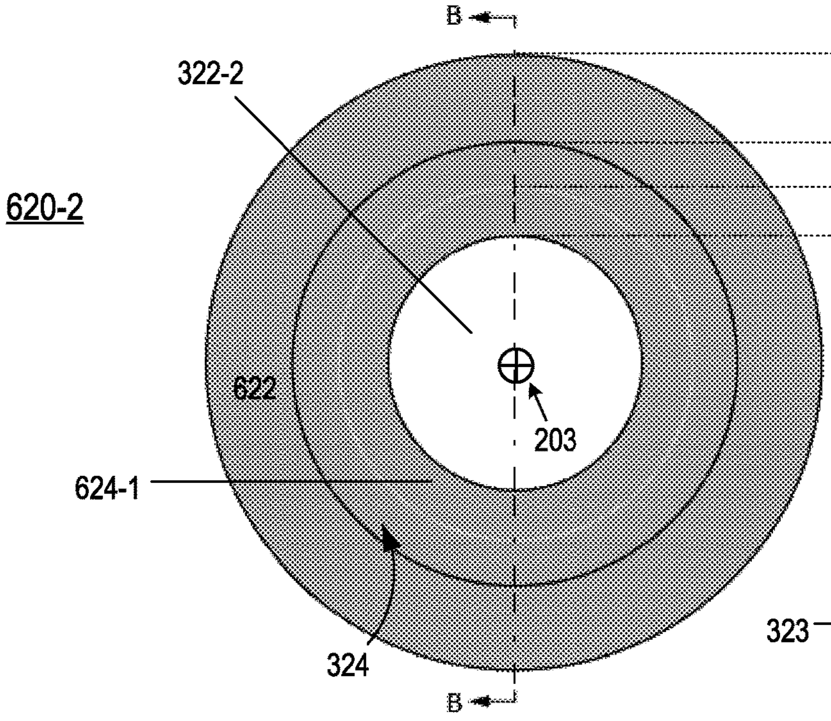
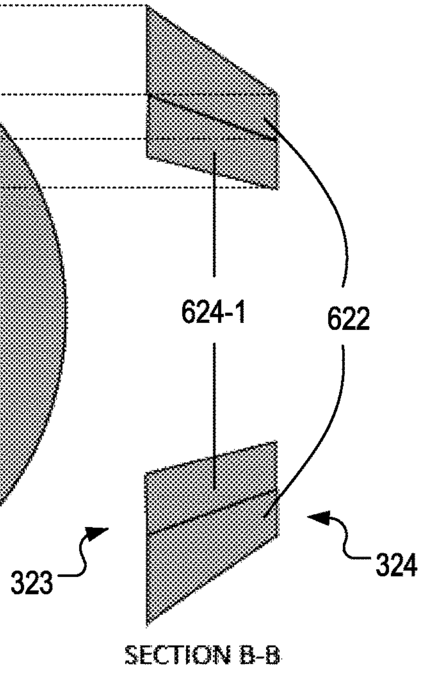
FIG. 10C
FIG. 10D 620-3
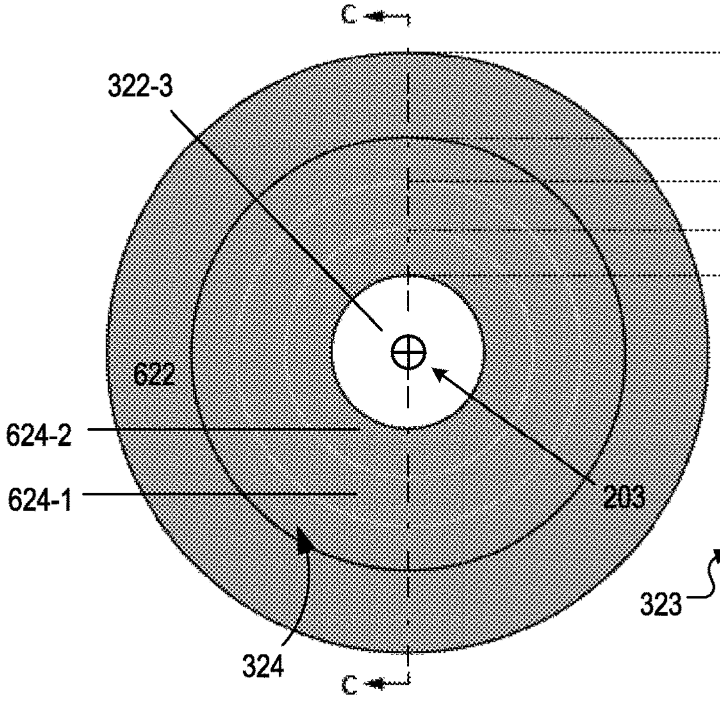
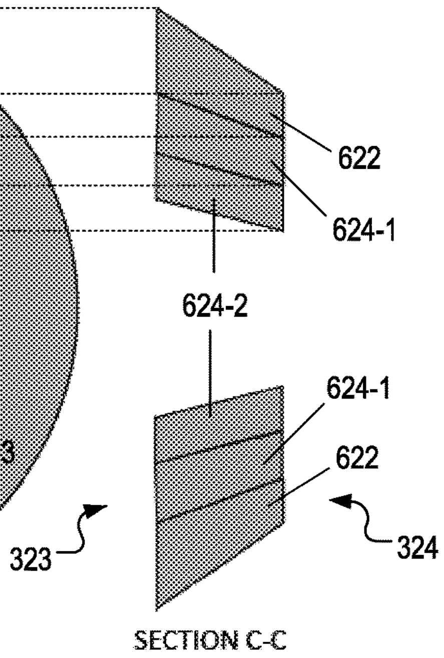
FIG. 10E
FIG. 10F
620-4
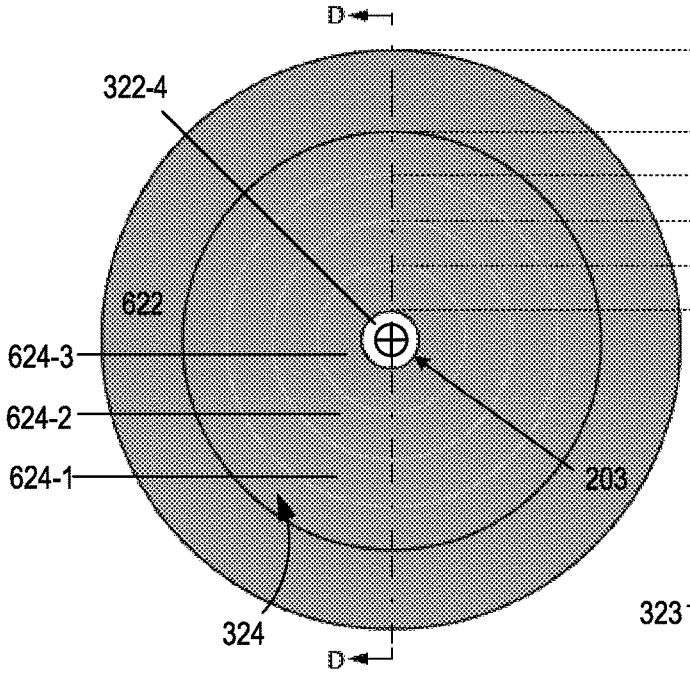
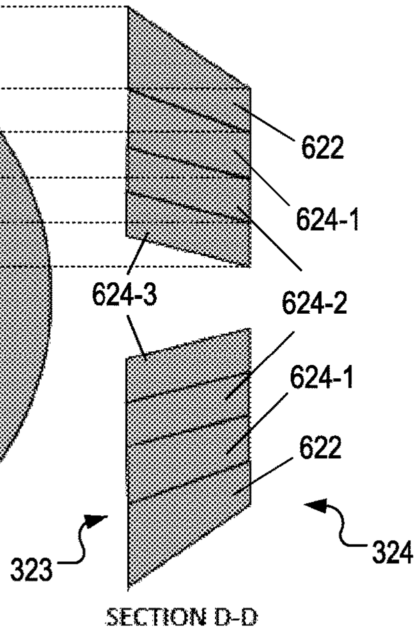
FIG. 10G
FIG. 10H

SYSTEMS, DEVICES, AND METHODS FOR VARIABLE COLLIMATION OF A NEUTRON BEAM

CROSS-REFERENCE TO RELATED APPLICATIONS

This application claims the benefit under 35 U.S.C. § 119(e) of the filing date of U.S. Provisional Patent Application No. 63/412,821, filed on Oct. 3, 2022, entitled "Systems, Devices, and Methods for Variable Collimation of a Neutron Beam," the entirety of which is herein incorporated by reference.

FIELD

The subject matter described herein relates generally to systems, devices, and methods for collimating neutron beams into various deliverable forms.

BACKGROUND

Boron neutron capture therapy (BNCT) is a modality of treatment for a variety of types of cancer, including some of the most difficult types. BNCT is a technique that selectively aims to treat tumor cells while sparing healthy cells using a boron compound. The boron compound allows for efficient uptake by several cell types and selective drug accumulation at target sites, such as tumor cells. Boron-loaded cells can be irradiated with neutrons (e.g., in the form of a neutron beam). The neutrons react with the boron to eradicate the tumor cells.

Neutron beams for BNCT can be generated through various techniques. One such technique involves irradiation of a suitable neutron-generating target with a charged particle beam, such as a proton or deuteron beam. The charged particles react with nuclei in the target to emit a beam of raw neutrons that can be used for BNCT. The beam of raw neutrons can be modified or converted to a deliverable form by scattering neutrons into a direction toward a patient and limiting the neutrons to a suitable energy range, e.g., an epithermal energy range. Undesirable gamma rays can also be removed from the raw neutron beam to mitigate patient exposure to ionizing radiation.

However, a neutron beam in deliverable form often involves additional shaping and collimation for optimal administration to a patient. To ensure neutrons are directed predominately to target sites, the beam can be attenuated and filtered of diverging neutrons using a neutron beam collimator. Variable beam sizes may also be necessary for high-quality BNCT treatment, but this poses challenges due to complications associated with interchanging collimators. Existing techniques have either conceded to a single neutron beam collimator or have relied on manual exchange of collimators, e.g., removing and replacing collimators in a treatment room by hand. A manual exchange system significantly increases treatment times and can be hazardous to both the patient and clinicians administrating the treatment due to elevated radiation exposure. Accordingly, a need exists for improved systems, devices, and methods for collimating a neutron beam to various deliverable forms automatically.

SUMMARY

The subject matter described herein relates generally to systems, devices, and methods for automatically collimating a neutron beam to multiple specified deliverable formats. The deliverable formats have a targeted energy range, beam size, intensity, and direction. Examples of a neutron collimator assembly (NCA) are described in the context of a BNCT system. The NCA can include numerous components based on location, function, dimension, and/or constituent material.

The NCA can include a mounting assembly supporting multiple neutron beam collimators with different aperture sizes. Neutron beam collimators can be configured to receive a neutron beam along a beam axis and attenuate the neutron beam to targeted beam sizes accordingly to their respective aperture size. The collimators may also include a beam stop configured to absorb gamma rays. Due to neutron activation of various components in a neutron beam system (e.g., a target and other devices downstream from the target), residual gamma radiation can be concentrated along the beam axis when the neutron beam is inactive. The beam stop can provide gamma ray shielding along the beam axis to ensure safe gamma ray dose rates within a treatment room. The NCA can be equipped with one or more electromechanical actuators that are mechanically coupled to the mounting assembly in order to position and orientate the collimators and beam stop relative to the beam axis. The one or more actuators can be in communication with an electronic controller that is programmed to perform an appropriate control loop. The controller can generate control signals that cause the one or more actuators to exchange each collimator or beam stop aligned with the beam axis to vary the size of the neutron beam (e.g., a beam diameter) or move the beam stop in to place when the neutron beam is inactive. The NCA can also include a movable radiation shield (MRS) that can shield the treatment room from excess gamma radiation when the neutron beam is inactive. The MRS can function in unison with the beam stop to provide adequate gamma ray shielding between BNCT treatments. The MRS can also include one or more beam ports configured to transmit neutrons. During treatment, the MRS can align a beam port with the beam axis to facilitate delivery of the neutron beam into the treatment room toward a patient. An adjustable patient platform can position the patient relative to the beam axis when receiving the neutron beam. For example, the patient platform can be secured to a guide rail or a mechanical arm that adjusts the position, elevation, and orientation of the patient relative to the beam axis. In some implementations, a neutron beam collimator can be secured to the patient platform itself to provide variable neutron beam collimation in conjunction with, or alternatively to, the NCA. The NCA can also include a safety cover that is optically opaque but transparent to neutrons in order to conceal the neutron beam collimators from view of the patient. The safety cover can prevent the patient from interacting with the collimators and allow gamma ray shielding (e.g., the beam stop and/or MRS) to safely move into place in the event of an emergency stop (ESTOP) of BNCT. The NCA may also utilize a safety interlock system that includes one or more collision sensors to prevent components of the NCA from colliding with one another and/or the patient. The interlock system can also ensure the aperture size of each collimator placed on the beam axis agrees with the collimator selected by the electronic controller programming, e.g., treatment delivery software installed on the controller that is configured for the particular patient receiving BNCT.

Numerous examples of NCA systems, configurations, and arrangements are disclosed that perform some or all of these functions. Numerous exemplary materials are disclosed with capabilities to perform one or more of these functions. Examples of variable aperture neutron beam collimators, e.g., nested neutron beam collimators and collimators with a diaphragm iris, are also disclosed that are capable of performing some or all of the functions of multiple neutron beam collimators and the beam stop.

Other systems, devices, methods, features, and advantages of the subject matter described herein will be or will become apparent to one with skill in the art upon examination of the following figures and detailed description. It is intended that all such additional systems, methods, features, and advantages be included within this description, be within the scope of the subject matter described herein and be protected by the accompanying claims. In no way should the features of the examples be construed as limiting the appended claims, absent express recitation of those features in the claims.

BRIEF DESCRIPTION OF DRAWINGS

The details of the subject matter set forth herein, both as to its structure and operation, may be apparent by the study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes, and other detailed attributes may be illustrated schematically rather than literally or precisely.

FIGS. 10A-10H are front and cross-sectional views depicting an example of a nested neutron beam collimator with a variable size aperture.

DETAILED DESCRIPTION

Figure 1A:
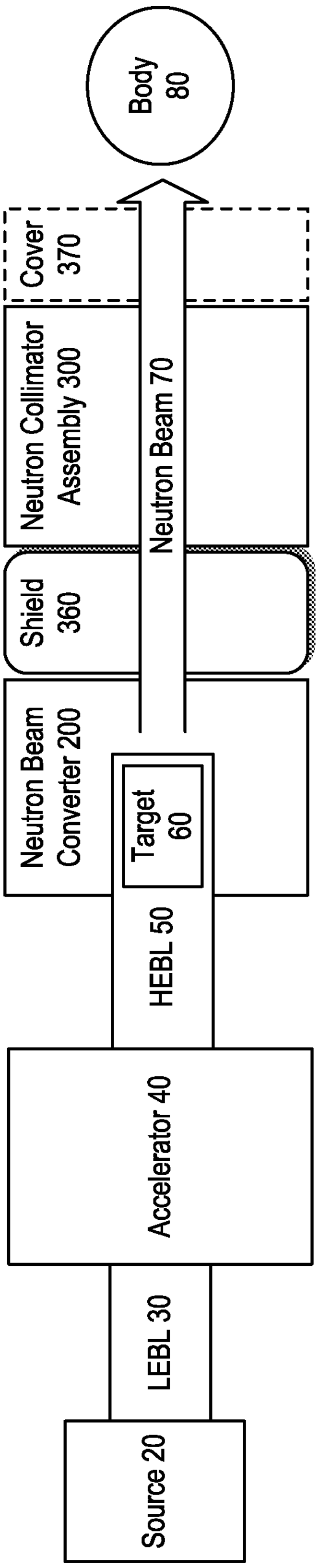
FIG. 1A is a schematic view depicting an example of a neutron beam system in accordance with the present disclosure.

This disclosure is not limited to the particular examples described and as such may, of course, vary. The terminology used herein is for the purpose of describing particular examples only and is not intended to be limiting since the scope of the present disclosure will be limited only by the appended claims.

The term "particle" is used broadly herein and, unless otherwise limited, can be used to describe an electron, a proton (or H+ ion), or a neutron, as well as a species having more than one electron, proton, and/or neutron (e.g., other ions, atoms, and molecules).

Example systems, devices, and methods are described herein for automatic neutron beam collimation, which can be used in combination with a neutron beam system (e.g., including a reactor or a particle accelerator). The examples described herein can be used with any type of neutron beam system in which variable neutron beam collimation is desired. Examples herein can be used in numerous applications, an example of which is a neutron beam system for the generation of a neutron beam for use in boron neutron capture therapy (BNCT). BNCT uses a beam of epithermal neutrons (e.g., with an energy spectrum between 1 electronvolt (eV) and 30 kiloelectronvolts (keV)) for cancer treatment. In BNCT, the neutrons can be generated from nuclear reactions of charged particles (e.g., a proton beam) colliding with either a beryllium or a lithium target device. The generated neutron beam has a broad range of energies and is emitted in a broad range of directions. Thus, the target can be contained within a larger neutron beam converter (NBC) that functions to convert the generated neutron beam into a primarily forward-directed beam within the desired epithermal energy range. The forward-directed beam can be attenuated and filtered of diverging neutrons using a neutron collimator assembly (NCA), which is then output to a patient. The NCA can automatically adjust the size of the neutron beam to different deliverable forms for optimal administration to the patient.

The examples of NCAs described herein are not intended to be viewed in isolation from each other. All features, elements, components, and functions described with respect to any NCA example provided herein are intended to be freely combinable and substitutable with those from any other NCA example. If a certain feature, element, component, and function is described with respect to only one NCA example, then that that feature, element, component, and function can be used with every other NCA example described herein unless explicitly stated otherwise. This paragraph, therefore, serves as antecedent basis and written support for the introduction of claims, at any time, that combine features, elements, components, and functions from different NCA examples, or that substitute features, elements, components, and functions from one NCA example with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Examples of Neutron Beam Systems

For ease of description, the examples described herein will be done so in the context of generating, converting, and collimating a neutron beam to various deliverable formats for use in BNCT, although the examples are not limited to such. The examples can be applied to other applications that generate significant neutron radiation, even those outside of BNCT applications utilizing different energy ranges.

FIG. 1A illustrates a schematic view of an example beam system 100 configured as a neutron beam system for use in BNCT, in accordance with the present disclosure. At a high level, beam system 100 is configured to create a charged particle beam and propagate it to a target 60 to generate a neutron beam 70 that is directed toward a patient body 80 to be irradiated, e.g., a head of the patient 80. Beam system 100 includes a charged particle source 20, a low-energy beamline (LEBL) 30, an accelerator 40, and a high-energy beamline (HEBL) 50. Source 20 is configured to generate the charged particle beam, which is output to LEBL 30. LEBL 30 is configured to transport the charged beam from source 20 to accelerator 40. Accelerator 40 is configured to accelerate the charged particle beam to a higher energy. HEBL 50 extends from the accelerator 40 to target 60 housed within a target assembly portion of HEBL 50, see FIGS. 2A-2C for example. HEBL 50 transfers the charged particle beam from an output of accelerator 40 to target 60, where it is converted to neutron beam 70.

Neutron beam converter (NBC) 200 is positioned close to and around target 60 to perform various functions on the neutrons of beam 70 emanating from target 60. These functions include reducing the energy of generated neutrons from energies above the desired range to within the desired range, focusing the generated neutrons in a forward-facing direction towards the patient, removing generated neutrons that are outside the desired range, and removing other radiation byproducts (e.g., photons) at energy levels that are undesirable. The desired neutron energy range can vary based on the application. For the BNCT applications described herein, the desired energy range can be, for example, 1 eV to 10 keV, or 1 eV to 30 keV, with the neutron distribution peaking near the upper end of the desired range. For example, a 1 eV to 30 keV neutron beam can be configured to output at least 90% of the neutrons in that energy range with a peak neutron distribution and an average energy between 10 keV and 30 keV. By way of another example, a 1 eV to 10 keV neutron beam can be configured to output at least 90% of the neutrons in that energy range with a peak neutron distribution and an average energy between 3 keV and 10 keV. For convenience, these ranges will be described as epithermal energy ranges. Neutrons at energies beneath these ranges will be referred to as thermal neutrons (e.g., beneath 1 eV), and neutrons at energies above these ranges will be referred to as fast neutrons (e.g., above 30 keV).

Moveable radiation shield (MRS) 360 is positioned in close proximity to NBC 200 to provide shielding from residual gamma radiation when the neutron beam 70 is inactive. Even when neutron production ceases, the target 60 and components of the neutron beam system 100 can still be radioactive due to neutron activation. Without shielding from gamma rays produced by these radioactive components, the gamma ray dose rate in a BNCT treatment room can be unsafe. The MRS 360 can translate in front of the NBC 200, thus reducing the gamma ray dose rate in the treatment room to safe levels. Moreover, the MRS 360 can include a beam port to permit the transmission of neutrons when neutron beam 70 is active, enabling delivery of the neutron beam 70 to the patient 80. An appropriately designed MRS 360 can also shield against stray neutrons and/or other radiation byproducts not intended for the patient 80.

Neutron collimator assembly (NCA) 300 is situated close to the MRS 360 to perform various functions on the neutron beam 70 exiting the beam port of the MRS 360. These functions generally include attenuating the neutron beam 70 into a collimated beam with targeted beam sizes. The collimated neutron beam 70 has neutrons traveling in a substantially forward-facing direction as diverging neutrons are absorbed and/or redirected into the forward direction. In this case, the NCA 300 provides an automated system for changing the beam size of the neutron beam 70 using different neutron beam collimators. Numerous examples of NCA 300 that can mechanically exchange neutron beam collimators, including a beam stop, using automated control systems are discussed in the following sections. Variable aperture neutron beam collimators, e.g., nested neutron beam collimators and collimators with a diagram iris, which can fill the role of multiple collimators and the beam stop are discussed thereafter.

Neutron beam system 100 can also include a safety cover 370 proximate to the NCA 300. Safety cover 370 generally includes materials that are optically opaque, transparent to neutrons, and have a relatively low affinity to neutron capture. The safety cover 370 can conceal the NCA 300 from the patient 80 but does not significantly affect the properties of the neutron beam 70, nor does it become radioactive. Hence, cover 370 can prevent the patent 80 from interacting with the NCA 300 and MRS 360 while not impacting the clinical requirements of the neutron beam 70. In the event of an emergency stop (ESTOP) of BNCT, safety cover 370 can allow gamma ray shielding (e.g., the beam stop and/or MRS 360) to safely move into place without risking injury to the patient 80.

Figure 1B:
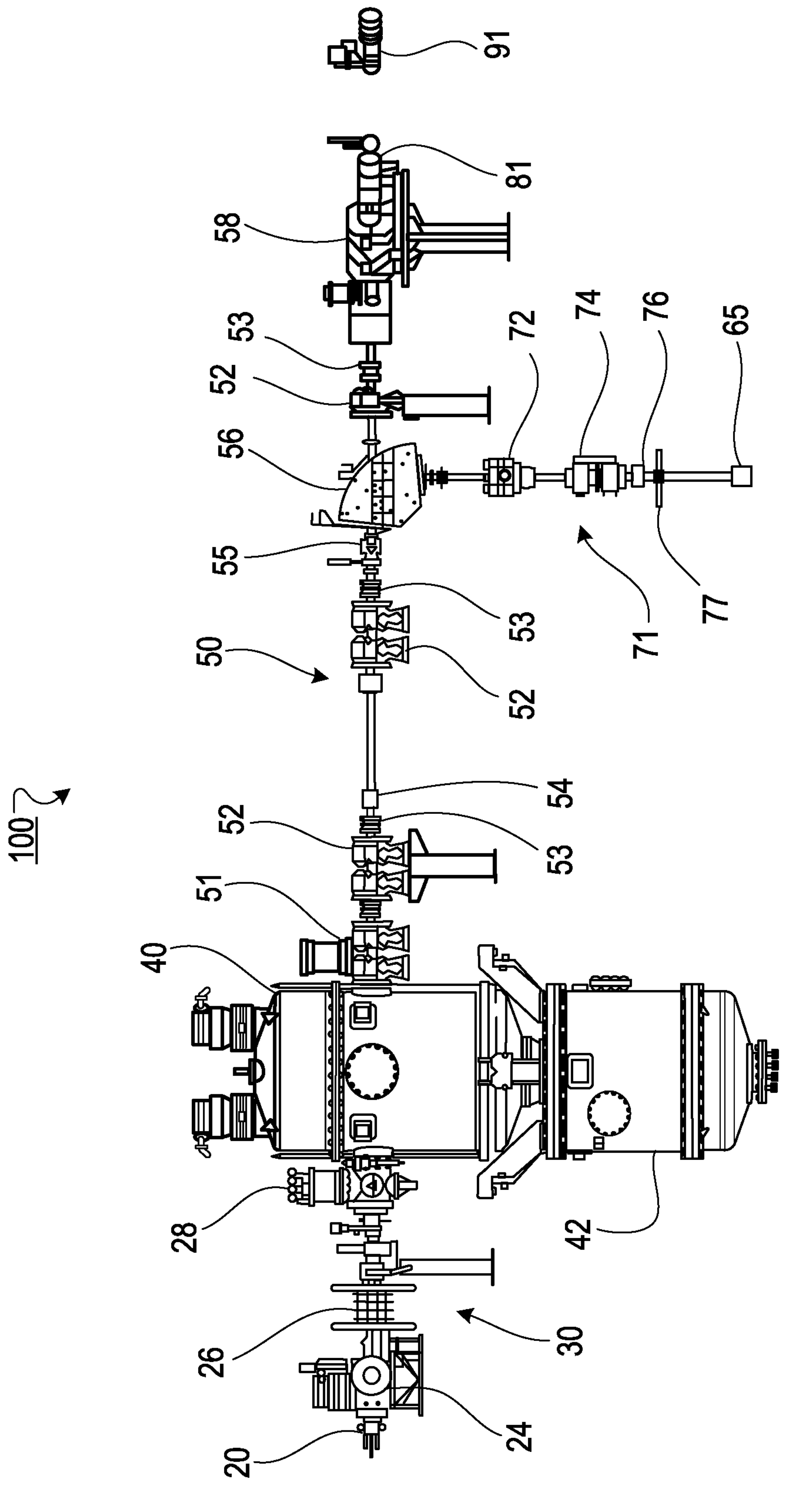
FIG. 1B is a schematic view depicting an example of a neutron beam system for use in boron neutron capture therapy (BNCT).

FIG. 1B is a schematic view illustrating an example beam system 100 configured as a neutron beam system for use in BNCT, omitting other components such as NBC 200, MRS 360, NCA 300, and cover 370 for clarity. Beam system 100 includes a pre-accelerator system 26 forming at least a portion of LEBL 30, where pre-accelerator system 26 serves as a charged particle beam injector. Beam system 100 includes a high-voltage (HV) tandem accelerator 40 coupled to LEBL 30 and HEBL 50, where HEBL 50 extends from tandem accelerator 40 to a target 60 housed in a target assembly 65, as described with reference to FIG. 1A.

LEBL 30 transfers a negative ion beam (e.g., hydrogen ions (H−)) from ion source 20, through pre-accelerator 26 which boosts the energy level of the ion beam and converges the ion beam to an input (e.g., an input aperture) of the accelerator 40. Accelerator 40 is powered by a high-voltage (HV) power supply 42 coupled thereto. Accelerator 40 includes a vacuum tank, a charge-exchange tube, accelerating electrodes, and a high-voltage (HV) feedthrough. Accelerator 40 can, in some implementations, accelerate a hydrogen ion beam to produce a proton beam with an energy generally equal to twice the voltage applied to the accelerating electrodes positioned within accelerator 40. The energy level of the proton beam can be achieved by accelerating the beam of negative hydrogen ions from the input of accelerator 40 to the innermost high-potential electrode, stripping two electrons from each ion, and then accelerating the resulting protons downstream by the same voltages encountered in reverse order.

Figure 3A:
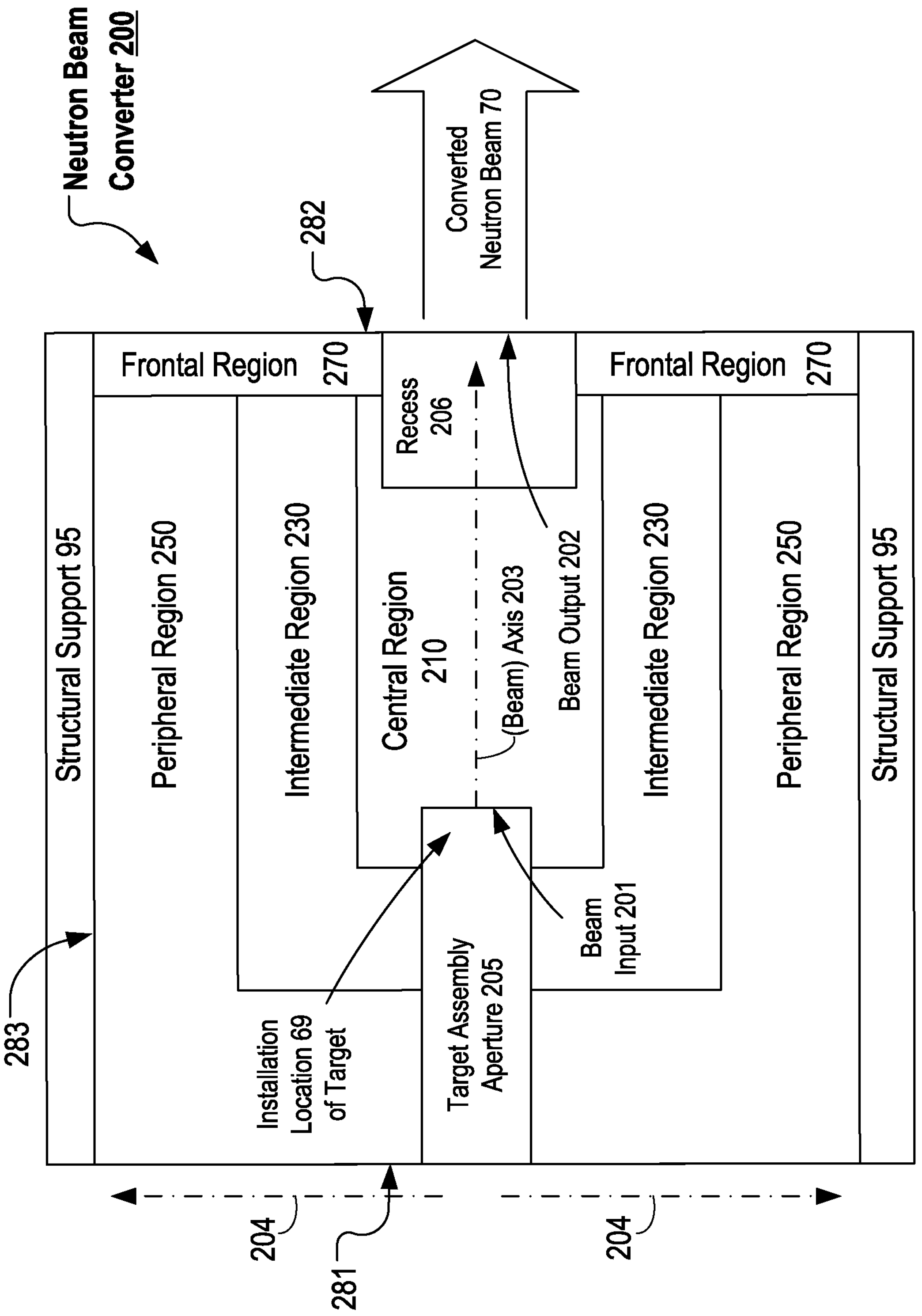
FIG. 3A is a cross-sectional view depicting an example of a neutron beam converter.
Figure 3B:
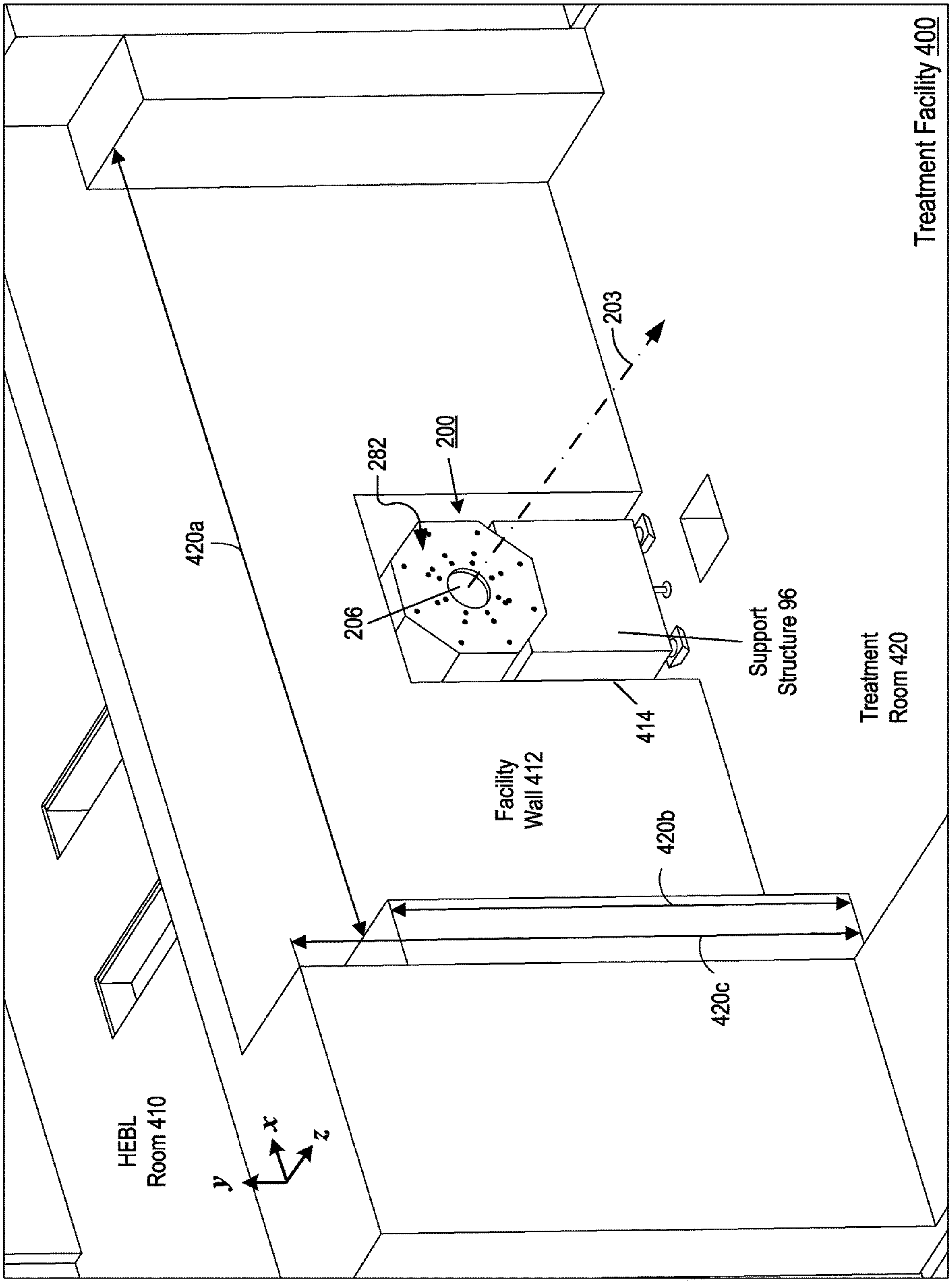
FIG. 3B is an isometric render depicting an example of a neutron beam converter in a BNCT treatment facility.

HEBL 50 can transfer the proton beam from the output of accelerator 40 to the neutron-generating target 60 positioned at the end of a branch 71 of the beamline extending into a patient treatment room, see FIG. 3B for example. Beam system 100 can be configured to direct the proton beam to one or more targets 60 and associated target areas. In some implementations, HEBL 50 includes multiple (e.g., three) branches 71, 81, and 91 configured to extend to multiple different patient treatment rooms, with each branch terminating at a respective target 60, NBC 200, and NCA 300. HEBL 50 includes a pumping chamber 51, quadrupole magnets 52 and 72 to prevent de-focusing of the proton beam, dipole or bending magnets 56 and 58 to steer the proton beam towards one or more targets, beam correctors 53, diagnostics such as current monitors 54 and 76, a fast beam position monitor 55 section, and a scanning magnet 74 for branch 71. Branches 81 and 91 can contain components similar to branch 71.

The design of HEBL 50 depends on the configuration of the treatment facility (e.g., a single-story treatment facility, a two-story treatment facility, and the like). The proton beam can be delivered to target 60 (e.g., positioned near a treatment room having a patient 80) with the use of the bending magnet 56. Quadrupole magnets 72 can be included to then focus the proton beam to a certain size at target 60. The proton beam can pass one or more scanning magnets 74, which provide lateral movement of the proton beam onto the target 60's surface in a desired pattern (e.g., spiral, curved, stepped-in rows and columns, combinations thereof, and others). The beam lateral movement can enable the generation of smooth and even time-averaged distribution of the proton beam on the target 60, preventing overheating of the target 60 and making the particle (e.g., neutron) generation as uniform as possible within the target 60 (e.g., neutron-generating layer 121 of FIG. 2A).

Scanning magnets 74 can be configured to direct the proton beam to a current monitor 76, which measures beam current. The beam current value can be used to operate a safety interlock. The target assembly 65 containing target 60 can be physically separated from the high-energy beamline volume with a valve 77. A function of valve 77 is to separate the vacuum volume of the beamline from the target 60 during the removal of a used target and loading of a new target. In some implementations, instead of being bent by 90° by a bending magnet 56, the proton beam can be directed straight to one or more quadrupole magnets 52 located in the horizontal beamline. The proton beam can be bent by another bending magnet 58 to a preset angle, depending on a setting requirement (e.g., location of a patient or a treatment room configuration). In some implementations, bending magnet 58 can be arranged at a split in the beamline and can be configured to direct the proton beam in one of two directions for two different treatment rooms located on the same floor of a medical facility.

Beam system(s) 100 as described with respect to FIGS. 1A-1B are examples of different configurations that can be used to generate charged particle and neutron beams. Different configurations of beam system 100 can utilize accelerators other than electrostatic tandem accelerators and can utilize targets that are either fixed or rotating. The examples of NBC 200, MRS 360, NCA 300, and/or safety cover 370 described herein are not limited to use with any one type of neutron beam generating system.

Figure 2A:
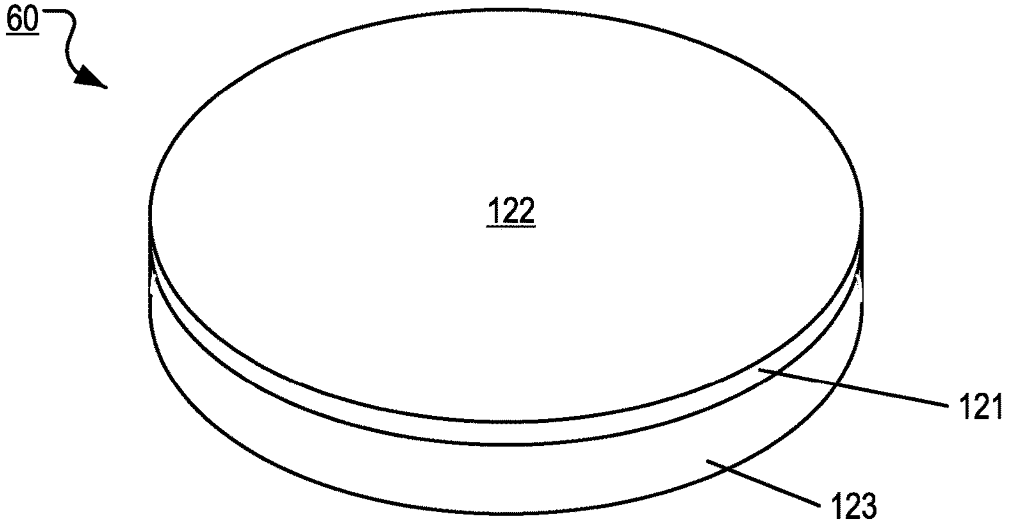
FIG. 2A is a perspective view depicting an example of a neutron-generating target.

FIG. 2A is a perspective view of an example neutron-generating target 60. In this example, target 60 has a neutron-generating layer 121 with a charged particle receiving face surface 122. Neutron-generating layer 121 is positioned on or in proximity to a substrate 123. Layer 121 and substrate 123 are depicted in FIG. 2A with similar sized diameters but the diameter of layer 121 can be smaller than the diameter of substrate 123. In some cases, layer 121 is covered with one or more other layers for protection. Layer 121 can also have one or more underlying layers between layer 121 and substrate 123, e.g., to resist blister formation. A charged particle beam, such as a proton beam, incident upon face 122, passes into target 60, and causes layer 121 to undergo a reaction that generates neutrons. This is the Li-7 (p,n) Be-7 nuclear reaction in the case where neutron-generating layer 121 is composed of lithium-7. Neutron-generating layer 121 can alternatively be beryllium-9, and neutrons can be generated with a proton beam (Be-9 (p,n) B-9) or deuteron beam (Be-9 (d,n) B-10) at different energies. Substrate 123 can be a material with excellent thermal conductivity, such as copper or aluminum, to assist in the removal of the heat generated by the reactions.

Figure 2B:
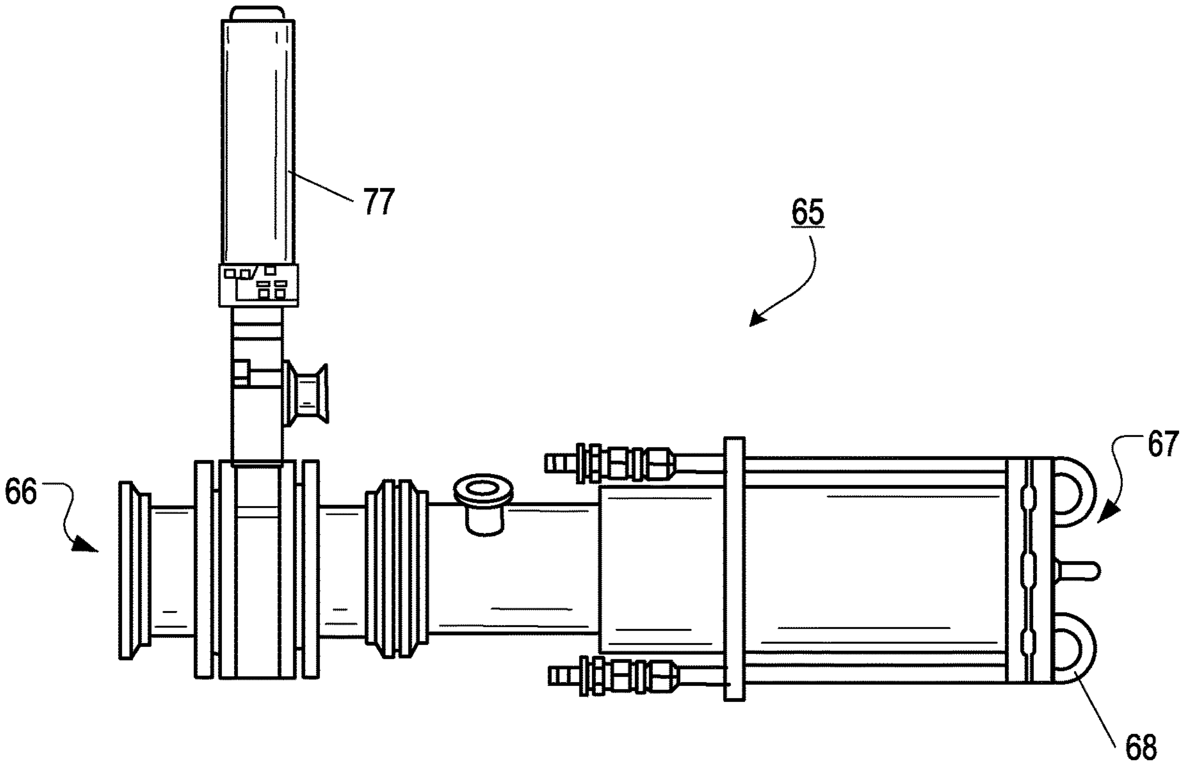
FIG. 2B is a side view depicting an example of a target assembly for housing a neutron-generating target.

FIG. 2B is a side view of an example target assembly 65 that can form a terminal portion of HEBL 50. Target 60 (not shown) can be contained within assembly 65 at or near end 67. The charged particle beam enters assembly 65 at end 66 and travels to an opposite end 67 where it impacts target 60. Various cooling channels 68 are routed to and from end 67 for the insertion and removal of coolant used to regulate the temperature of target 60 during use. Numerous sensors can be included to monitor the temperature and radioactivity of and around assembly 65. Also shown is valve 77 in the example form of a gate valve. End 67 of assembly 65 is inserted into an aperture 205 (see FIG. 3A) within NBC 200 where it remains during BNCT procedures. Assembly 65 (with target 60) can be removed from NBC 200 and disposed of upon reaching the end of its usable lifetime, at which point a new assembly 65 and target 60 can be inserted into NBC 200.

Figure 2C:
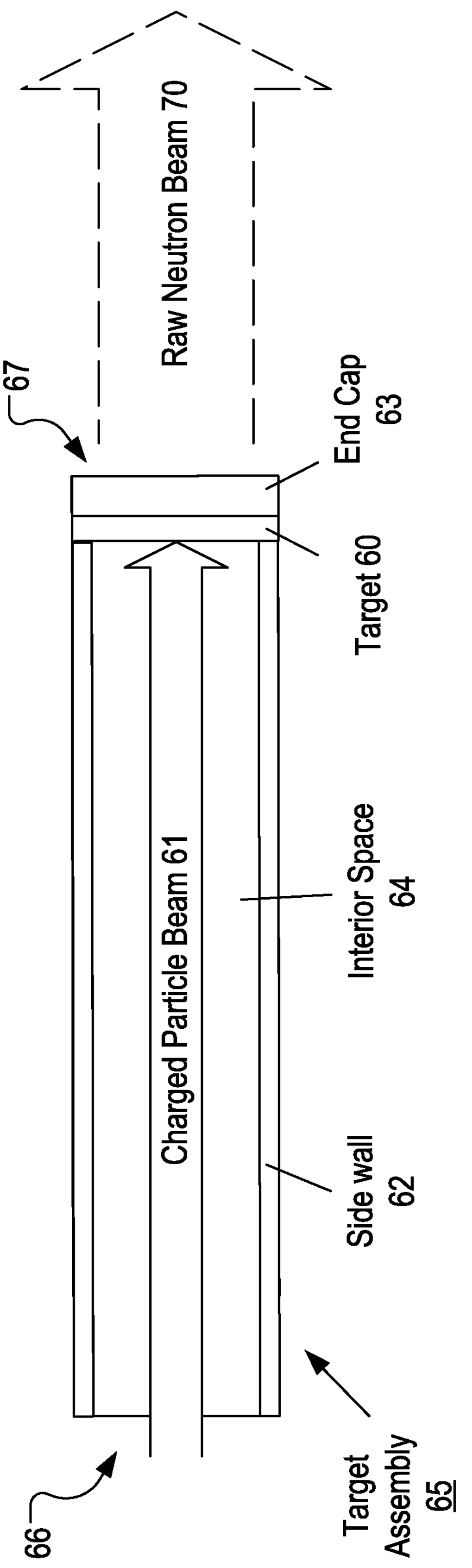
FIG. 2C is a cross-sectional view depicting an example of a target assembly for housing a neutron-generating target.

FIG. 2C is a cross-sectional view of an example target assembly 65 omitting components such as valve 77, coolant channels, and sensor connections for clarity. A sidewall 62 has a tubular shape and contains an interior space 64 at a vacuum or near vacuum level. Target 60 is positioned at end 67 and held in place by end cap 63. Variations of this construction are possible, such as with target 60 surrounded by sidewall 62. Charged particle beam 61 is directed through interior space 64 and scanned across target 60 by scanning magnet 74 located upstream on HEBL 50 (not shown). Neutrons produced by target 60 will be emitted at some level in virtually all directions from target 60, but the majority of the neutrons will be emitted in a dispersed but generally forward-directed path. This is depicted here as neutron beam 70 in raw form.

FIG. 3A is a cross-sectional view of an example neutron beam converter (NBC) 200. NBC 200 includes a target assembly aperture 205 that is configured to receive target assembly 65 (not shown). With an assembly 65 configuration like that described with respect to the example of FIGS. 2B-2C, upon installation of assembly 65 within aperture 205, target 60 would be positioned in target installation location 69. A generally close fit can be desirable although some amount of gap will be present between assembly 65 and the surrounding walls of NBC 200 in order to permit, e.g., routing of coolant channels and periodic exchanges of assembly 65.

NBC 200 is configured to have a beam input 201 adjacent to, or in close proximity to, target installation location 69. In some implementations, the distance between input 201 and location 69 is 10 centimeters (cm) to 60 cm, more preferably 25 cm to 40 cm. NBC 200 has a beam output 202 downstream of the generated neutron flow, which is located in proximity to recess 206. A beam axis 203 extends from beam input 201 to beam output 202 and, in this case, is aligned centrally within NBC 200. For convenience, the position of elements within NBC 200 will be referred to with respect to axis 203 and lateral directions 204, which are perpendicular to axis 203. The terms upstream and downstream are referenced with respect to charged particle beam flow into the target 60 and subsequent neutron flow, both of which proceed in the general direction from left to right in FIG. 3A (e.g., from input 201 to output 202 along axis 203). For example, aperture 205 is axially upstream of recess 206.

NBC 200 has a rear (upstream-most) face or side 281, a front (downstream-most) face or side 282, and a lateral face or side 283. NBC 200 includes four general regions: central region 210 which is traversed by axis 203; intermediate region 230; peripheral region 250; and frontal region 270. In this implementation, central region 210 has a generally cylindrical shape. Intermediate region 230 also has a generally cylindrical shape and surrounds the lateral sides and the upstream side of central region 210. Peripheral region 250 has a generally cylindrical shape as well and surrounds the lateral sides and the upstream side of intermediate region 230. Regions 210, 230, and 250 can be configured to form generally concentric housings about axis 203, with the housings being in concentric cylindrical or pseudo-cylindrical multi-sided shapes, e.g., hexagonal shapes, octagonal shapes, or other polygonal shapes.

The various cylindrical shapes enable the conditioning of neutrons emanating from target 60 on all lateral sides of the beam axis 203. The shape can be symmetrical in both the axial and lateral profiles or asymmetric in either or both profiles. An asymmetric axial profile can have a variable diameter that increases or decreases progressing in an upstream-to-downstream direction. An asymmetric lateral profile can have a variable diameter when viewed in a lateral cross-section (e.g., an elliptical cross-section).

Frontal region 270 is present across the downstream sides of regions 210, 230, and 250, although not necessarily in contact with each region. Recess 206 can be filled with a vacuum or ambient gas to aid in forming neutron beam 70 in the forward direction. NBC 200 can be mounted within a structural support 95 that maintains NBC 200 in position with respect to the upstream neutron beam system 100 and the downstream patient treatment room.

Each of regions 210, 230, 250, and 270 are configured to perform a different array of functions on the neutrons and other particles generated by beam system 100. Central region 210 has the primary function of scattering fast neutrons emitted by target 60 in the forward direction without significant directional change, and without absorbing a substantial number of neutrons. The fast neutrons are preferably scattered such that their energies descend into and remain within the target range (e.g., epithermal energies) until output from NBC 200. This preferably occurs without simultaneously scattering a significant number of neutrons down and out of the target range.

The amount and type of material within central region 210, in any given direction, is proportional to the change in energy required to scatter and reduce the most probable neutron energy emitted in that direction. For example, more material is required in the forward direction since the neutrons emitted from target 60 in that direction are more energetic than those traveling in the backward direction.

Intermediate region 230 functions to redirect neutrons back towards central region 210 to conserve those neutrons and allow them to be utilized in neutron beam 70, but in such a way that minimal energy loss and absorption occurs. Region 230 also scatters fast neutrons emitted at large forward angles from target 60 that laterally traversed central region 210 and provides photon shielding for prompt gamma rays produced by neutron captures in both central region 210 and peripheral region 250.

Peripheral region 250 functions to remove neutrons of all energies as it is unlikely those neutrons can be redirected back into central region 210. This is accomplished by further scattering the neutrons to thermal or near thermal energy levels for easier absorption by region 250. Region 250 also provides photon shielding to reduce the number of photons produced in the inner area of NBC 200 from entering the facility.

Examples of these and other configurations of NBC 200 are described in Int'l. Appl. No. PCT/US2022/047912, filed Oct. 26, 2022, and titled "Systems, Devices, and Methods for Converting a Neutron Beam", which is incorporated by reference herein in its entirety for all purposes.

FIG. 3B is an isometric render of an example NBC 200 positioned in a treatment facility 400 furnished for BNCT. A HEBL room 410 is separated from a treatment room 420 by a facility wall 412. The HEBL room 410 houses the HEBL 50 and potentially other components of the neutron beam system 100. Although not depicted in FIG. 3B, the treatment room 420 can accommodate a patient 80 as well as various equipment necessary for BNCT, e.g., an MRS 360, an NCA 300, a safety cover 370, medical diagnostics, a patient platform 902 (e.g., a robotic couch) for positioning the patient 80 (see FIGS. 9A-9C for example), among other medical equipment.

The NBC 200 is positioned between the HEBL room 410 and the treatment room 420 within an opening 414 of the facility wall 412. NBC 200 is braced by a support structure 96 that elevates the NBC 200 above the floor of the treatment room 420 to a desired height. A front side 282 (downstream-most face) of the NBC 200 is exposed to the treatment room 420 with the recess 206 of NBC 200 shown. NBC 200 has an octagonal housing shape in this example, but as mentioned previously, NBC 200 can be implemented with various concentric shapes. Beam axis 203 is aligned with the recess 206 to indicate the path of a neutron beam 70, generally in an epithermal energy range, entering the treatment room 420.

FIG. 3B also shows the maximum dimensions of the treatment room 420 near the facility wall 412 and NBC 200. A wall-to-wall length 420*a* indicates a maximum width in the x dimension. A false ceiling height 420*b* suggests a preferable height in the y dimension, while a ceiling height 420*c* indicates a maximum height in the y dimension. These measurements indicate size restrictions of any equipment that operates with, or in close proximity to, the NBC 200. Note, FIG. 3B displays a model of a treatment facility 400 but it illustrates the physical constraints placed on BNCT and neutronics equipment. In general, large, heavy materials are necessary to effectively absorb, scatter, and redirect neutrons and gamma rays which is further complicated when multiple components involve precise mechanical movement relative to a patient 80, like those of an MRS 360 and/or an NCA 300. As is discussed below, implementation for BNCT poses additional challenges due to clinical requirements of the neutron beam 70, as well as mitigation of safety hazards to patients and clinical personnel.

Figure 12A:
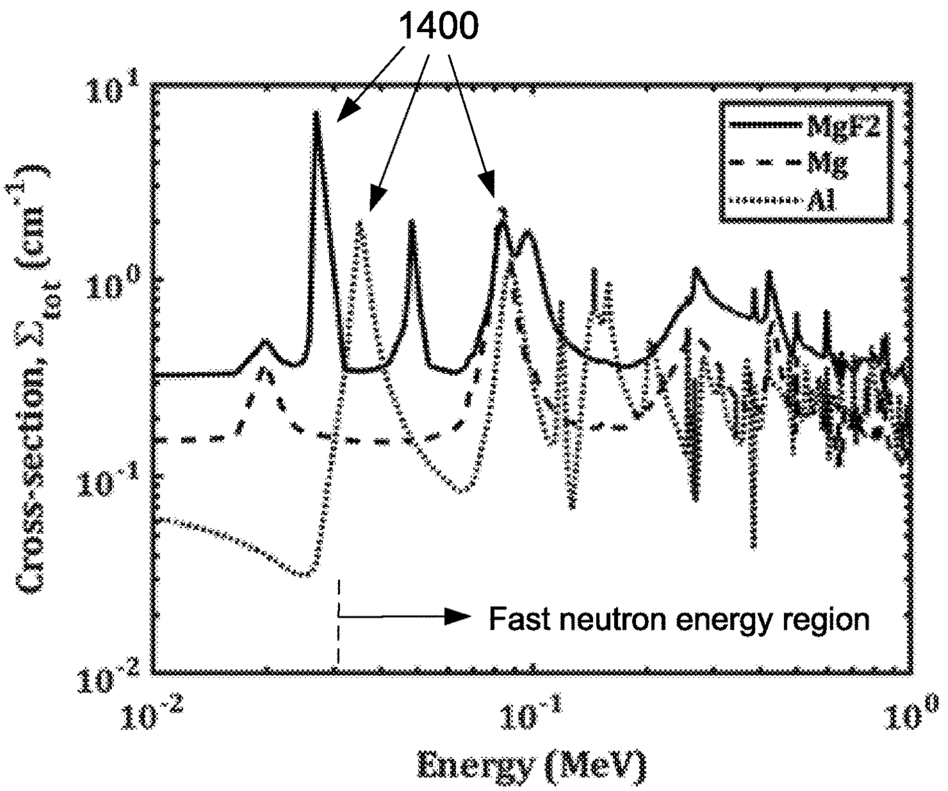
FIGS. 12A-12Q are graphs of cross-section versus neutron energy for materials of various types suitable for use in a neutron collimator assembly.
Figure 12B:
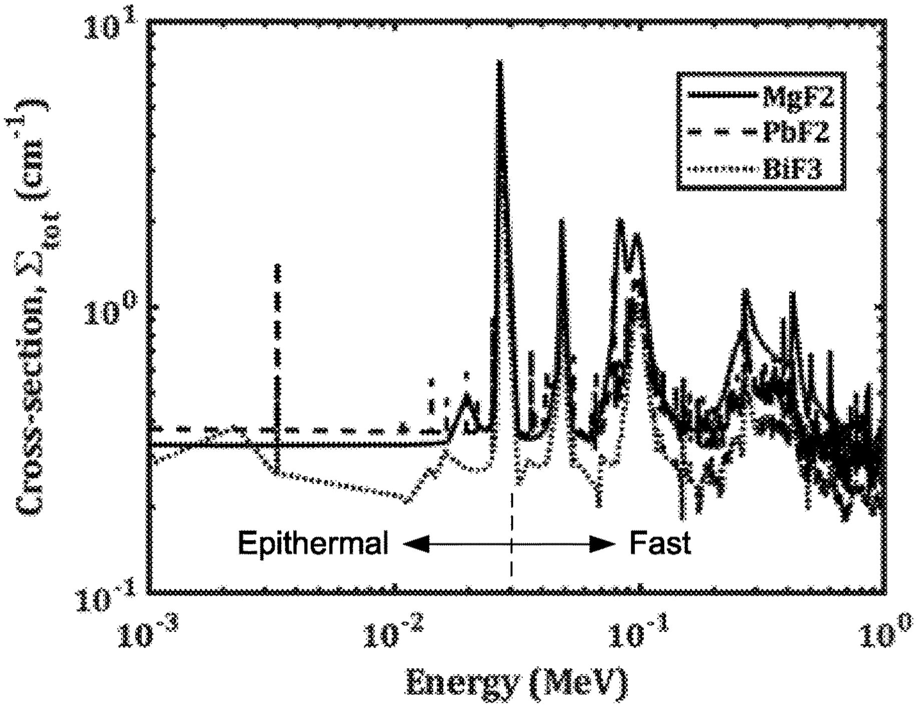
Figure 12C:
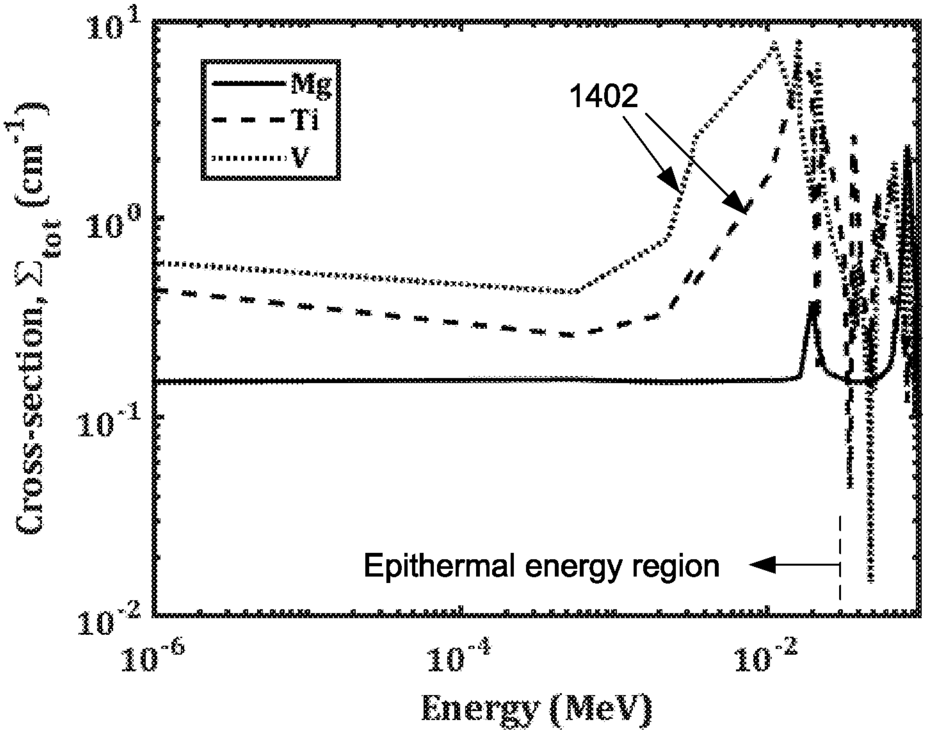

When describing various examples of MRS 360, NCA 300, neutron beam collimators 320, beam stop 330, safety cover 370, and components thereof, reference will be made to different materials categorized in terms of their neutronics properties. Materials adept at scattering neutrons, classified generally herein as "S" materials, can be further classified as having substantial cross-sections for scattering from fast to epithermal energies ("Fast-S"), from fast and epithermal energies to lower energies ("Epi-S"), and as having substantial cross-sections in non-resonant regions ("NR-S") for scattering fast and/or epithermal neutrons. Materials adept at absorbing thermal neutrons are generally referred to herein as "Ab" materials. Materials adept at redirecting neutrons and absorbing gamma rays are generally referred to herein as "R" materials. Example materials for these categories are outlined at the conclusion of the specification. FIGS. 12A-12Q are graphs of cross-section versus neutron energy for several such example materials.

Examples of Moveable Radiation Shields

Figure 4A:
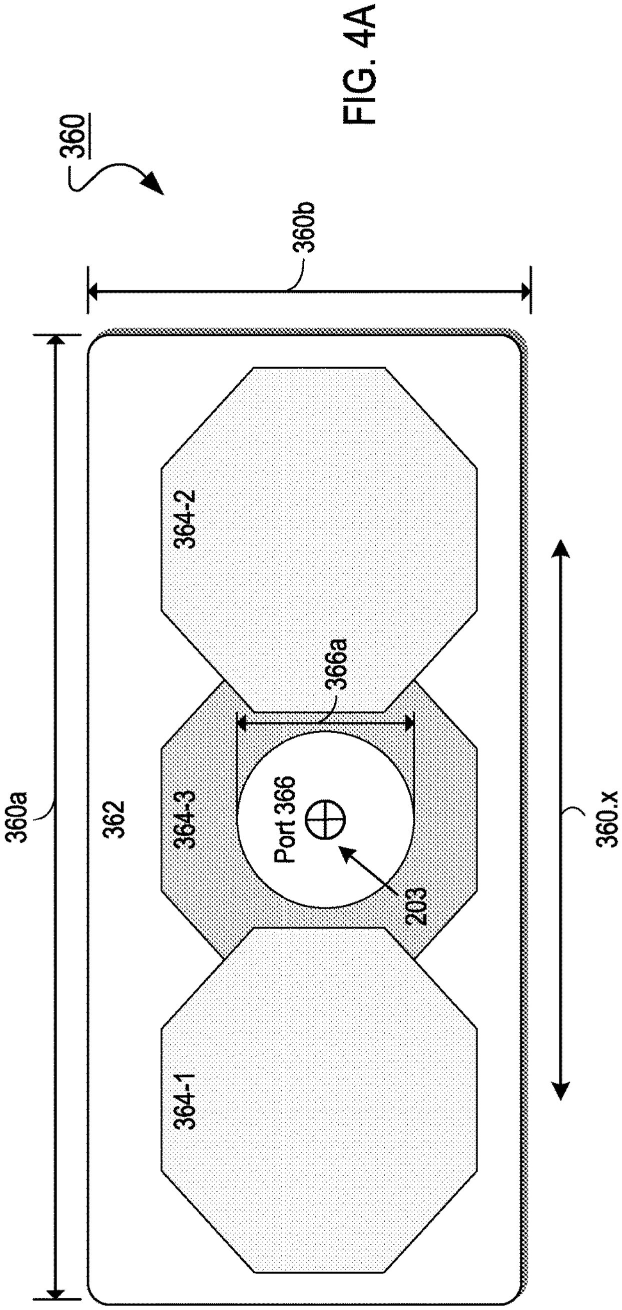
FIGS. 4A and 4B are front views depicting an example of a moveable radiation shield in different stationary positions.
Figure 4B:
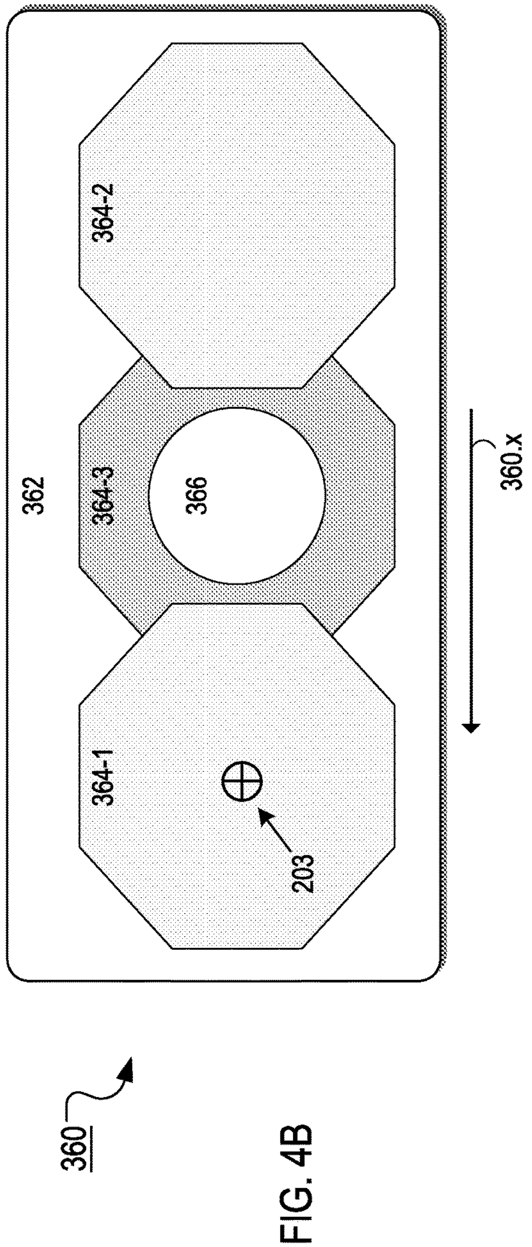

FIGS. 4A and 4B are front views of an example moveable radiation shield (MRS) 360 in different stationary positions relative to a (fixed) beam axis 203. Beam axis 203 is represented as a cross indicating a direction coming out of the page, such that MRS 360 is arranged in a plane orthogonal to the axis 203. In most cases, the MRS 360 is immediately downstream from an NBC 200 and is configured to receive a neutron beam 70 from NBC 200 along the beam axis 203. With respect to BNCT applications, the primary function of MRS 360 is to protect a treatment room 420, along with patients and clinicians, from lingering gamma radiation between BNCT treatments. When the neutron beam 70 is active, radioactive isotopes can be produced in various components of the beam system 100 as a result of neutron activation, e.g., the target 60 and regions of NBC 200. These isotopes can emit gamma rays and other byproducts when they eventually decay, potentially hours later depending on their respective half-lives. Hence, even when the neutron beam 70 is inactive, isotopes can increase the gamma ray dose rate in the treatment room 420 to unacceptable levels if not adequately shielded against.

MRS 360 includes three solid plates of gamma ray shielding, a first peripheral plate 364-1, a second peripheral plate 364-2, and a central plate 364-3 positioned between the first 364-1 and second 364-2 peripheral plates. Shielding plates 364 are composed of materials suitable for shielding a patient 80 from gamma radiation. Shielding plates 364 can also provide a buffer against stray neutrons and other radiation byproducts. For example, the shielding plates 364 can be composed of R materials such as lead. In general, shielding plates 364 are sized and shaped to physically cover the front side 282 of the NBC 200. Here, the shielding plates 364 conform to octagons to match the shape of the example NBC 200 depicted in FIG. 3B, but other geometries can also be implemented, e.g., conforming to other polygonal shapes of the NBC 200. The thickness of the shielding plates 364 can be about 4 cm or more (e.g., about 5 cm or more, about 6 cm or more, about 7 cm or more, about 8 cm or more, about 9 cm or more, about 10 cm or more) to provide sufficient gamma ray shielding.

Note that the precise number, material composition, size, and shape of the shielding plates 364 depends on the particular implementation. These design parameters can be influenced by multiple factors, e.g., available space, available materials, weight restrictions, level of radiation protection, and geometry of the NBC 200, among others. In this case, shielding plates 364 are symmetric about a beam port 366 which can provide flexibility for BNCT. For instance, patient(s) 80 may need to be orientated in different directions relative to the beam axis 203, and therefore shielding at opposing sides of the beam port 366 can be desirable. Nevertheless, asymmetric MRSs 360 with a single peripheral plate 364 offset the beam port 366 can also be implemented, which can conserve space and materials.

The shielding plates 364 are supported by a frame 362. A shield width 360*a* and a shield height 360*b* specify the overall dimensions of the frame 362 and MRS 360. To ensure complete coverage of the NBC 200 in all stationary positions, the shield width 360*a* can be about 1 meter (m) to 2 m and the shield height 360*b* can be about 0.5 m to 1 m. In some implementations, a single shielding plate 364 can define the entire MRS 360. However, since shielding plate 364 materials such as lead are relatively heavy, soft, and malleable, frame 362 can be composed of different compounds (e.g., titanium, steel, aluminum, and their respective alloys) to attain certain attributes for MRS 360, e.g., structural support, lower total weight, and enable coupling to actuators and other equipment (e.g., guide tracks, track rollers and/or wheels).

Considering the weight of high atomic number materials, the MRS 360 typically moves via horizontal translation 360.*x* to enable simplified mechanics and mitigate safety risks, although vertical translation or general planar translation is also feasible. For example, an MRS 360 primarily composed of lead with a shield width 360*a* of about 1 m, a shield height 360*b* of about 0.5 m, and a thickness of about 4 cm can weigh about 500 pounds (lbs.). While not depicted in FIGS. 4A-4B, the MRS 360 can be mechanically coupled to one or more actuators in order to horizontally translate 360.*x* the MRS 360 to any number of specified positions. The actuators can utilize any combination of mechanisms to enable translation 360.*x* with relatively high loading, e.g., hydraulic, pneumatic, electrical, mechanical, or electromechanical. To facilitate reduced BNCT treatment times and accurate beam port 366 alignment, the actuators can translate the MRS 360 to any stationary position in about 30 seconds (sec) or less (e.g., about 25 sec or less, about 20 sec or less, about 15 sec or less, about 10 sec or less) with a position reproducibility in all directions of about 1 millimeter (mm) or less (e.g., about 0.9 mm or less, about 0.8 mm or less, about 0.7 mm or less, about 0.6 mm or less, about 0.5 mm or less).

FIG. 4A shows MRS 360 in a stationary position where the beam port 366 is aligned with the beam axis 203. An "open beam" diameter, e.g., the full-width half-max (FWHM) of the neutron beam 70 exiting the beam port 366, is generally limited (at least in part) by the dimensions of the beam port 366. That is, the open beam diameter is roughly concentric with a beam port diameter 366*a*. For BNCT applications, the open beam diameter and beam port diameter 366*a* can be about 40 cm or less (e.g., about 35 cm or less, about 30 cm or less, about 25 cm or less, about 20 cm or less, about 15 cm or less, about 10 cm or less).

The beam port 366 is centered on the central plate 364-3 and allows transmission of neutrons when the neutron beam 70 is active. Central plate 364-3 can shield against stray neutrons and gamma radiation immediately outside the periphery of the beam port 366. Central plate 364-3 can also ensure a difference in neutron dose rates on opposing sides of the beam port 366 is limited to about 5% or less (e.g., about 4% or less, about 3% or less, about 2% or less, about 1% or less).

Beam port 366 can be any suitable material that is sufficiently transparent to neutrons. For example, the beam port 366 can be a hollow air gap with depth traversing through the MRS 360. In some implementations, the beam port 366 is filled with a vacuum or ambient gas to aid in forming the neutron beam 70 in the forward direction, similar to the recess 206 of the NBC 200. The dimensions of the recess 206 can be balanced with respect to the beam port 366 to minimize overall space requirements of the neutron beam system 100, as well as optimize properties of the neutron beam 70 exiting the NBC 200 and MRS 360.

Although the beam port 366 in FIGS. 4A-4B is depicted with a hollow cylindrical shape, the beam port 366 can have various geometries to perform different functions, e.g., semi-circular and polygonal perimeters with sharp or round corners. In particular, the beam port 366 can have a hollow conical shape that can provide enhanced collimation of the neutron beam 70 before delivery to a patient 80, or before being collimated further by an NCA 300. An example of such a beam port 366 is shown in FIG. 4D.

To facilitate an improvement in the neutron beam 70 spectral shape, the beam port 366 can be lined with an S material to scatter diverging neutrons and/or redirect neutrons towards the central beam axis 203. If the neutron beam 70 is in an epithermal energy range, the beam port 366 can be lined with a NR-S material which are adept at scattering epithermal neutrons. For BNCT applications, neutron activation of the lining material can also be a concern due to the proximity to a patient 80, thus, materials with relatively low affinities for activation are generally desirable. A few non-limiting examples of such materials suitable for lining the beam port 366 are beryllium (e.g., as a pure metal, oxide, carbide, or carbonate), carbon (e.g., graphite), and ethylene tetrafluoroethylene (ETFE). In general, S materials with atomic numbers below aluminum (Al) are favorable because they do not exhibit significant neutron activation. In terms of high atomic number materials (e.g., R materials), lead can be suitable since it too does not exhibit significant activation.

Figure 4C:
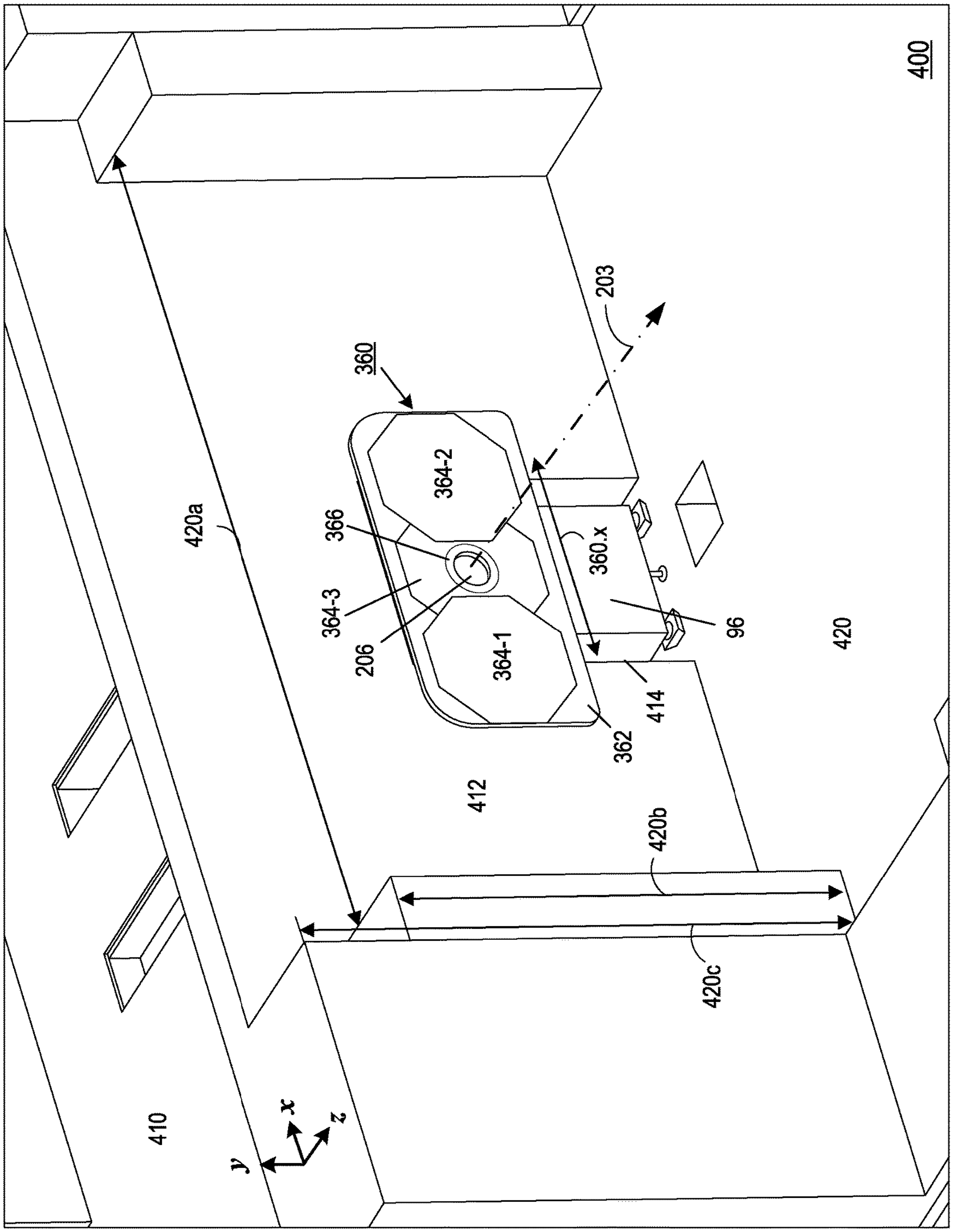
FIG. 4C is an isometric render depicting an example of a moveable radiation shield in a BNCT treatment facility.
Figure 4D:
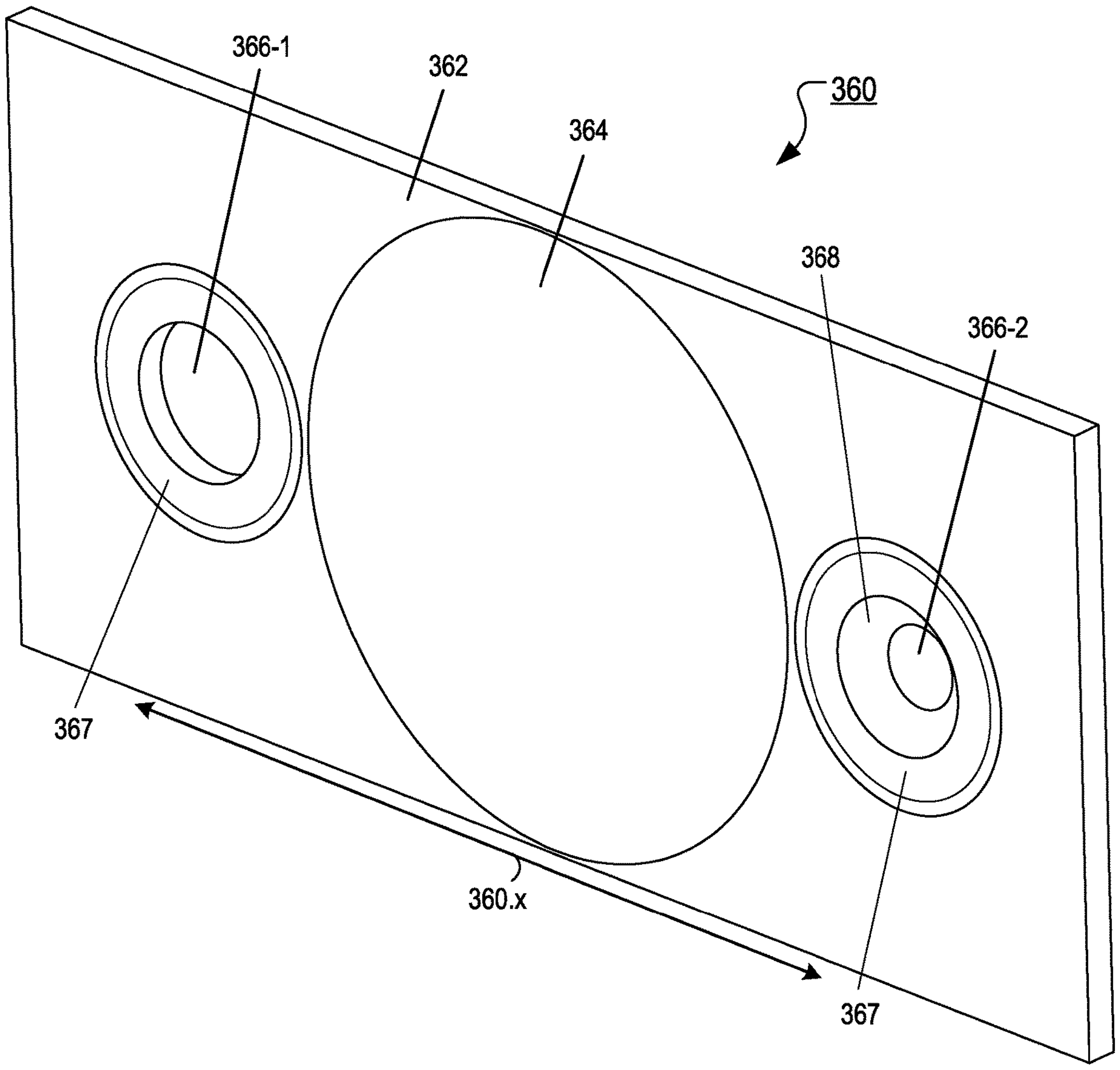
FIG. 4D is an isometric render depicting an example of a moveable radiation shield with two beam ports.

In some implementations, MRS 360 can include multiple beam ports 366 (an example is shown in FIG. 4D). MRS 360 can exploit multiple beam ports 366 to vary the beam diameter of the neutron beam 70 before delivery to a patient 80, or before the neutron beam 70 is collimated further by an NCA 300. This can provide increased flexibility for BNCT since more refined beam diameters can be achieved. In other implementations, MRS 360 can include no beam ports. In this scenario, MRS 360 can allow transmission of the neutron beam 70 by translating to a position offset the beam axis 203. An MRS 360 with no beam ports 366 can be suitable in situations when an NCA 300 operates directly on the neutron beam 70 exiting NBC 200.

FIG. 4B shows MRS 360 in a stationary position where the first peripheral plate 364-1 is positioned on the beam axis 203. The MRS 360 can horizontally translate 360.*x* from the position in FIG. 4A to the position in FIG. 4B. In this case, the neutron beam 70 is usually inactive and any residual gamma rays emitting from radioactive isotopes are shielded against by the first peripheral plate 364-1. MRS 360 can also horizontally translate 360.*x* to a stationary position where the second peripheral plate 364-2 is positioned on the beam axis 203. Whether the first 364-1 or second 364-2 peripheral plates are positioned on the beam axis 203 generally depends on the relative location and orientation of a patient 80 in the treatment room 420.

FIG. 4C is an isometric render of an example MRS 360 in a treatment facility 400 outfitted for BNCT. The same treatment facility 400 is shown in FIG. 3B devoid the MRS 360. MRS 360 is situated on, or in close proximity to, the facility wall 412 in order to conceal the NBC 200 and mitigate lingering gamma radiation from a target 60, NBC 200, and other components of the beam system 100. For example, MRS 360 can be supported on the facility wall 412 in a guide track that allows movement of MRS 360. In this case, beam port 366 is aligned with beam axis 203 indicating an active neutron beam 70 condition. When the neutron beam 70 is inactive, MRS 360 can horizontally translate 360.*x* to a stationary position with the first 364-1 or second 364-2 peripheral plate covering the NBC 200.

As shown in FIG. 4C, the example MRS 360 does not exceed the ceiling height 420*c* nor the false ceiling height 420*b*. Additionally, MRS 360 does not interfere with the treatment room 420 wall locations nor the finished floor location.

FIG. 4D is an isometric render of another example MRS 360 having two beam ports 366-1 and 366-2. In this implementation, the MRS 360 includes a circular central shielding plate 364 that protects against gamma radiation when a neutron beam 70 is inactive. One advantage of the example MRS 360 shown in FIG. 4D is the flexibility for variable neutron beam diameters since a wide beam port 366-1 or a narrow beam port 366-2 may be more appropriate for certain BNCT treatments. As shown in FIG. 4D, narrow beam port 366-2 has a hollow conical portion 368 to provide enhanced collimation of the neutron beam 70. Moreover, both beam ports 366-1 and 366-2 are lined with a layer 367 composed of an S material to improve the spectral shape of the neutron beam 70. Nevertheless, as is discussed below, a suitable selection of neutron beam collimators 320 supported by an NCA 300 can accommodate considerable beam diameter variability of the neutron beam 70.

Examples of Neutron Beam Collimators

Figures 5A, 5B:
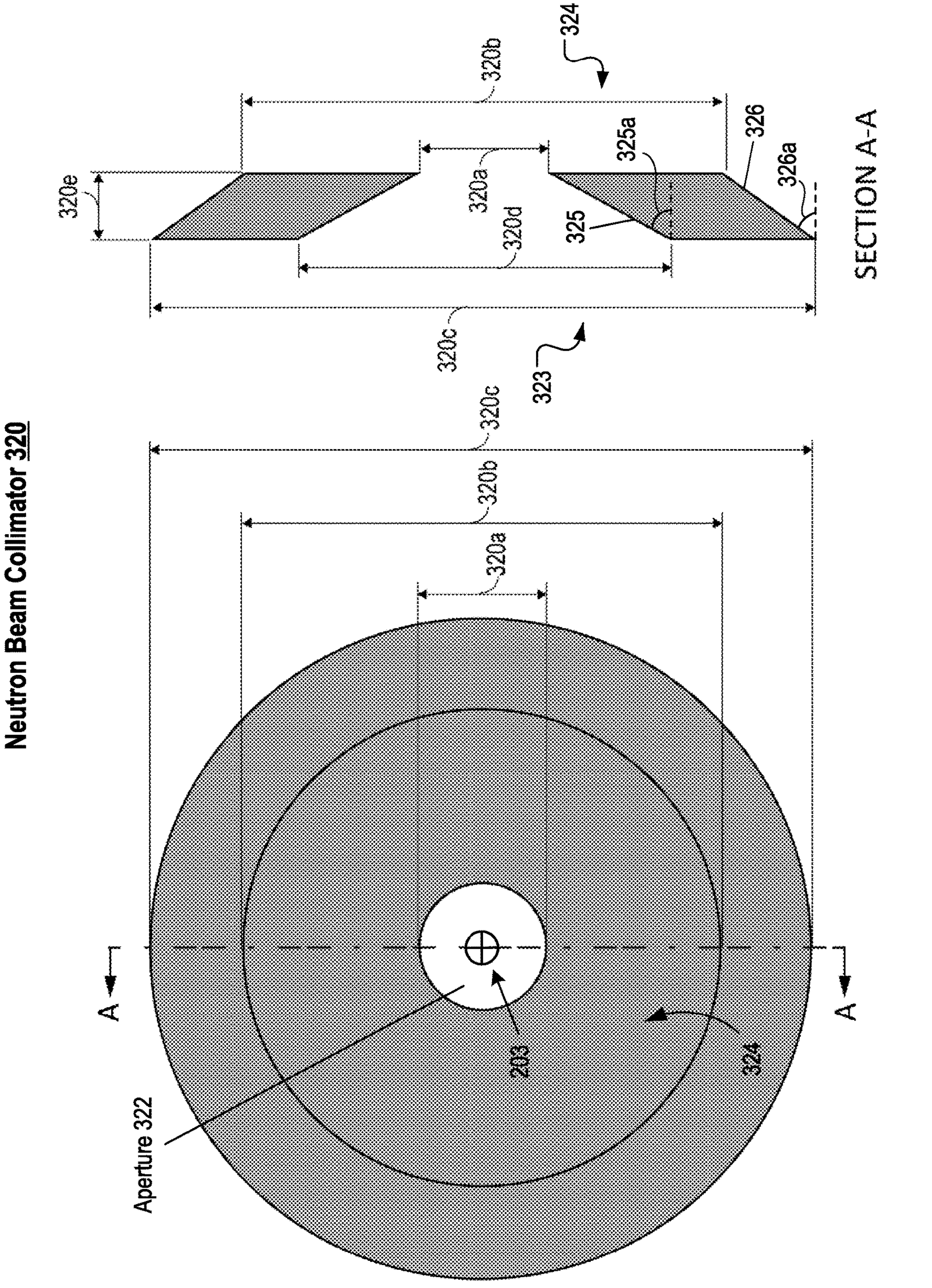
FIGS. 5A and 5B are front and cross-sectional views, respectively, depicting an example of a neutron beam collimator.
Figure 5D:
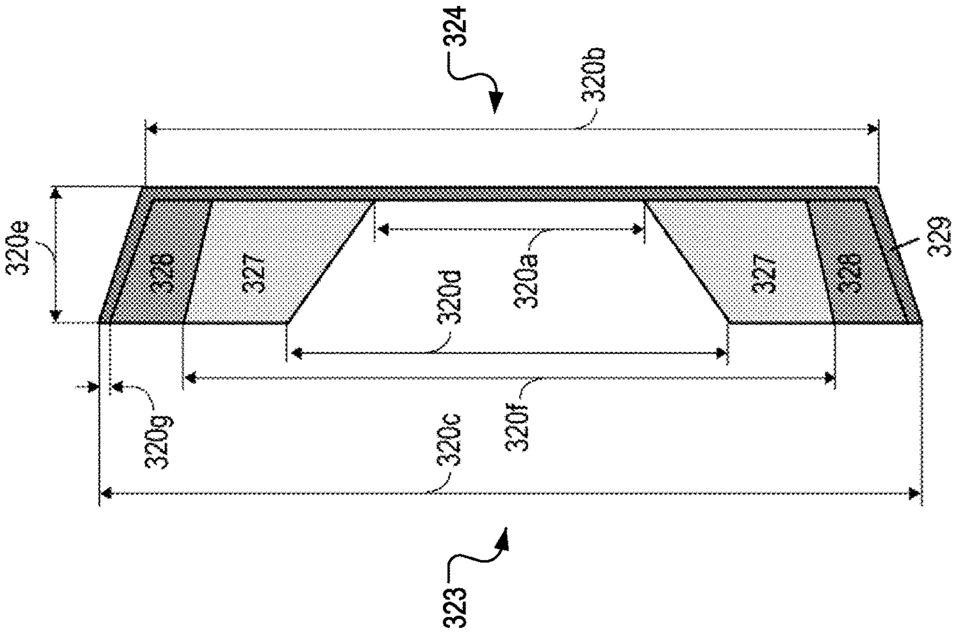
FIGS. 5C-5E are various views depicting an example of a neutron beam collimator with radially layered materials.
Figure 5C:
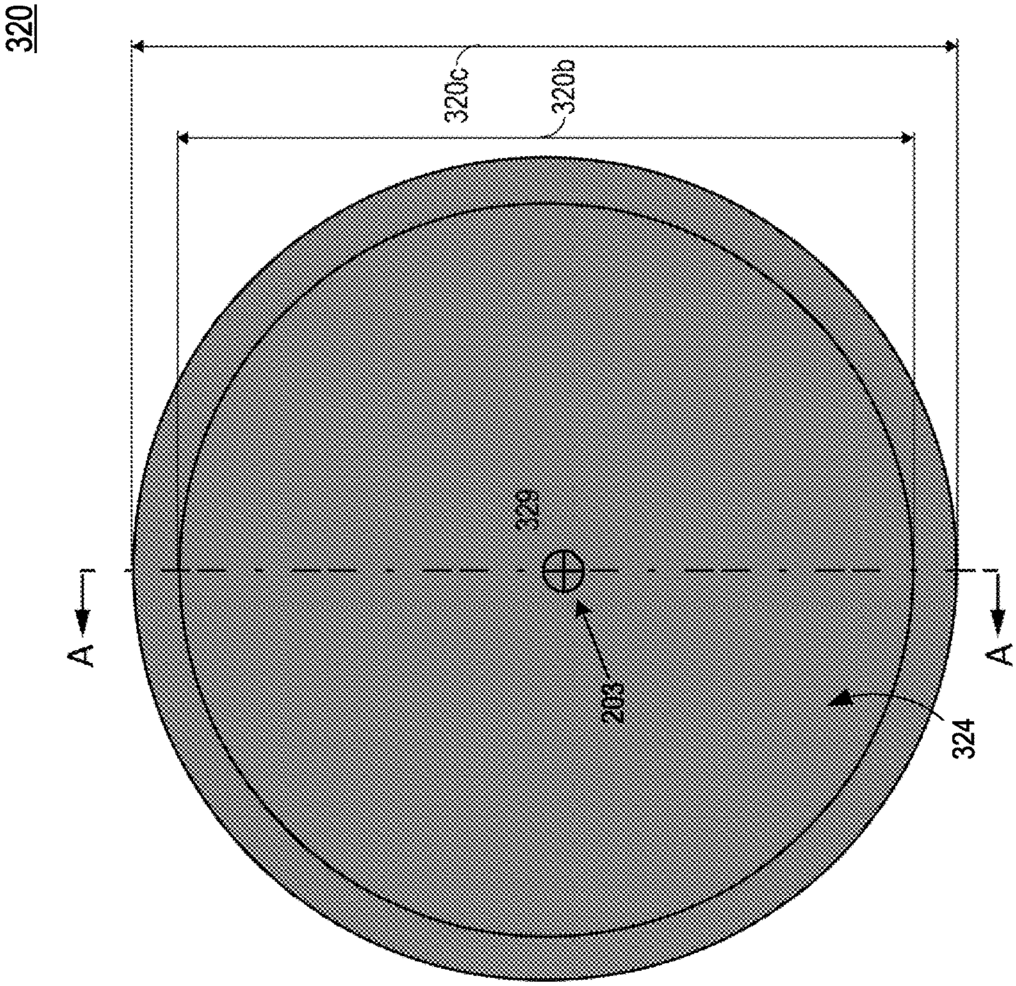
Figure 5E:
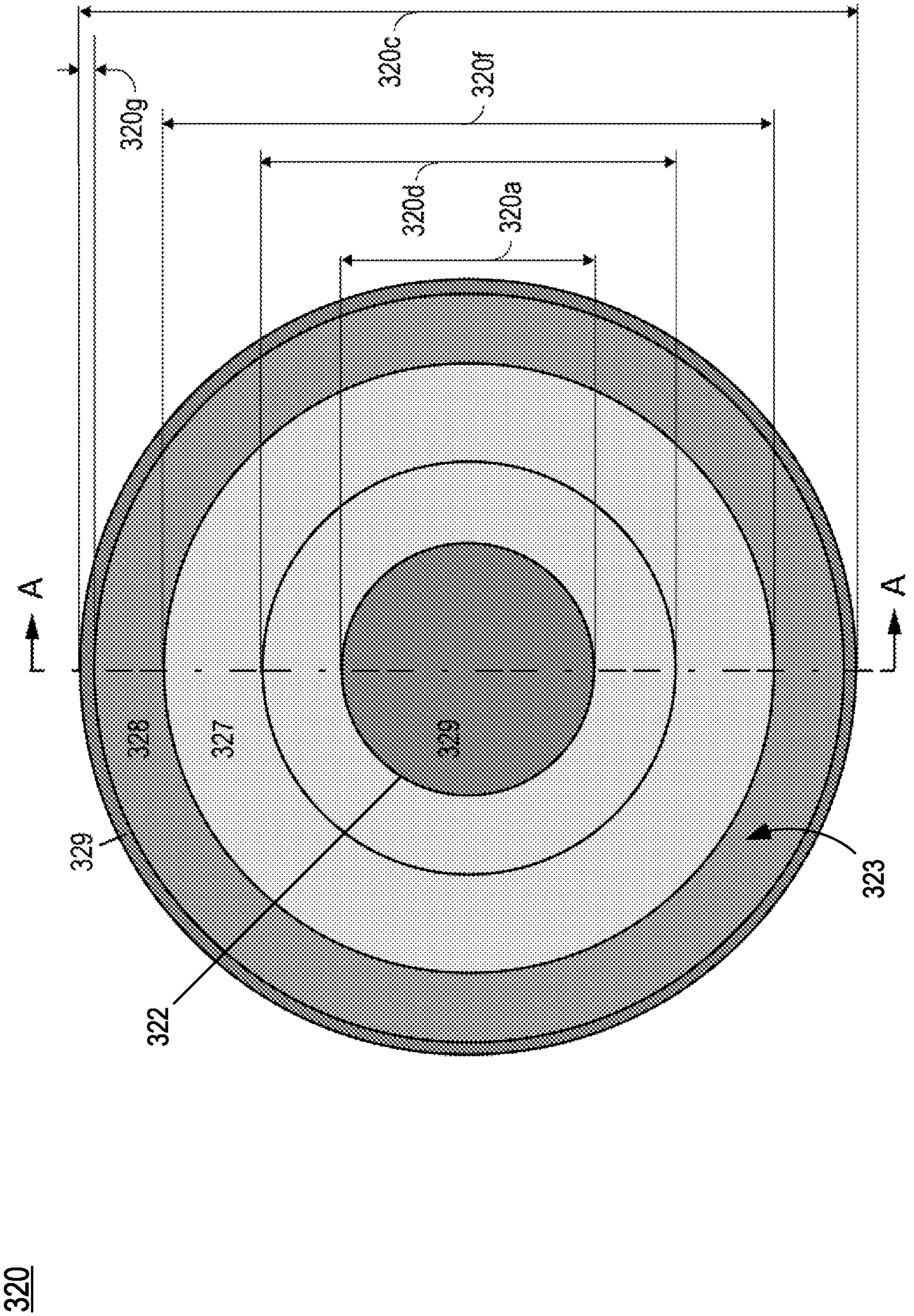

FIG. 5A is a front view of an example neutron beam collimator 320 that can attenuate a neutron beam 70 to a targeted beam diameter. FIG. 5B is a cross-sectional view of the same neutron beam collimator 320 depicted in FIG. 5A. In this case, the collimator 320 is a solid plate with a circular perimeter and a circular aperture 322. Circular symmetry is practical from both an application and manufacturing standpoint but other geometries such as semicircles and polygons (with sharp or round corners) can also be implemented for the perimeter and/or aperture 322. For example, a collimator 320 with a square or rectangular outer perimeter may be useful for alignment and/or positioning purposes depending on how the collimator 320 is integrated into a neutron beam system 100. As shown in FIG. 5A, the aperture 322 of collimator 320 is depicted as a hole for passage of the neutron beam 70. However, a thin layer of material, e.g., an R material, can cover the hole to provide gamma ray shielding without significantly affecting properties of the neutron beam 70. An example of such a neutron beam collimator 320 is shown in FIGS. 5C-5E.

During active use, the collimator 320 is usually aligned with a beam axis 203 representing a path of the neutron beam 70, e.g., the neutron beam 70 exiting a beam port 366 of an MRS 360. In FIG. 5A, beam axis 203 is represented as a cross indicating a direction coming out of the page. Referring to the cross-sectional view in FIG. 5B, the collimator 320 receives the neutron beam 70 at a proximal face 323 and outputs the beam 70 at a distal face 324 with an attenuated beam size, e.g., an attenuated beam diameter. For example, if the neutron beam 70 has an approximately Gaussian shape, the attenuated beam diameter can be defined as the full-width half-max (FWHM) of the neutron beam 70 at the distal face 324. However, other definitions of beam size and beam diameter can be used depending on the physical characteristics of the collimator 320 and the neutron beam 70.

With respect to BNCT, the neutron beam 70 is generally in an epithermal energy range. To absorb neutrons, the collimator 320 can include compounds of elements with large neutron scattering cross-section resonances in the epithermal region (e.g., Epi-S materials such as titanium, vanadium, and scandium) to effectively scatter epithermal neutrons in the original beam down to thermal energies. These thermal neutrons can be absorbed by compounds of elements with large thermal neutron absorption (e.g., Ab materials such as boron, lithium, and cadmium). The collimator 320 can redirect neutrons, as well as shield against high-energy photons, using compounds of high atomic number (e.g., R materials such as lead, nickel, bismuth, and tungsten). Lingering fast neutrons in the original neutron beam can be absorbed by compounds with low atomic number elements (e.g., NR-S materials such as hydrogen, deuterium, lithium, beryllium, boron, carbon, and oxygen). NR-S materials can also scatter fast and/or epithermal neutrons into the thermal region to be absorbed by Ab materials. Such materials can be radially layered in the collimator 320 to attenuate and/or focus the neutron beam 70 to a target beam diameter and intensity. An example of a collimator material layering scheme is shown in FIGS. 5C-5E.

In general, the collimator 320 can attenuate the neutron beam 70 by absorbing incoming neutrons that are outside the periphery of the aperture 322, such that the attenuated beam diameter is approximately coincident with an aperture diameter 320*a*. For BNCT applications, the aperture diameter 320*a* is typically in a range from about 4 cm to 25 cm. As shown in FIG. 5B, incoming neutrons (moving from left to right) can also be redirected by an inner conical portion 325, having an inner angle 325*a*, towards the central beam axis 203. With an appropriate aperture diameter 320*a*, inner angle 325*a*, and material selection, the collimator 320 can balance absorption and redirection effects to ensure the neutron beam 70 exiting the distal face 324 has sufficient intensity at the targeted beam diameter. In this case, a conical outer surface 326 has an outer angle 326*a* approximately equal to the inner angle 325*a* for added symmetry, but these angles 325*a* and 326*a* can differ depending on the implementation.

The collimator 320 can have a thickness 320*e* of about 5 cm or more (e.g., about 6 cm or more, about 7 cm or more, about 8 cm or more, about 9 cm or more, about 10 cm or more) to accommodate the necessary materials and provide sufficient scattering pathways for neutrons. To ensure the entire incoming neutron beam 70 is captured by the collimator 320, an inner diameter 320*d* can be larger than the open beam diameter (e.g., FWHM) of the incoming neutron beam 70. For example, if the collimator 320 is aligned with a beam port 366 of an MRS 360, the inner diameter 320*d* can be greater than or equal to a beam port diameter 366*a*. Accordingly, for BNCT applications, the inner diameter 320*d* can be about 20 cm or more (e.g., about 25 cm or more, about 30 cm or more, about 35 cm or more, about 40 cm or more).

A snout diameter 320*b* and outer diameter 320*c* can be selected based on the specific implementation. For instance, considering a collection of neutron beam collimators 320 that may need to be exchanged with one another, e.g., collimators 320 in an NCA 300, uniform diameters 320*b* and 320*c* and thicknesses 320*e* between collimators 320 can be useful for alignment and position reproducibility due to having an outer profile with the same size and shape. Considering BNCT applications, the outer diameter 320*c* can be about 30 cm to 60 cm to accommodate necessary materials, targeted beam diameters, and patient positioning flexibility.

FIGS. 5C, 5D, and 5E are front, side, and back views, respectively, of an example neutron beam collimator 320 showing different radially layered material regions. A central region 327, an intermediate region 328, and a peripheral region 329 are layered radially to form the collimator 320. An analogous layering structure can be implemented in the example neutron beam collimator 320 described with respect to FIGS. 5A-5B, that is, the solid plate can include the layered material regions 327-329 described herein.

The layering structure of collimator 320 follows a similar approach as the NBC 200 (see FIG. 3A) in order to collimate a neutron beam 70 entering a proximal face 323 and exiting a distal face 324. An exception is that metallic S materials are generally avoided for use in collimator 320. Metallic S materials like titanium, vanadium, aluminum, iron, and others, while useful for epithermal scattering, are prone to produce radioactive byproducts which are generally undesirable for applications of collimator 320 in BNCT. Since the collimator 320 is typically positioned between an MRS 360 and a treatment room 420, these radioactive byproducts can increase the gamma ray dose rate in the treatment room 420 to unacceptable levels.

In this implementation, central region 327 and intermediate region 328 have the primary function of eliminating epithermal neutrons outside the periphery of aperture 322 to attenuate the beam diameter of the neutron beam 70. Central region 327 has a conical shape between aperture diameter 320*a* and inner diameter 320*d*, with a maximum dimension given by central diameter 320*f*. Intermediate region 328 has a conical shape between central diameter 320*f* and outer diameter 320*c*. In general, conical shapes are advantageous to redirect some portion of the neutron beam 70 towards the central beam axis 203 as well as provide a suitable volume of material for scattering and absorbing neutrons around the periphery of the neutron beam 70.

As shown in FIG. 5D, central region 327 generally defines the shape of the aperture 322 and includes compounds of S materials, e.g., NR-S materials, in order to scatter epithermal neutrons into a thermal energy range Like the layer 367 lining a beam port 366 of an MRS 360, central region 327 can include, but is not limited to, beryllium (e.g., as a pure metal, oxide, carbide, or carbonate), carbon (e.g., graphite), ethylene tetrafluoroethylene (ETFE), lead, or combinations thereof. Intermediate region 328 is located laterally around central region 327 and includes compounds of Ab materials (e.g., boron carbide) to absorb thermal neutrons. Peripheral region 329 encapsulates central region 327 and intermediate region 328. A thin layer of peripheral region 329, with thickness 320*g*, covers the distal face 324 which provides additional filtering of gamma rays to reduce patient exposure. Peripheral region 329 includes R materials (e.g., lead) adept at absorbing gamma rays. Since neutrons are generally scattered elastically by R materials, the energies of neutrons exiting distal face 324 of collimator 320 are not significantly affected by the peripheral region 329.

The example neutron beam collimators 320 shown in FIGS. 5A-5E can be manufactured using industrial three-dimensional (3D) printing techniques. 3D printing can provide considerable flexibility for complex geometries and various combinations of materials, e.g., with varying thicknesses, lateral locations, form factors, or combinations thereof. Translating directly from computer-aided design (CAD) models to 3D printed structures can also facilitate optimization around characteristics of the neutron beam 70 to enhance overall performance. For example, this approach can allow inverse design starting from neutron beam sizes, intensities, and energy ranges, and ending with collimator 320 structures that enable such characteristics.

Figure 5G:
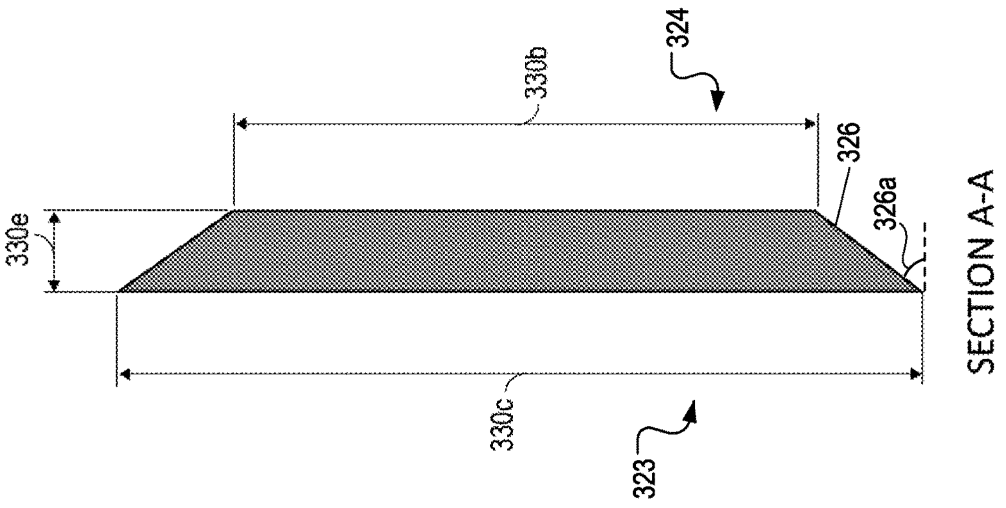
FIGS. 5F and 5G are front and cross-sectional views, respectively, depicting an example of a beam stop.
Figure 5F:
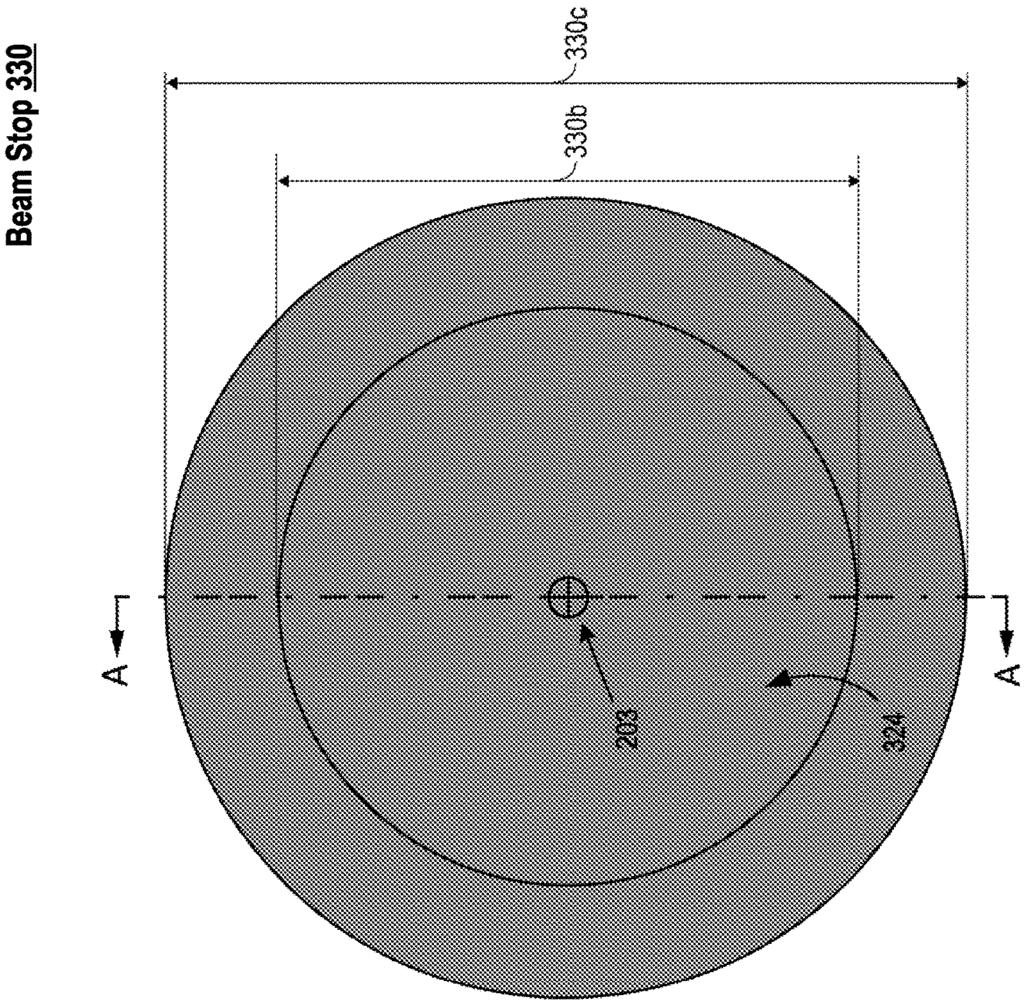

FIG. 5F is a front view of an example beam stop 330. Beam stop 330 can be utilized with one or more neutron beam collimators 320 to provide shielding of persistent gamma radiation in a neutron beam system 100. FIG. 5G is a cross-sectional view of the same beam stop 330 shown in FIG. 5F. In this case, the beam stop 330 is a circularly symmetric solid plate, but as mentioned previously with respect to the collimators 320 in FIGS. 5A-5E, numerous geometries can be realized.

During active use, the beam stop 330 is usually aligned with a beam axis 203 indicating the potential path of a neutron beam 70. Beam stop 330 can be used between BNCT treatments, e.g., when the neutron beam 70 is inactive, to attenuate high-energy photons generated from neutron activation of various beam system 100 components, e.g., target 60, target assembly 65, and NBC 200. Due to the geometry of the NBC 200, residual gamma radiation is generally concentrated along the beam axis 203 and may need specific attention. In some implementations, the beam stop 330 can operate in conjunction with an MRS 360 to provide improved gamma ray shielding.

Beam stop 330 can be of comparable size and shape as a neutron beam collimator 320, excluding an aperture, and composed of high atomic number compounds that absorb gamma rays, e.g., R materials such as lead. Analogous to the example collimators 320 shown in FIGS. 5A-5E, the beam stop 330 can have a thickness 330*e* of about 5 cm or more (e.g., about 6 cm or more, about 7 cm or more, about 8 cm or more, about 9 cm or more, about 10 cm or more) to provide sufficient shielding of high-energy photons. When integrated with a collection of neutron beam collimators 320, e.g., in an NCA 300, a beam stop 330 with the same overall dimensions as the collimators 320 can be beneficial for alignment and position reproducibility. In particular, a snout diameter 330*b*, outer diameter 330*c*, and thickness 330*e* of the beam stop 330 can match the snout diameter 320*b*, outer diameter 320*c*, and thickness 320*e* of a collimator 320. For BNCT applications, the outer diameter 330*c* can be about 30 cm to 60 cm to accommodate a sufficient volume of gamma ray absorbing material.

Figure 5H:
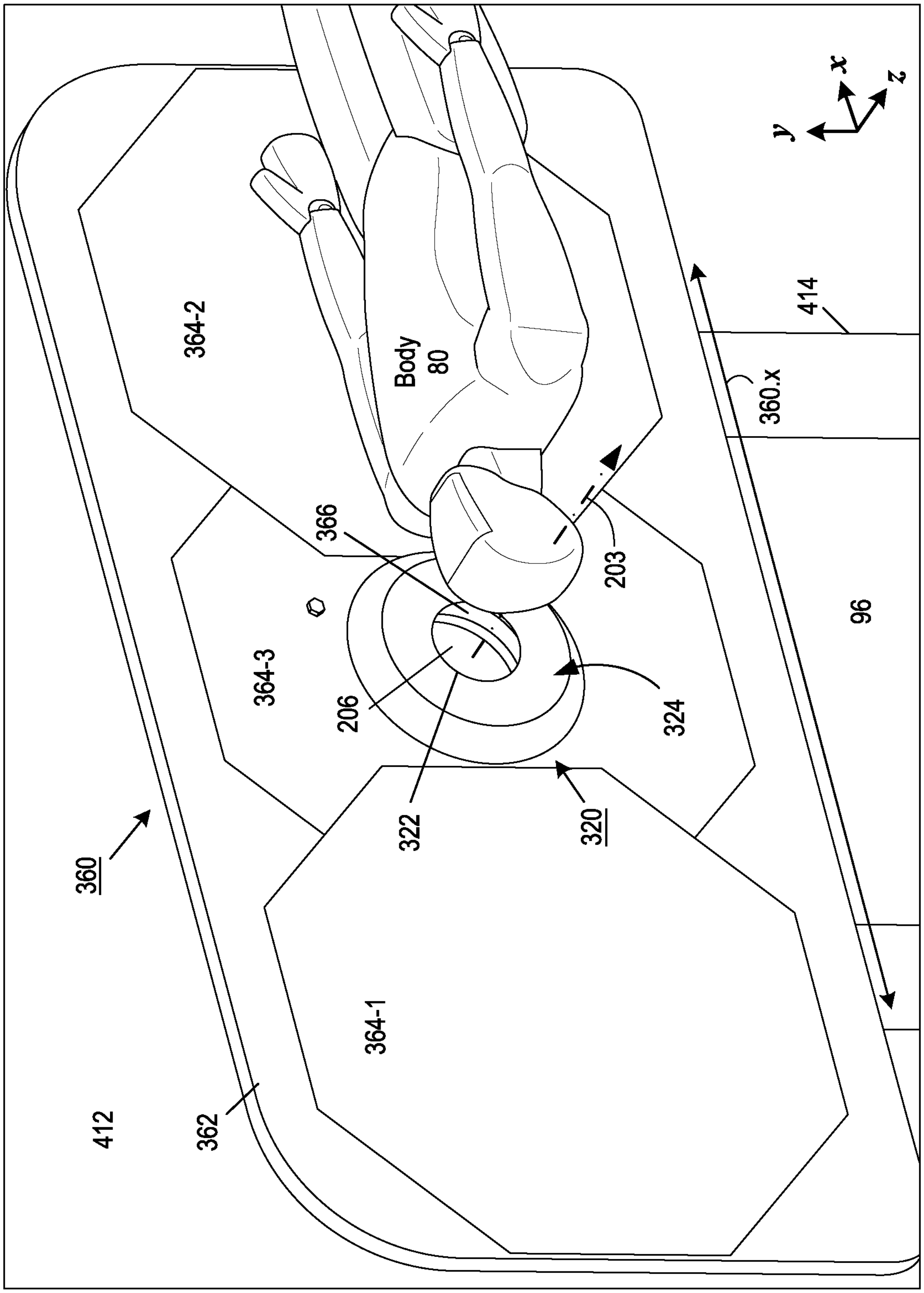
FIG. 5H is an isometric render depicting an example of a neutron beam collimator in a BNCT treatment facility.

FIG. 5H is an isometric render of an example neutron beam collimator 320 in a treatment facility 400 outfitted for BNCT. The same treatment facility 400 is shown in FIG. 4C devoid the neutron beam collimator 320. The collimator 320 is positioned near a beam port 366 of a MRS 360, such that the collimator 320 is aligned with a beam axis 203 and configured to attenuate a neutron beam 70 to a targeted beam diameter. A patient body 80 is orientated relative to the beam axis 203 to receive the neutron beam 70 with the targeted beam diameter. Although not depicted in FIG. 5H, the patient 80 is typically positioned with an adjustable platform 902 (e.g., a robotic couch), see FIGS. 9A-9C for example, that can be controlled (e.g., via actuators) to adjust the elevation and orientation of the patient 80 relative to the collimator 320 and beam axis 203.

However, optimal BNCT treatment may involve using a neutron beam 70 with numerous beam sizes (e.g., beam diameters) for a single patient 80. FIG. 5H illustrates the physical constraints involved in automatically exchanging collimators 320 during active BNCT. To ensure sufficient neutron beam intensity exiting the collimator 320, the collimator 320 is situated in direct contact, or almost in direct contact, with the beam port 366. The patient 80 can be close enough to the collimator 320 that body parts of the patient 80, such as head and shoulders, can be obstacles for the collimator 320 and various collimation equipment. Furthermore, due to potential radiation exposure, a clinician cannot safely enter the treatment room 420 to reposition the patient 80 or manually exchange collimators 320 mid-treatment. To remedy this, a suitable NCA 300, such as the example NCAs 300 discussed below, can automatically exchange collimators 320 safely and with limited maneuverability near the patient 80.

Overview of Neutron Collimator Assemblies

Figure 6A:
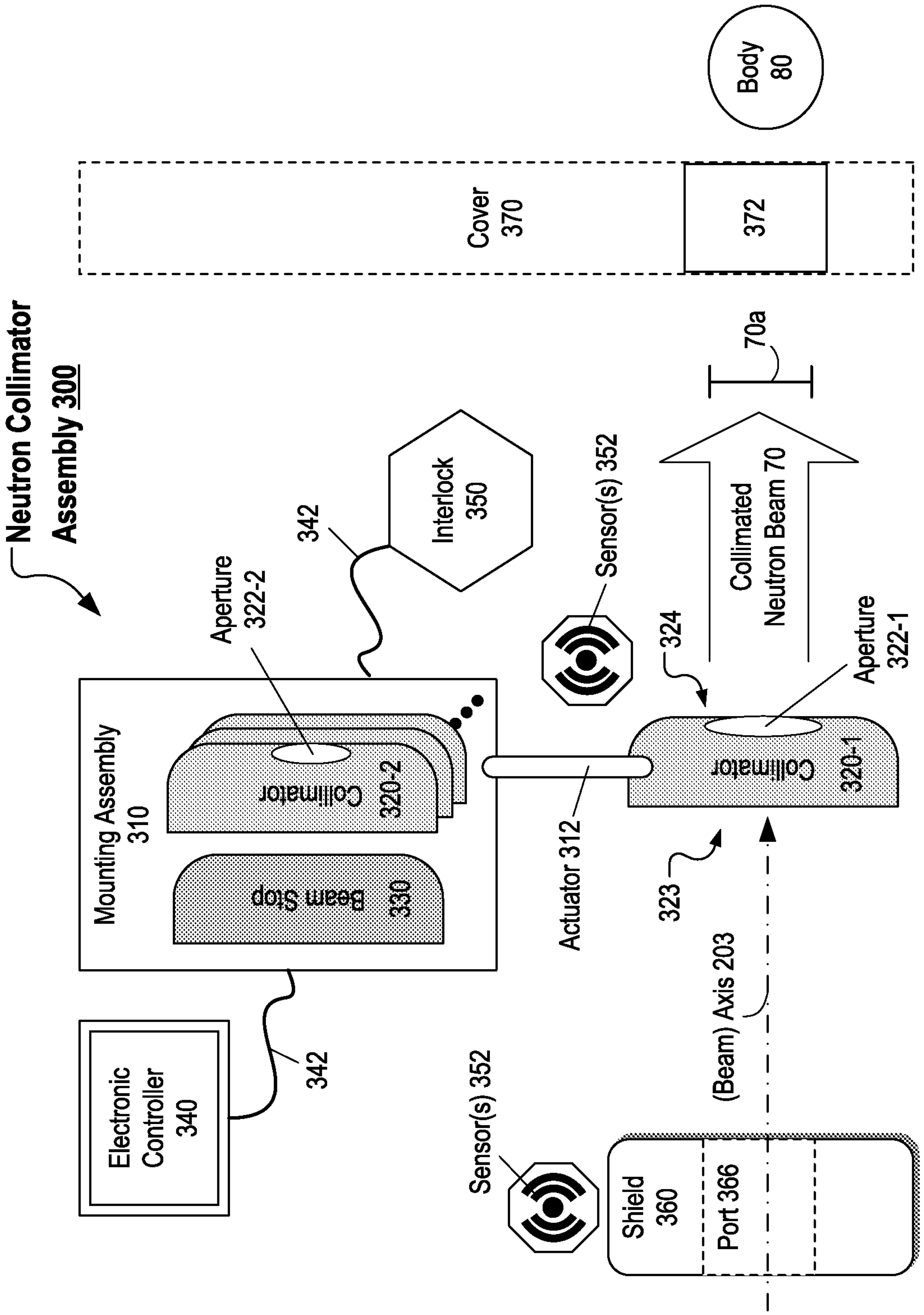
FIG. 6A is a schematic view depicting an example of a neutron collimator assembly.
Figure 6B:
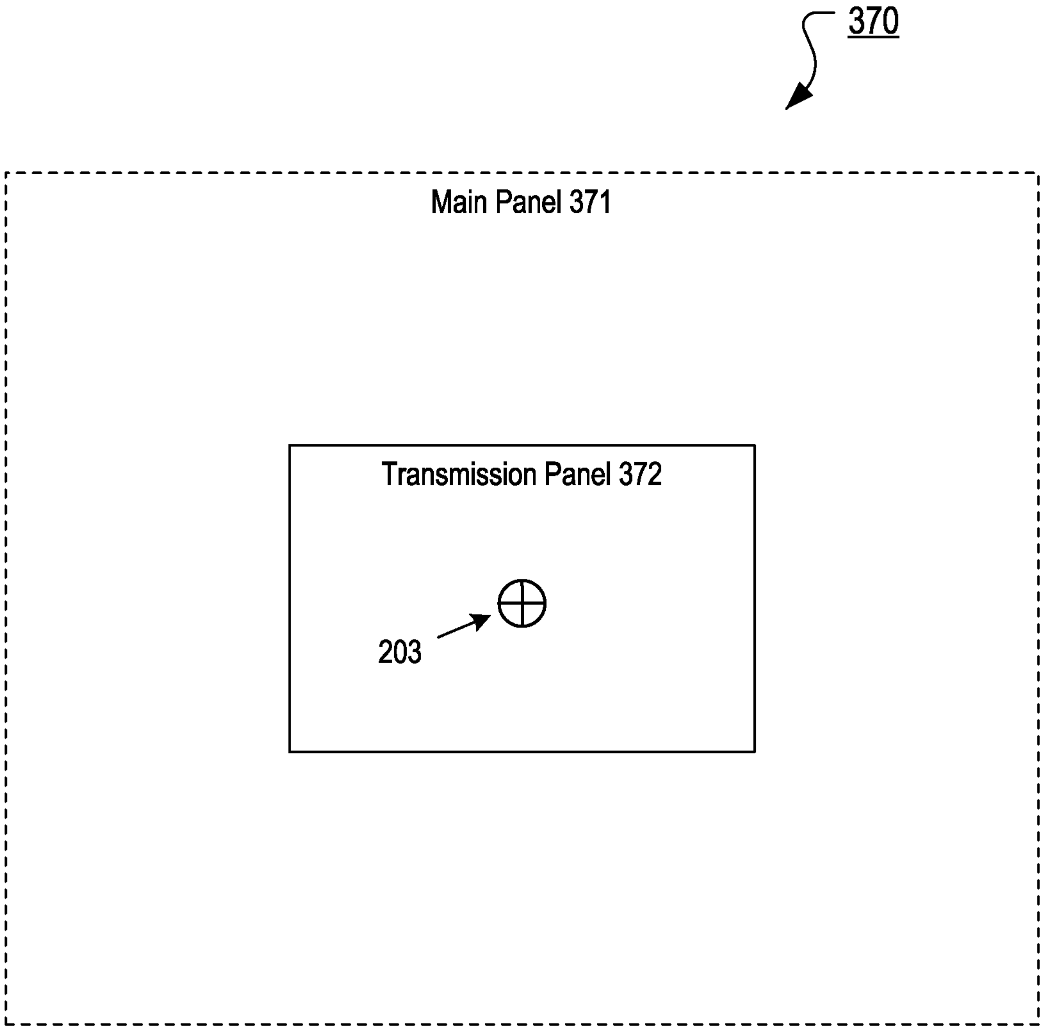
FIG. 6B is a front view depicting an example of a safety cover.

FIG. 6A is a schematic view of an example neutron collimator assembly (NCA) 300 that can provide variable collimation of a neutron beam 70 for a neutron beam system 100. An MRS 360 and safety cover 370 are also depicted in FIG. 6A as these apparatuses generally operate in combination with NCA 300 during BNCT procedures, although NCA 300 can be used with or without MRS 360 and/or safety cover 370. FIG. 6B is a front view of an example safety cover 370 that can be integrated with NCA 300 as a safety measure when NCA 300 is used to collimate neutron beams 70 for BNCT. Note that MRS 360 and/or safety cover 370 can be used with any and all examples of NCA 300 described herein.

NCA 300 is downstream from MRS 360 and is configured to receive a neutron beam 70 propagating along a beam axis 203. For example, the neutron beam 70 can emanate from a neutron-generating target 60 which has been converted to a deliverable form (e.g., in an epithermal energy range) by an NBC 200. When the neutron beam 70 is active, MRS 360 can align a beam port 366 with the beam axis 203 to deliver the neutron beam 70 toward NCA 300. A neutron beam collimator 320-1 aligned with the beam axis 203 accepts the neutron beam 70 at a proximal face 323 and outputs a collimated neutron beam 70 at a distal face 324 with a target beam size 70*a*. The target beam size 70*a* depends (at least in part) on characteristics of an aperture 322-1 of the collimator 320-1. Safety cover 370 is downstream from NCA 300 and is configured to transmit the collimated neutron beam 70 through a transmission panel 372 in order to irradiate a patient body 80 with the target beam size 70*a*.

NCA 300 includes a mounting assembly 310 that mechanically supports multiple neutron beam collimators 320 for variable beam collimation and a beam stop 330 to shield against gamma rays. Mounting assembly 310 usually supports at least four collimators 320 to ensure sufficient beam size 70*a* variability, however, the precise number of collimators 320 can differ depending on the particular implementation. For example, NCA 300 can include two, three, four, five, six, seven, eight, nine, ten, or more neutron beam collimators 320. Each collimator 320 can possess different physical properties to realize different targeted features of the collimated neutron beam 70. For example, each collimator 320 can have a different aperture size, aperture shape, thickness, outer perimeter, outer surface shape, materials, or combinations thereof. Nevertheless, some dimensional uniformity between collimators 320 such as aperture shape, thickness, and outer perimeter can be advantageous for alignment and position reproducibility. Alternatively, or in addition, collimators 320 can be replaced within the NCA 300 in case different sized apertures 322 are needed and/or the collimators 320 exceed their operational lifetimes. For example, the mounting assembly 310 can include releasable and/or temporary fasteners that allow the collimators 320 to be secured to, and later removed from, the mounting assembly 310 at any given time.

NCA 300 supporting a large number of collimators 320 can provide considerable versatility for BNCT applications but this is often limited by practical constraints, along with potential safety hazards. For example, collimators 320 not in active use can stream radiation into undesired directions and involuntarily increase the neutron dose rate to the patient 80. NCA 300 can appropriately arrange inactive collimators 320 so the neutron dose rate to patients increases, at most, by about 1% (e.g., about 0.9%, about 0.8%, about 0.7%, about 0.6%, about 0.5%) due to these radiation streaming effects.

The mounting assembly 310 is equipped with one or more electro-mechanical actuators 312 that are mechanically coupled to the collimators 320 and beam stop 330 to perform various functions. In particular, actuators 312 can translate and orientate collimators 320 relative to the beam axis 203 in order to exchanges collimators 320 and adjust the beam size 70*a* of the neutron beam 70. For demonstrative purposes, FIG. 6A shows an actuator 312 directly attached to a collimator 320-1 to provide independent motion. However, actuators 312 can also translate the mounting assembly 310 itself and multiple collimators 320 in unison, e.g., by supporting the collimators 320 with a rigid body. Depending on the geometry and mechanics of the NCA 300, each collimator 320 can linearly translate along one or more axes, rotate about one or more axes, or a combination of both linear and rotational motion to exchange collimators 320. NCA 300 can be mounted above, below, to either side of, or across the beam axis 203 such that the motion of the NCA 300 changes which collimator 320 (or beam stop 330) is aligned with the beam axis 203.

To enable linear translation of collimators 320 along specific axes, the electro-mechanical actuators 312 can include one or more linear actuators. Any suitable type of linear actuator can be implemented to accommodate a desired load capacity, speed, duty cycle, position reproducibility, and maximum travel length. For example, the linear actuators can include belt-driven actuators, screw-driven actuators, rack-and-pinion driven actuators, and linear motor driven actuators. Likewise, the electro-mechanical actuators 312 can also include one or more rotary actuators to enable rotation of collimators 320 about specific axes. For example, the rotary actuators can include DC motors, AC servomotors, and stepper motors which can be chosen for a desired rotational speed, torque, duty cycle, and angular reproducibility.

Note that a linear actuator can also cause collimators 320 to rotate about an axis and a rotary actuator can also cause collimators 320 to translate about an axis depending on the installation of the actuators 312 relative to the mounting assembly 310 of NCA 300. For example, a linear actuator can cause a rigid body to pivot about a fulcrum and a rotary actuator can be implemented as a motorized wheel or pulley system. As will be illustrated in the proceeding examples, the mounting assembly 310 and collimators 320 of NCA 300 can translate and rotate in numerous different ways to exchange collimators 320 (and beam stop 330).

The one or more electro-mechanical actuators 312 can be implemented to minimize exchange time and position reproducibility of collimators 320 and beam stop 330. With respect to BNCT, these metrics directly influence total treatment time and the quality of the neutron beam 70 delivered to the patient 80. The exchange time can be about 30 sec or less (e.g., about 25 sec or less, about 20 sec or less, about 15 sec or less, about 10 sec or less) with a position reproducibility in all directions of about 1 mm or less (e.g., about 0.9 mm or less, about 0.8 mm or less, about 0.7 mm or less, about 0.6 mm or less, about 0.5 mm or less).

To realize automatic collimator 320 exchange, an electronic controller 340 is in communication with the one or more electro-mechanical actuators 312. An automatic NCA 300 can mitigate radiation exposure to clinicians since the controller 340 can be interfaced outside a BNCT treatment room 420. FIG. 6A shows the controller 340 communicating via cabling 342 but communications can also be implemented wirelessly, e.g., Bluetooth, Wi-Fi, 5G, wireless local area networks (WLANs), or other wireless communications system.

Electronic controller 340 can employ any suitable control system to direct and regulate the actuators 312 according to some desired movement of the NCA 300. In general, the controller 340 is programmed (e.g., with treatment delivery software) to generate control signals that cause the actuators 312 to remove a first collimator 320-1 from the beam axis 203 and align a second collimator 320-2 with the beam axis 203. Controller 340 can also cause the actuators 312 to align the beam stop 330 with the beam axis 203 to shield against gamma rays, or align no collimator 320 nor beam stop 330 with the beam axis 203 to facilitate an open beam diameter. The controller 340 can include linear feedback controllers (e.g., proportional-integral-derivative (PID) controllers), nonlinear feedback controllers, or combinations of both to generate control signals and implement a suitable control loop. The electro-mechanical actuators 312 can provide feedback to the electronic controller 340 in order to execute the control loop.

The electronic controller 340 can also be programmed to actuate the MRS 360. MRS 360 can operate in unison with beam stop 330 to provide optimal gamma ray shielding when neutron beam 70 is inactive. The combination of which can provide about 9 cm or more (e.g., about 10 cm or more, about 11 cm or more, about 12 cm or more, about 13 cm or more, about 14 cm or more, about 15 cm or more) of gamma ray shielding along the beam axis 203. In some implementations, NCA 300 and MRS 360 can have a manual mechanism and/or a back-up power supply as a failsafe in order to achieve adequate gamma ray shielding in the event of power loss. For example, NCA 300 and MRS 360 can include manual overrides for their respective actuators 312 that allows the beam stop 330 and MRS 360 to be manipulated into place by a clinician.

Due to the risk of collisions, NCA 300 can be implemented such that the independent motion of the collimators 320 and MRS 360 do not interfere. For example, the NCA 300 can fix the motion of the collimators 320 and MRS 360 to separate planes and/or use a safety interlock system 350 to detect possible collisions and halt movement in response. The interlock system 350 can include one or more types of sensory devices 352 (e.g., mechanical, electric, magnetic, optical, infrared, mm-Wave, and others) in combination with processing or control circuitry to accomplish this task, as well as other related tasks. Interlock system 350 can also verify a current MRS 360 position is consistent with beam active or beam inactive conditions, e.g., using sensors 352 to measure and confirm the position of MRS 360 and/or a beam port 366. Alternatively, or in addition, interlock system 350 can verify a current collimator 320 aligned with beam axis 203 agrees with a chosen collimator determined by the controller 340 programming, e.g., using sensors 352 to measure and confirm the aperture size 322-1 of the particular collimator 320-1 positioned on the beam axis 203.

Referring now to FIG. 6B, which shows a front view of the safety cover 370 arranged in a plane orthogonal to the beam axis 203. The primary function of cover 370 is to conceal operations of the NCA 300 from the patient 80, along with preventing motional interference if the patient 80 attempts to interact with NCA 300. Hence, the safety cover 370 is generally composed of relatively hard (e.g., stiff, or inelastic) materials to form a barrier between the patient 80 and NCA 300. Any uncovered NCA 300 components that present non-negligible pinch or collision risks to the patient 80 can include collision sensors 352 connected to the interlock system 350. When the sensors 352 detect a potential collision with the patient 80, the interlock system 350 can halt movement of the NCA 300 and/or MRS 360.

In some implementations, all moveable components of the NCA 300 and MRS 360 are concealed by the safety cover 370 to eliminate any mechanical safety hazards to the patient 80.

In some implementations, in the event of an emergency stop (ESTOP) of BNCT treatment, strictly NCA 300 and MRS 360 components that are untouchable by the patient 80 can have movement. This ensures gamma ray shielding (e.g., MRS 360 and/or beam stop 330) can automatically move into place and alleviates any risk of injuring the patient 80.

FIG. 6B illustrates two regions of the safety cover 370, a main panel 371 and a transmission panel 372. Main panel 371 is configured as a barrier between the patient 80 and NCA 300 while having a relatively low affinity for neutron capture. Transmission panel 372 is also configured as a barrier while permitting transmission of the neutron beam 70 along beam axis 203. Although panels 371 and 372 are depicted as rectangles, the two regions are separated based on functions and materials, not necessarily size and shape. The panels 371 and 372 can be any suitably sized portion of the safety cover 370 to fulfil their specific roles.

The main panel 371 can include materials with relatively low neutron activation to ensure the treatment room 420 is not exposed to unnecessary gamma radiation between BNCT treatments. For example, main panel 371 can be composed of non-metals (primarily organic or ceramic), e.g., carbon fiber, wood, fiber panels, gypsum, fiberglass, glass, boron carbide, and beryllium oxide. To achieve suitable performance, main panel 371 can have a thickness of about 3 mm to 13 mm.

The transmission panel 372 can include materials that are transparent to neutrons (e.g., epithermal neutrons) and therefore does not significantly affect the neutron beam 70 passing through it. This ensures the patient 80 is protected from mechanical safety hazards of the MRS 360 and/or NCA 300 while still receiving the neutron beam 70 in a deliverable form. In particular, the clinical requirements of the neutron beam 70 can still be met and reduced, at most, by about 10% (e.g., about 9%, about 8%, about 7%, about 6, about 5%) relative to uncovered values. For example, transmission panel 372 can be composed of any of the materials mentioned above for the main panel 371 and/or materials adept at absorbing thermal neutrons (e.g., Ab materials such as lithium carbonate, borosilicate fiberglass, among others). To achieve suitable performance, transmission panel 372 can have a thickness of about 0.5 mm to 10 mm.

Other performance metrics related to BNCT applications are outlined below. These metrics can place additional operating constraints on NCA 300 which are borne out in the following examples.

As mentioned previously, the size of a treatment room 420 and proximity to a patient 80 can be a severe impediment due to typical dimensions and weights of neutron beam collimators 320. With respect to the model treatment facility depicted in FIG. 3B, the NCA 300 can be implemented to not exceed the ceiling height 420*c* (or the false ceiling height 420*b*), as well as not interfere with the treatment room 420's walls or finished floor locations.

That being said, the size constraints are often compounded since the intensity of a neutron beam 70 can diminish rapidly the farther it propagates from a neutron-generating target 60. Hence, the NCA 300 is generally in close proximity to the MRS 360, as well as the patient 80 receiving BNCT, with limited maneuverability near a facility wall 412. To ensure suitable intensity of the neutron beam 70 during BNCT, the distal face 324 of any collimator 320 aligned on the beam axis 203 can be about 50 cm or less (e.g., about 45 cm or less, about 40 cm or less, about 35 cm or less, about 30 cm or less, about 25 cm or less) from the target 60.

To support patient maneuverability, NCA 300 can accommodate about 5 cm or more (e.g., about 6 cm or more, about 7 cm or more, about 8 cm or more, about 9 cm or more, about 10 cm or more) of space in a proximal-distal face direction, at a distance of about 15 cm to 30 cm below the beam axis 203.

Using suitably designed collimators 320, such as those depicted in FIGS. 5A-5E, NCA 300 can reproduce targeted beam diameters with error of about ±0.5 cm or less (e.g., about ±0.4 cm or less, about ±0.3 cm or less, about ±0.2 cm or less, about ±0.1 cm or less). Alternatively, or in addition, NCA 300 can reproduce target beam diameters with circular asymmetry, e.g., a maximum asymmetry through vertical, horizontal, and ±45° beam slices, of about 1% or less (e.g., about 0.9% or less, about 0.8% or less, about 0.7% or less, about 0.6% or less, about 0.5% or less).

By means of a 10 milliamp (mA), 2.5 MeV proton beam rastered over a 10 cm-diameter circle in the target assembly 65, the epithermal neutron flux measured on beam axis 203 at the exit of the distal face 324 of any neutron beam collimator 320 can be about $5\times10^8$ epithermal neutrons/cm$^2$/sec or more (e.g., about $7.5\times10^8$ epithermal neutrons/cm$^2$/sec or more, about $1\times10^9$ epithermal neutrons/cm$^2$/sec or more, about $1.50\times10^9$ epithermal neutrons/cm$^2$/sec or more).

The neutron beam 70 exiting all distal faces 324 can meet the clinical requirements for advantage depth (e.g., about 10 cm or more, about 11 cm or more, about 12 cm or more), treatable depth (e.g., about 8 cm or more, about 9 cm or more, about 10 cm or more), and treatment time (e.g., about 35 min or less, about 30 min or less, about 25 min or less, about 20 min or less, about 15 min or less).

Advantage depth is the depth along beam axis 203 where the neutron dose to tumor tissue equals the maximum neutron dose to normal tissue. Treatable depth is the depth along the beam axis 203 where the tumor neutron dose equals twice the maximum neutron dose to normal tissue.

Treatment time can be estimated as the time to reach the maximum allowable neutron dose (about 12.5 Gray-Equivalent ($Gy_{eq}$), e.g., about 10 $Gy_{eq}$ to 15 $Gy_{eq}$) to normal tissue. A comprehensive and clinically focused review of these metrics, as well as other figures of merit, is provided by Torres-Sanchez, P., Porras, I., Ramos-Chernenko, N. et al. "Optimized beam shaping assembly for a 2.1-MeV proton-accelerator-based neutron source for boron neutron capture therapy," in Sci Rep 11, 7576 (2021).

Examples of Neutron Collimator Assemblies

Figure 7A:
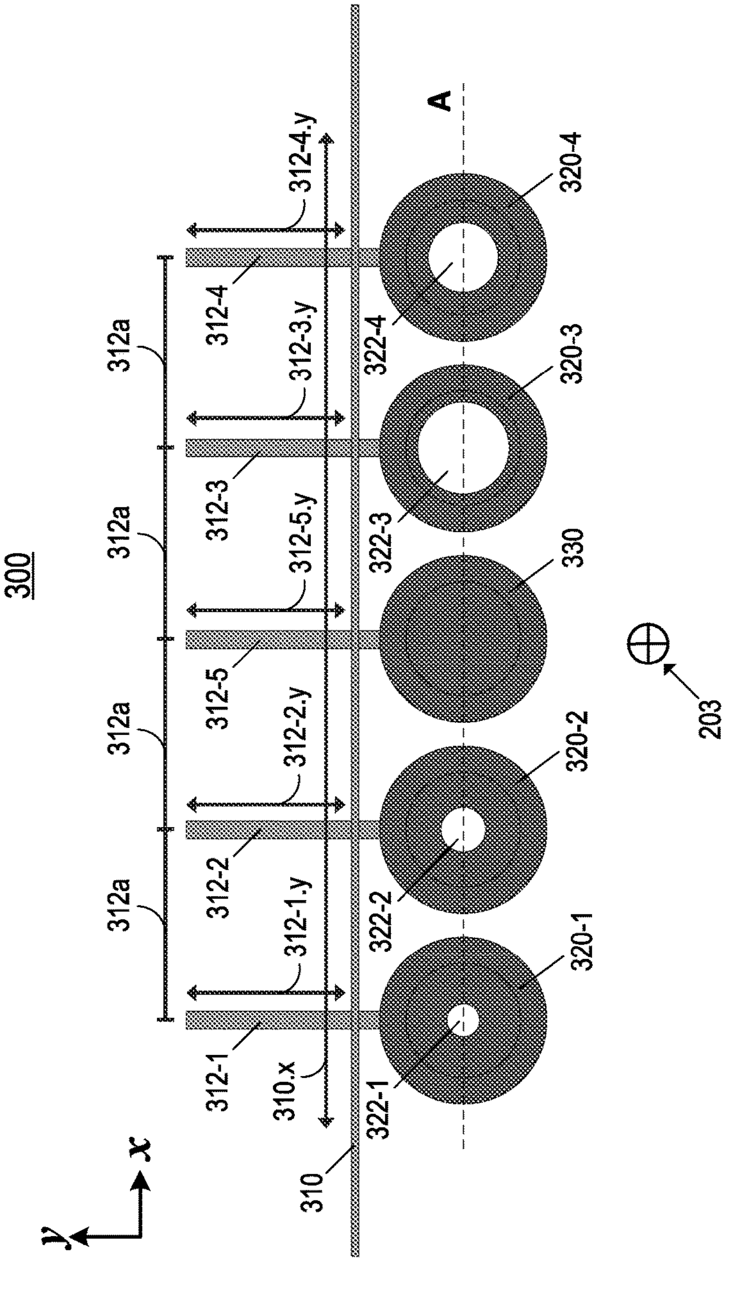
FIGS. 7A-7C are various views depicting an example of a neutron collimator assembly.
Figure 7B:
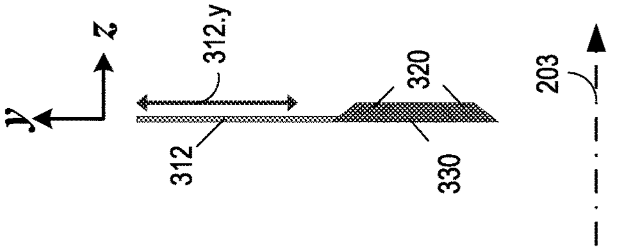
Figure 7C:
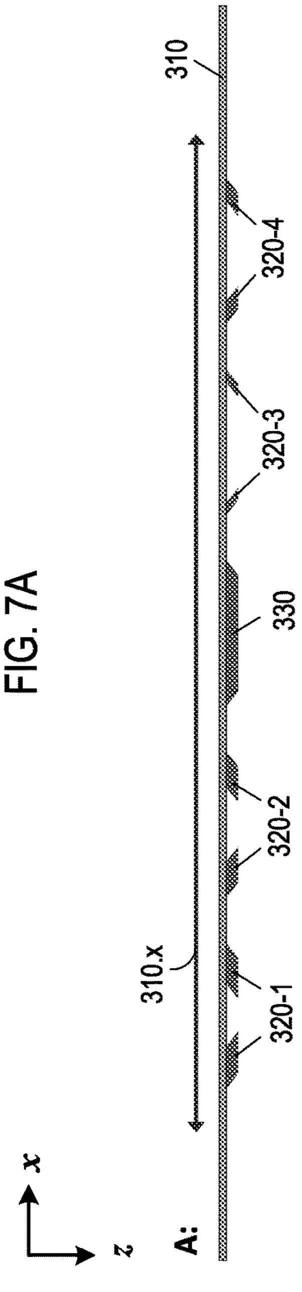

FIGS. 7A, 7B, and 7C are front, side, and top views, respectively, of an example NCA 300 that can automatically exchange neutron beam collimators 320 and a beam stop 330 aligned with a beam axis 203. An electronic controller 340 is not depicted in FIGS. 7A-7C but communications with electro-mechanical actuators 312 of the NCA 300 can be assumed to provide programmable control signals for a suitable movement control loop. NCA 300 is installed above the beam axis 203 to perform various functions on a neutron beam 70 delivered along the beam axis 203, e.g., adjust a beam diameter 70*a* of the neutron beam 70 and shield from persistent gamma radiation.

In this example, the NCA 300 includes a beam stop 330 and four neutron beam collimators 320-1 through 320-4 with different respective aperture sizes 322-1 through 322-4. In this case, the collimators 320 and beam stop 330 are circularly symmetric with identical outer profiles. That is, thicknesses, snout diameters, and outer diameters are identical (or nearly identical) between collimators 320 and beam stop 330. This uniformity can improve alignment and position reproducibility, as well as facilitating straightforward replacement of collimators 320 if different aperture sizes 322 are needed.

Collimators 320 and beam stop 330 are mechanically supported by a mounting assembly 310 that fixes their movement to a common x-y plane. In other words, movement is restricted in the z direction. A suitably designed NCA 300 with limited translational and/or rotational degrees of freedom can be desirable since fewer actuators 312 are usually involved. This reduces mechanical complexity of the NCA 300 while still preserving versatile maneuverability. Moreover, NCA 300 with a planar configuration is particularly effective at realizing compact geometries in one dimension (z dimension), which can be beneficial for BNCT applications due to size constraints. For example, the NCA 300 can be supported on a facility wall 412 of a treatment 400 in close proximity to an MRS 360 and/or NBC 200.

FIGS. 7A-7C depict collimators 320 and beam stop 330 in an upmost (open beam) position with the beam stop 330 located directly above the beam axis 203. Hence, NCA 300 can arrange unused collimators 320 and beam stop 330 in positions that do not interfere with a patient or other equipment, as well as mitigating radiation streaming effects. Each collimator 320-1 through 320-4 and beam stop 330 is mechanically coupled to a respective electro-mechanical actuator 312-1 through 312-5 that enables independent vertical translation 312-1.*y* through 312-5.*y* in the y dimension. For example, each electro-mechanical actuator 312 can include a respective linear actuator to enable the independent vertical translation 312.*y* of each collimator 320 and beam stop 330 along a vertical axis that intersects and is orthogonal to the beam axis 203.

In general, each collimator 320 and beam stop 330 can translate vertically 312.*y* freely via a corresponding actuator 312. However, restricting vertical motion to a single collimator 320 or beam step 330 at any given time can alleviate collisional risks with BNCT equipment and other beam system 100 components. In some implementations, vertical translation 312.*y* is restricted to the collimator 320 or beam stop 330 directly above the beam axis 203, further limiting unnecessary motion.

The electro-mechanical actuators 312 can horizontally translate 310.*x* all the collimators 320 and the beam stop 330 simultaneously along the mounting assembly 310. For example, each electro-mechanical actuators 312 can include a respective rotary actuator functioning as a motorized wheel to horizontally translate 310.*x* the collimators 320 and beam stop 330 along a horizontal axis that is offset and orthogonal to the beam axis 203. Alternatively, or in addition, the mounting assembly 310 itself can horizontally translate 310.*x* as a rigid body, thereby translating the collimators 320 and beam stop 330 in unison. For example, a linear actuator can be mechanically coupled to the mounting assembly 310 to enable horizontal translate 310.*x*.

In either case, a fixed spatial separation 312*a* is maintained between each collimator 320 and beam stop 330 as they translate in the x dimension. This can mitigate potential collisions between components of the NCA 300 itself, as well as improve alignment and position reproducibility. However, different spatial separations 312*a* between collimators 320 and beam stop 330 can also be realized, for example, if collimators 320 and beam stop 330 do not have uniform outer shapes and sizes. In some implementations, the NCA 300 horizontally translates 310.*x* strictly when collimators 320 and beam stop 330 are in an upmost (open beam) position. Again, this can limit extraneous degrees of freedom and reduce collisional risks.

Figure 7D:
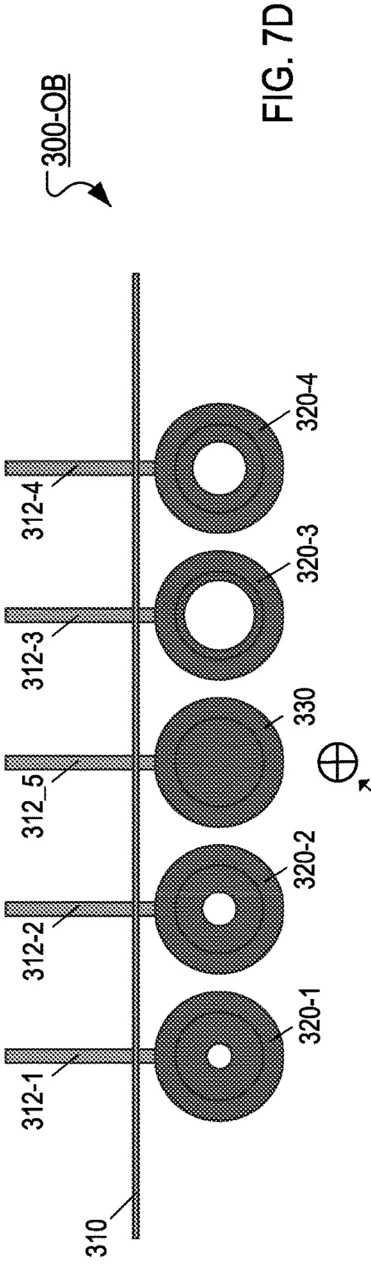
FIGS. 7D-7F are front views depicting the example neutron collimator assembly of FIGS. 7A-7C in different stationary positions.
Figure 7E:
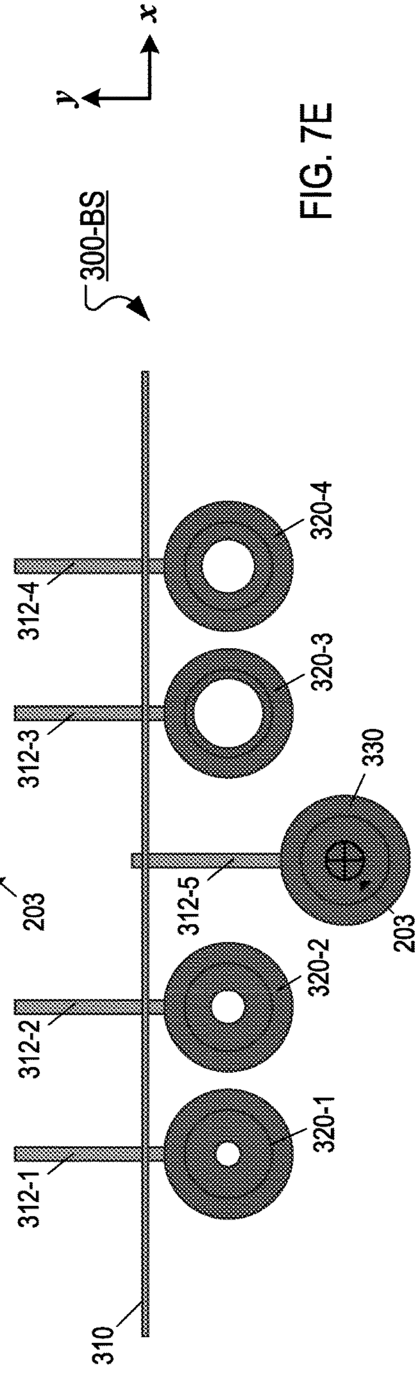
Figure 7F:
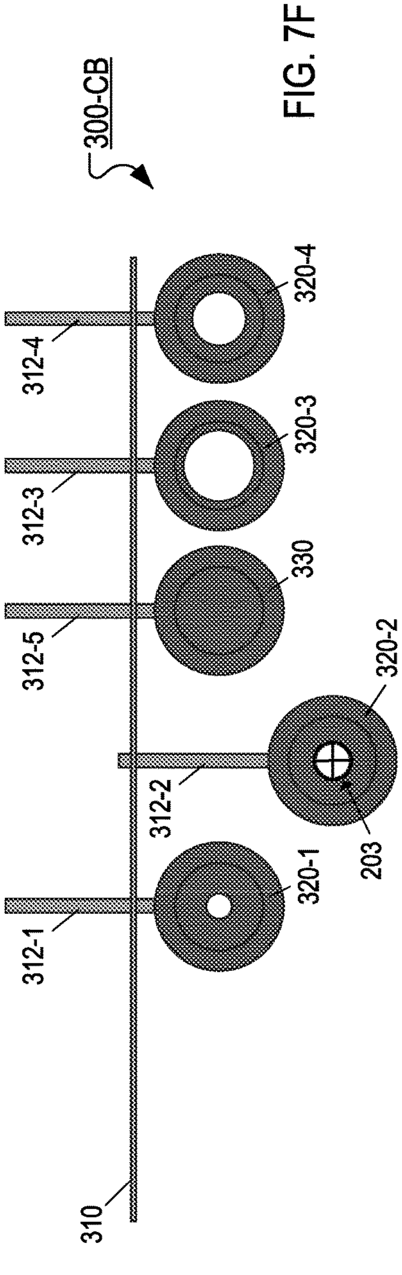

FIGS. 7D-7F are front views of the example NCA 300 shown in FIGS. 7A-7C, with the neutron beam collimators 320-1 through 320-4 and beam stop 330 depicted in various stationary positions relative to the (fixed) beam axis 203.

FIG. 7D shows the NCA 300-OB in an upmost (open beam) position with no collimator 320 or beam stop 330 aligned with the beam axis 203. In this case, an open beam diameter can be supported for BNCT if a neutron beam 70 is active.

FIG. 7E shows the NCA 300-BS in a stationary position with beam stop 330 aligned with the beam axis 203. This implies an inactive neutron beam 70 condition where beam stop 330 shields against residual gamma radiation. The beam stop 330 can translate downward (−y direction) from the position in FIG. 7D to the position in FIG. 7E.

FIG. 7F shows the NCA 300-CB in a stationary position with the second collimator 320-2 aligned with the beam axis 203, implying an active neutron beam 70 condition. To reach the position in FIG. 7F from the position in FIG. 7E, NCA 300 can perform three steps: (i) beam stop 330 can translate upward (+y direction) to an upmost position, (ii) all collimators 320 and beam stop 330 can simultaneously translate rightward (+x direction) a distance equal to the fixed spatial separation 312*a*, and (iii) the second collimator 320-2 can translate downward (−y direction) to align with the beam axis 203.

Figure 7H:
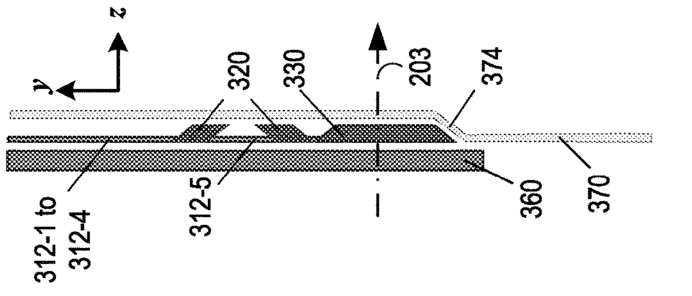
FIGS. 7G-7I are various views depicting the example neutron collimator assembly of FIGS. 7A-7C, including a moveable radiation shield and a safety cover.
Figure 7G:
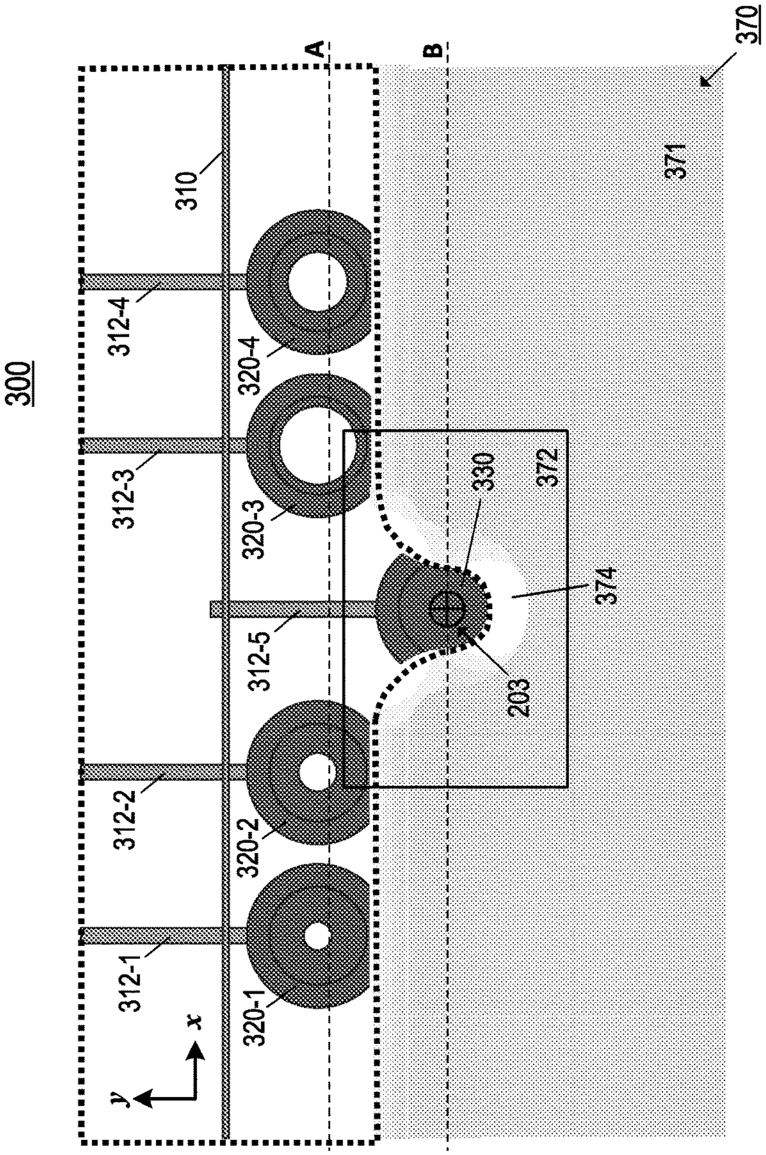
Figure 7I:
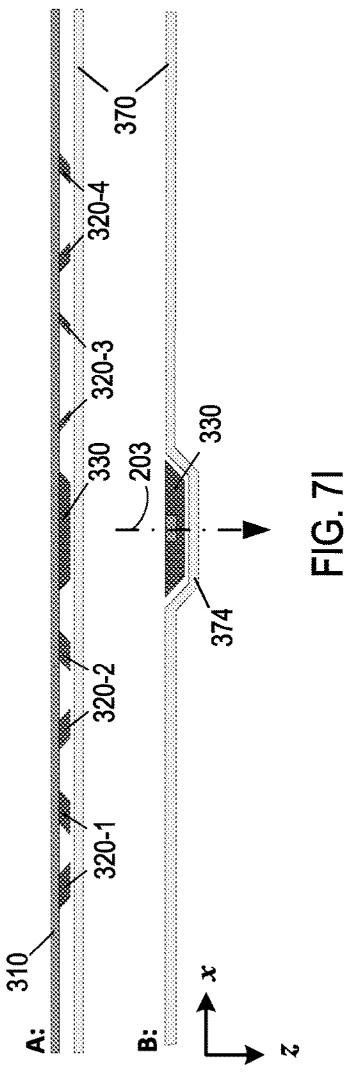

FIGS. 7G, 7H, and 7I are front, side, and top views, respectively, of the example NCA 300 shown in FIGS. 7A-7F, including an MRS 360 and a safety cover 370. For demonstrative purposes, a top portion of the cover 370 is not depicted since it would generally be optically opaque in practice. A dotted line in FIG. 7G indicates the region of the top portion that obscures components of the NCA 300. Safety cover 370 includes a transmission panel 372 composed of materials that are transparent to neutrons and therefore does not significantly affect properties of the neutron beam 70 propagating along the beam axis 203. Main panel 371 is composed of materials with relatively low neutron activation and therefore does not generate a significant number of radioactive isotopes.

In this example, the safety cover 370 also includes a cavity 374 that conforms to the uniform profiles of the neutron beam collimators 320 and beam stop 330. The cavity 374 is coincident with the beam axis 203 and supports the collimator 320 and beam stop 330 of NCA 300 in various stationary positions. That is, the cavity 374 can act as a fixed guide for each collimator 320-1 through 320-4 and beam stop 330 as they are being aligned with the beam axis 203. As a result, the cavity 374 can aid in alignment and position reproducibility of the collimators 320 and beam stop 330. In some implementations, one or more sensors 352 (e.g., mechanical, magnetic, and/or optical sensors) of the interlock system 350 can be positioned in the cavity 374 to validate the selected collimator 320 or beam stop 330 agrees with the controller 340 programming.

As shown in FIGS. 7G-7I, the example NCA 300 can be implemented in settings where compactness is valuable, e.g., BNCT applications. In this case, a total depth in the z dimension is generally limited by the thicknesses of the MRS 360 and the collimators 320 and beam stop 330. For BNCT, the total depth can be as little as about 9 cm (e.g., about 10 cm, about 11 cm, about 12 cm, about 13 cm, about 14 cm, about 15 cm) which is roughly the amount of shielding necessary along beam axis 203 to ensure safe gamma ray dose rates in a BNCT treatment room 420.

FIGS. 8A-8E are isometric renders depicting additional examples of NCA 300 in a treatment facility 400 outfitted for BNCT. The example NCAs 300 are situated near an NBC 200 to adjust the size of a neuron beam 70 delivered along a beam axis 203. Although not depicted in FIGS. 8A-8E, an MRS 360 and/or a safety cover 370 can also be implemented with the NCAs 300. A patient body 80 is orientated relative to the beam axis 203 to show proximity with the example NCAs 300 while receiving the neutron beam 70. For clarity, electro-mechanical actuators 312 and electronic controller (s) 340 are omitted from FIGS. 8A-8E. However, suitable mechanical coupling between actuators 312, mounting assemblies 310, and other components of the NCAs 300 can be assumed to facilitate a respective sequence of movements, each of which is described in detail below.

Figure 8A:
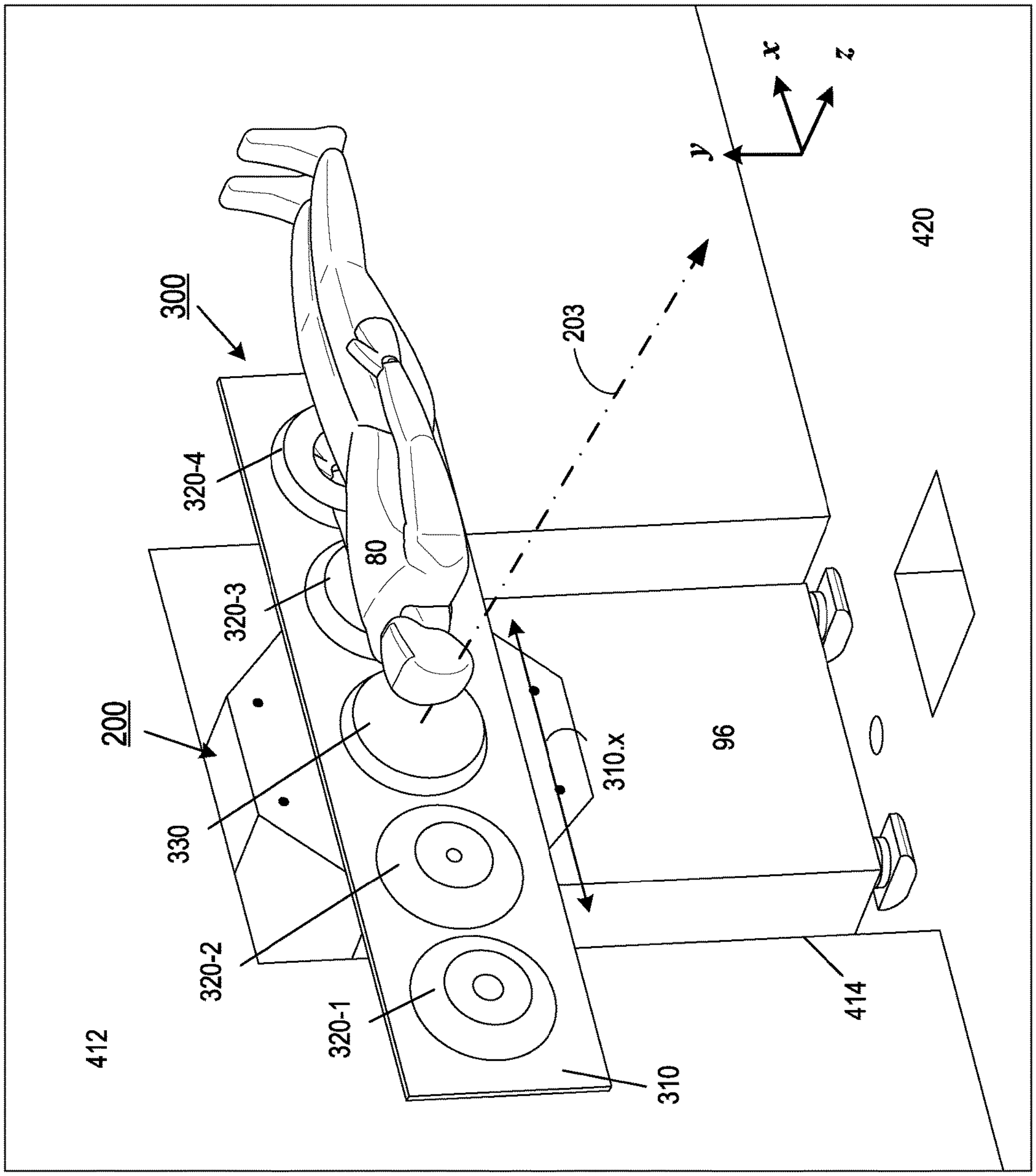
FIGS. 8A-8E are isometric renders depicting additional examples of neutron collimator assemblies.

FIG. 8A shows an example NCA 300 with four neutron beam collimators 320-1 through 320-4 and a beam stop 330 attached to a mounting assembly 310 configured as a rigid body. In this example, the mounting assembly 310 is configured to translate to exchange collimators 320 and beam stop 330. NCA 300 can be installed across the beam axis 203 in order to automatically exchange collimators 320 and adjust the size of the neutron beam 70. The mounting assembly 310 maintains a fixed spatial separation between each collimator 320-1 through 320-4 and beam stop 330 along a straight line segment. Mounting assembly 310 also constrains the collimators 320 and beam stop 330 to horizontally translate 310.*x* simultaneously in a single x dimension. Hence, the electro-mechanical actuators 312 can include a linear actuator mechanically coupled to the mounting assembly 310 to horizontally translate 310.*x* the mounting assembly 310, allowing different collimators 320-1 through 320-4 or the beam stop 330 to be aligned with the beam axis 203 at a given time. The mounting assembly 310 can also horizontally translate 310.*x* to a position where no collimator 320 or the beam stop 330 is aligned with the beam axis 203 to support an open beam diameter.

An advantage of this example NCA 300 is the simplistic design due to having a single translational degree of freedom. The mounting assembly 310 can also position the collimators 320 and beam stop 330 along a vertical line segment and vertically translate to exchange each collimator 320 and beam stop 330. In general, the mounting assembly 310 can translate along any axis that intersects and is orthogonal to the beam axis 203 to exchange components.

More generally, in some implementations, the mounting assembly 310 arranges the collimators 320 and beam stop 330 in a common plane orthogonal the beam axis 203, e.g., the x-y plane with respect to FIG. 8A. In this case, the electro-mechanical actuators 312 can include multiple linear actuators mechanically coupled to the mounting assembly 310, e.g., one for horizontal translation and one for vertical translation. The electro-mechanical actuators 312 can then exchange collimators 320 and beam stop 330 by translating the mounting assembly 310 in the common plane, e.g., in both x and y dimensions.

Figure 8B:
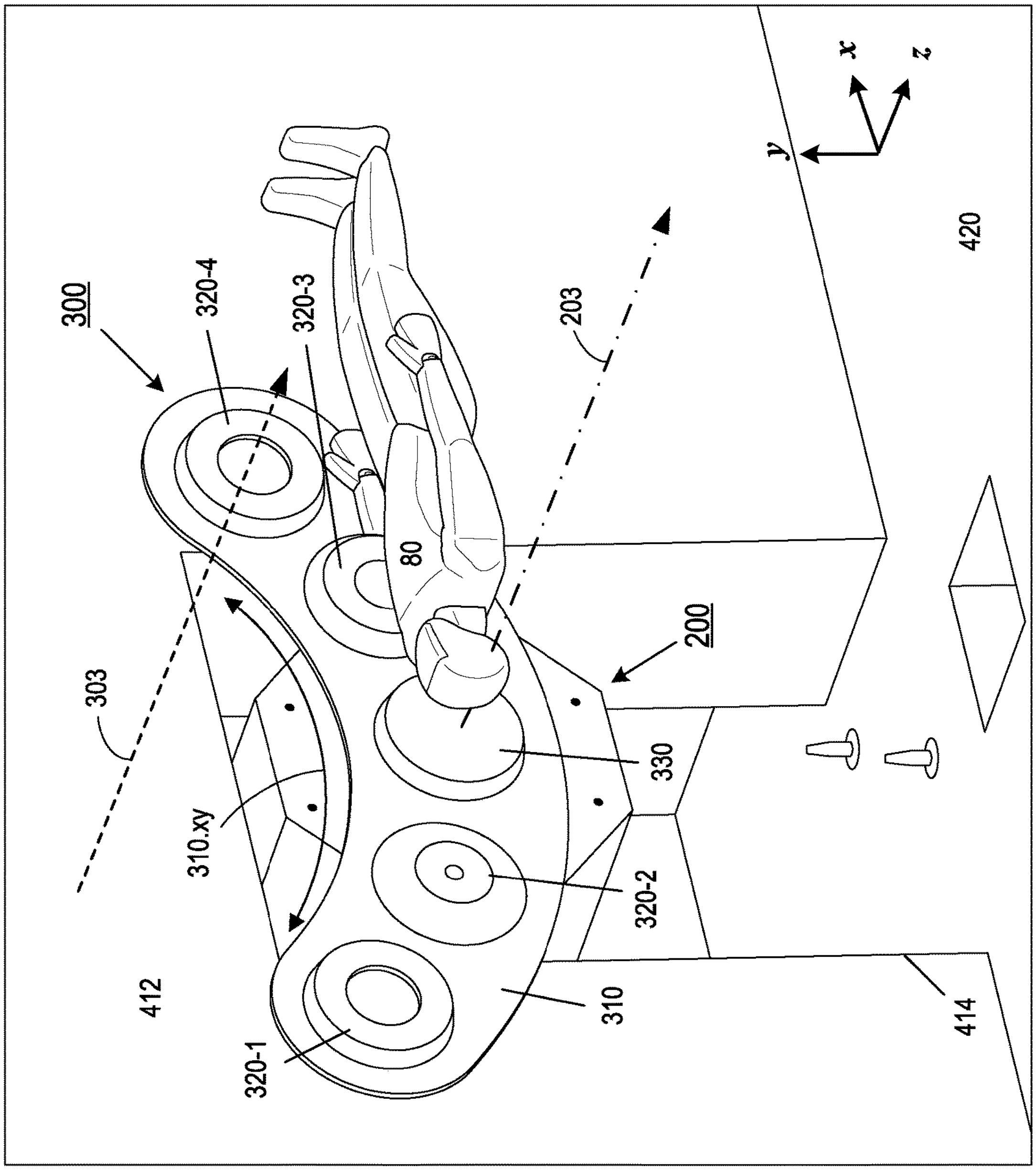

FIG. 8B shows an example NCA 300 with four neutron beam collimators 320-1 through 320-4 and a beam stop 330 attached to a mounting assembly 310 configured as a rigid body. In this example, the mounting assembly 310 is configured to rotate to exchange each collimator 320 or beam stop 330 aligned with the beam axis 203. The mounting assembly 310 maintains a fixed spatial separation between each collimator 320-1 through 320-4 and beam stop 330 along a circular arc and constrains the collimators 320 and beam stop 330 to move in the x-y plane via rotation 310.*xy* about a rotation axis 303.

The rotation axis 303 is offset and parallel to the beam axis 203, such that individual collimators 320 or the beam stop 330 can be aligned with the beam axis 203 as the mounting assembly 310 rotates 310.*xy* through the circular arc. For example, the electro-mechanical actuators 312 can include a rotary actuator mechanically coupled to mounting assembly 310 and positioned on the rotation axis 303 to generate the rotational motion 310.*xy*, or the mounting assembly 310 can be coupled to the rotatory actuator by a belt drive. Alternatively, or in addition, the electro-mechanical actuators 312 can include a linear actuator mechanically coupled to the mounting assembly 310, causing the mounting assembly 310 to pivot about the rotation axis 303. In either case, due to the particular arrangement of collimators 320 and beam stop 330, the mounting assembly 310 does not need to rotate a full 360° about the rotation axis 303 to exchange collimators 320 or the beam stop 330. An advantage of this example NCA 300 is the simplistic design due to having a single rotational degree of freedom.

Figure 8C:
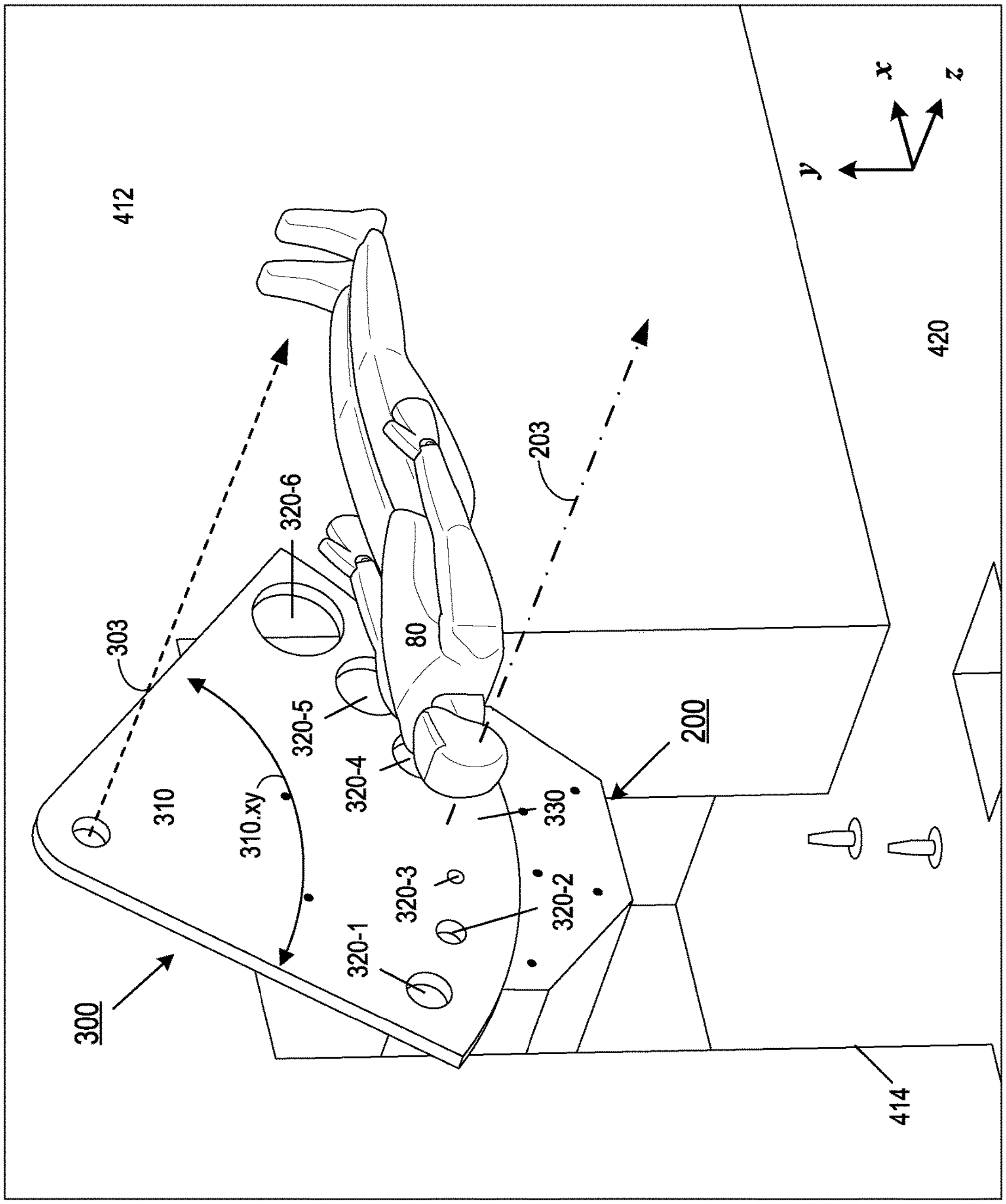

FIG. 8C shows another example NCA 300 that can exchange six neutron beam collimators 320-1 through 320-6 and a beam stop 330 by rotating a mounting assembly 310 configured as a rigid body. The example NCA 300 of FIG. 8C operates in a similar fashion as the example NCA 300 of FIG. 8B. That is, the mounting assembly 310 maintains a fixed spatial separation between each collimator 320-1 through 320-6 and beam stop 330 along a circular arc and rotates about a rotation axis 303. The slight difference is that the example NCA 300 of FIG. 8B has collimators 320 and beam stop 330 attached to the mounting assembly 310, while the example NCA 300 of FIG. 8C has collimators 320 and beam stop 330 shaped into the mounting assembly 310 itself. Either configuration, or a combination of both, can be implemented.

Figure 8D:
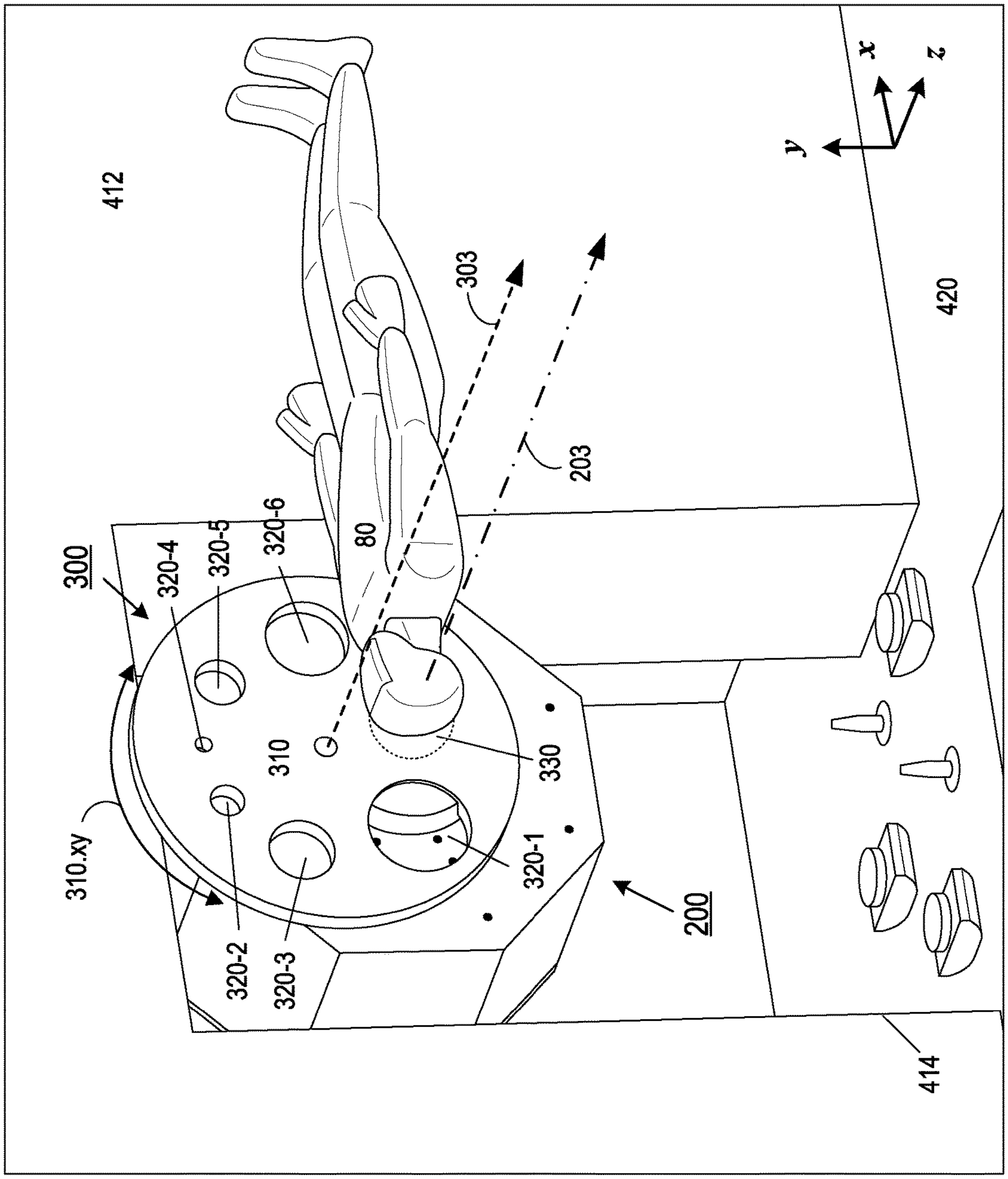

FIG. 8D shows yet another example NCA 300 that can exchange six neutron beam collimators 320-1 through 320-6 and a beam stop 330 by rotating a mounting assembly 310 configured as a rigid body. Similar to the example NCA 300 of FIG. 8C, collimators 320 and beam stop 330 are shaped into the mounting assembly 310 itself as opposed to attached to the mounting assembly 310, although either configuration, or a combination of both, can be implemented. In this example, the mounting assembly 310 has a circular shape and maintains a fixed separation between each collimator 320-1 through 320-6 and beam stop 330 around a circumference of the circle. Mounting assembly 310 constrains the collimators 320 and beam stop 330 to move in the x-y plane via rotation 310.*xy* about a rotation axis 303.

The rotation axis 303 is centered with the circular shape of the mounting assembly 310, but offset and parallel to the beam axis 203, such that individual collimators 320 and the beam stop 330 can be aligned with the beam axis 203 as the mounting assembly 310 rotates 310.*xy* through the circumference. For example, the electro-mechanical actuators 312 can include a rotary actuator mechanically coupled to mounting assembly 310 and positioned on the rotation axis 303 to generate the rotational motion 310.*xy*, or the mounting assembly 310 can be coupled to the rotatory actuator by a belt drive. In this case, due to the particular arrangement of the collimators 320 and beam stop 330, mounting assembly 310 can rotate a full 360° about the rotation axis 330 to exchange collimators 320 or the beam stop 330.

Other types of NCA 300 configurations utilizing a mounting assembly 310 configured as a rotating rigid body can also be implemented. For example, a rotation axis can intersect and be orthogonal to the beam axis 203, and the mounting assembly 310 can position collimators 320 and beam stop 330 on an outer surface of a cylindrical or pseudo-cylindrical multi-sided shape, such that a distal face 324 of each collimator 320 and beam stop 330 is directed normal to the outer surface. The cylindrical shape can be coaxial with the rotation axis and rotate about the rotation axis to align different collimators 320 or the beam stop 330 with the beam axis 203, e.g., similar to rotations of a rotating drum.

In some implementations, movement of a mounting assembly 310 configured as a rigid body can include both translations and rotations using appropriate combinations of electro-mechanical actuators 312. For example, the mounting assembly 310 can translate along a first axis to position itself relative to the beam axis 203 (e.g., FIG. 8A). Mounting assembly 310 can then rotate about a second, different axis to exchange the collimators 320 or beam stop 330 aligned with the beam axis 203 (e.g., FIGS. 8B-8D). An opposite sequence of movements can also be implemented, or more complex combinations of translations and rotations.

Figure 8E:
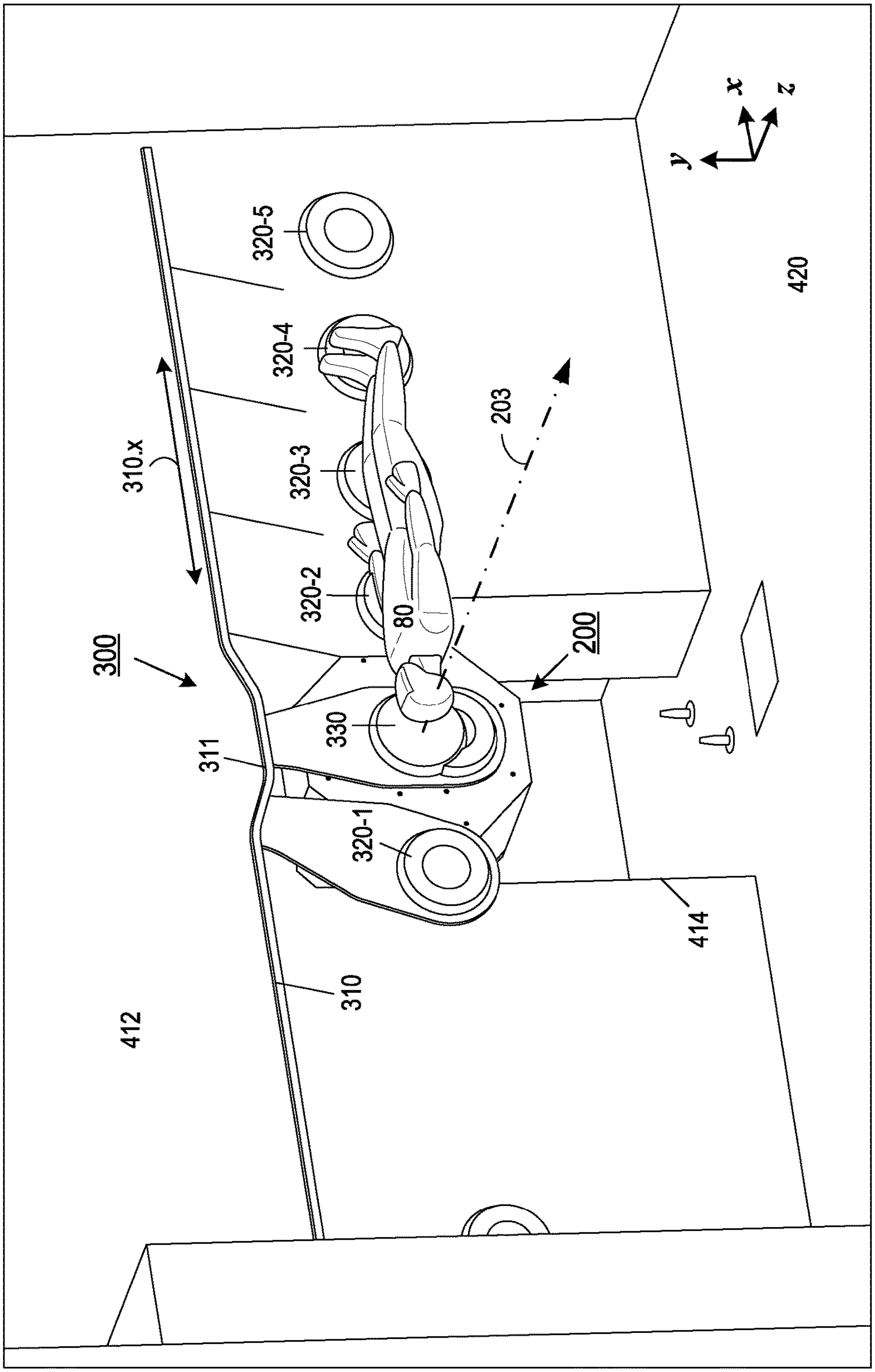

FIG. 8E shows an example NCA 300 that can exchange five neutron beam collimators 320-1 through 320-5 and a beam stop 330 using a mounting assembly 310 configured as a guide rail. NCA 300 is installed above the NBC 200 in order to automatically exchange collimators 320 and beam stop 330, e.g., to adjust the size of the neutron beam 70 and provide gamma ray shielding. In this example, the mounting assembly 310 defines a fixed path of movement while supporting the collimators 320 and beam stop 330. Collimators 320 and beam stop 330 can horizontally translate 310.*x* along the mounting assembly 310 to exchange each collimator 320-1 through 320-5 or beam stop 330 aligned with the beam axis 203. For example, the electro-mechanical actuators 312 can include respective rotary actuators (e.g., implemented as motorized wheels) coupled to each of the collimators 320 and beam stop 330 to enable horizontal translation 310.*x* along the mounting assembly 310, e.g., similar to box rail hangers. Mounting assembly 310 also includes a bend 311 to aid in alignment with beam axis 203. The bend 311 can provide collision avoidance for collimators 320 and/or beam stop 330 not in active use. That is, unused collimators 320 and beam stop 330 can be arranged at an elevation that does not interfere with the patient 80 or other BNCT equipment, as well reducing radiations streaming effects.

In some implementations, a mounting assembly 310 configured as a guide rail can have more complex shapes to accommodate storage and/or arrangement of collimators 320 or beam stop 330 not in active use. For example, the mounting assembly 310 can be in the shape of an oval and installed above the NBC 200. A top portion of the oval can be utilized for storage of unused collimators 320 and/or beam stop 330 while a bottom portion of the oval can be employed to align a collimator 320 or beam stop 330 with the beam axis 203.

Figure 9A:
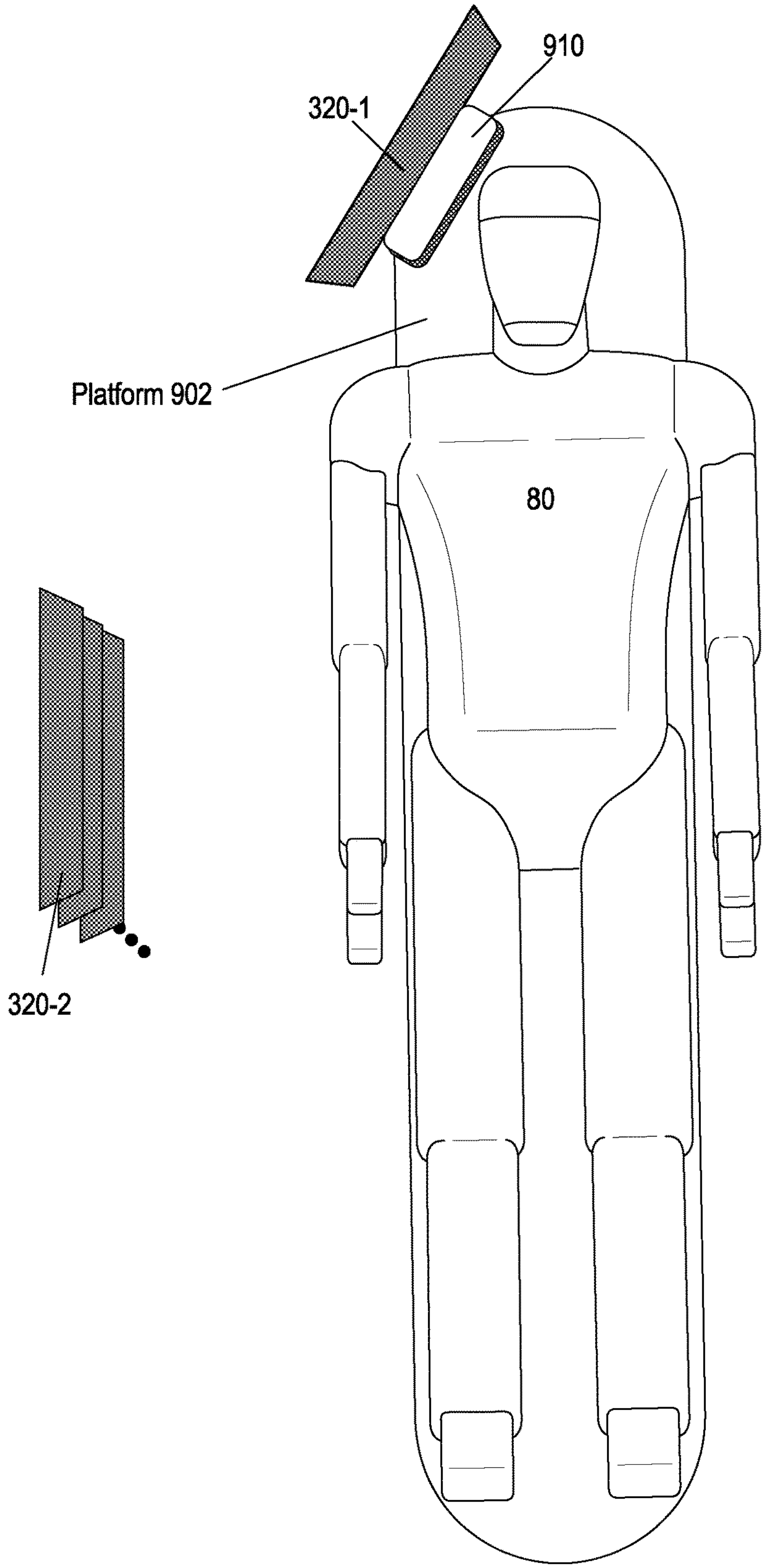
FIGS. 9A-9C are renders depicting an example of an adjustable patient platform with attachable neutron beam collimators.
Figure 9B:
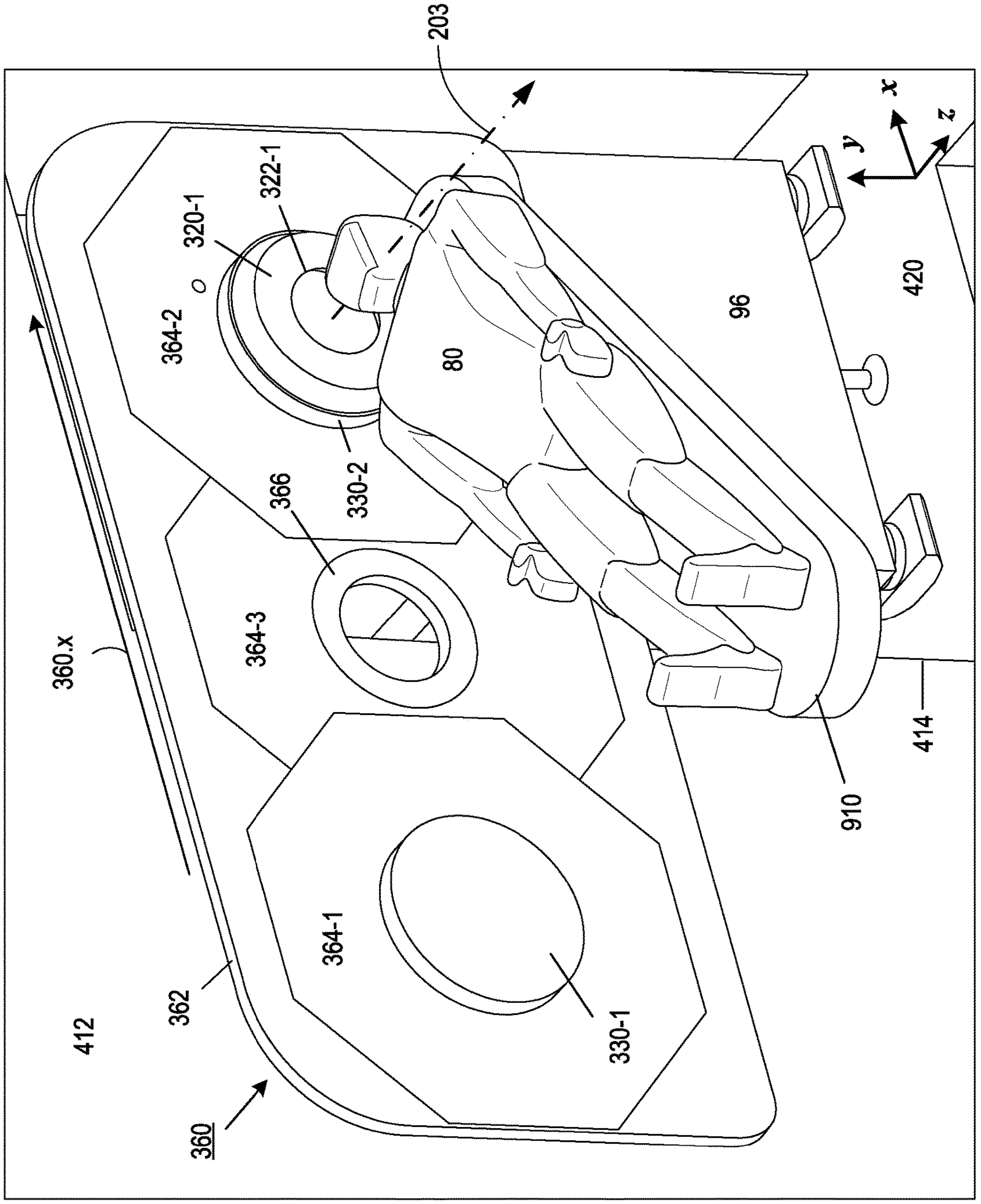
Figure 9C:
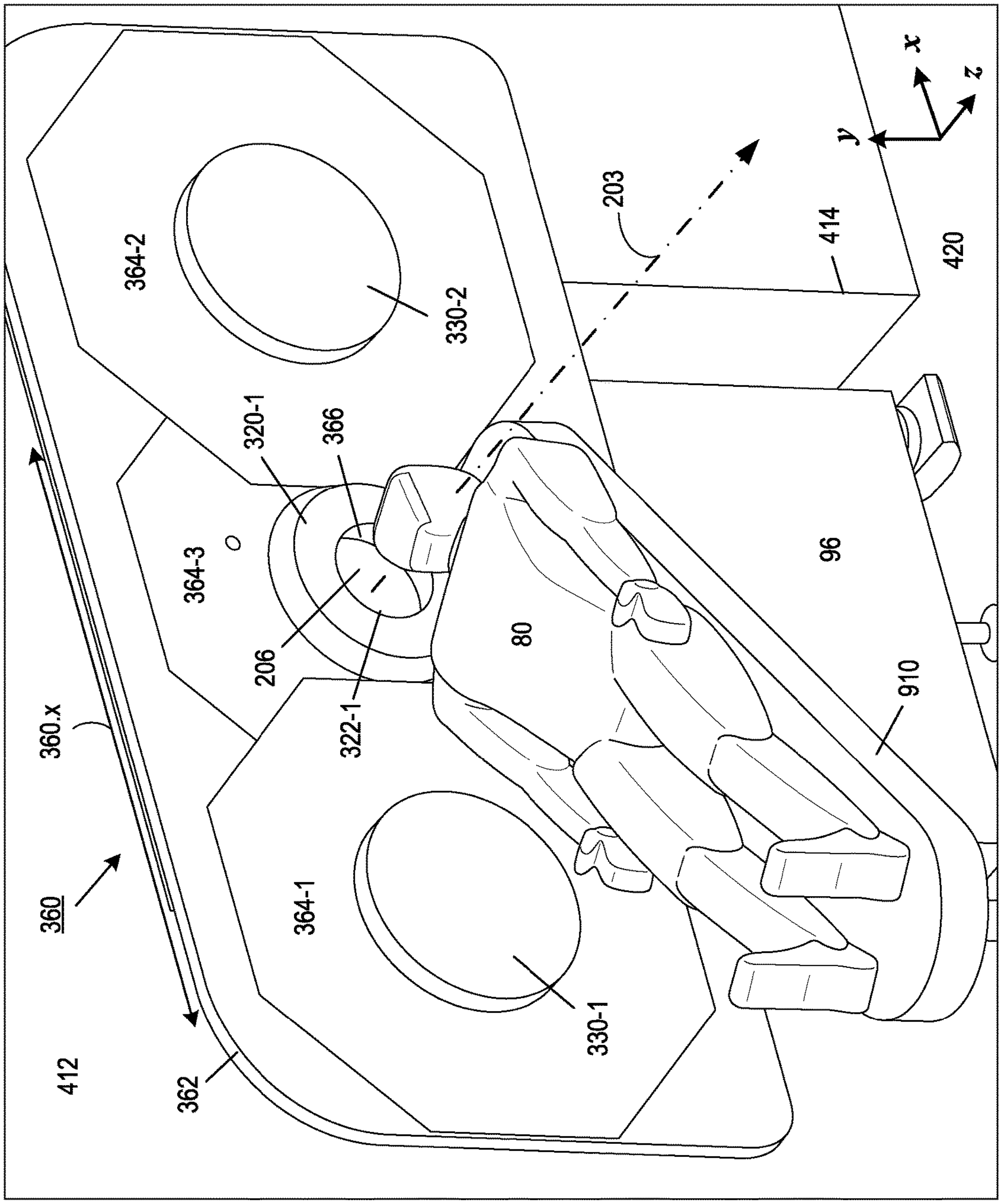
Figure 11A:
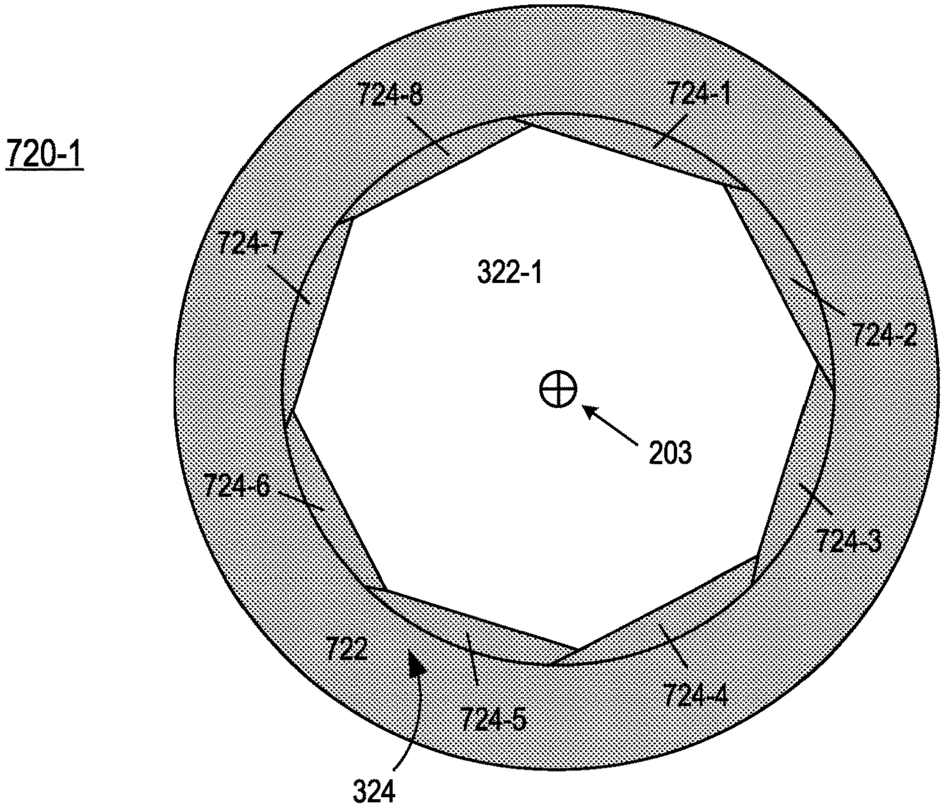
FIGS. 11A-11D are front views depicting an example of a neutron beam collimator with a diaphragm iris for varying a size of the collimator's aperture.
Figure 11B:
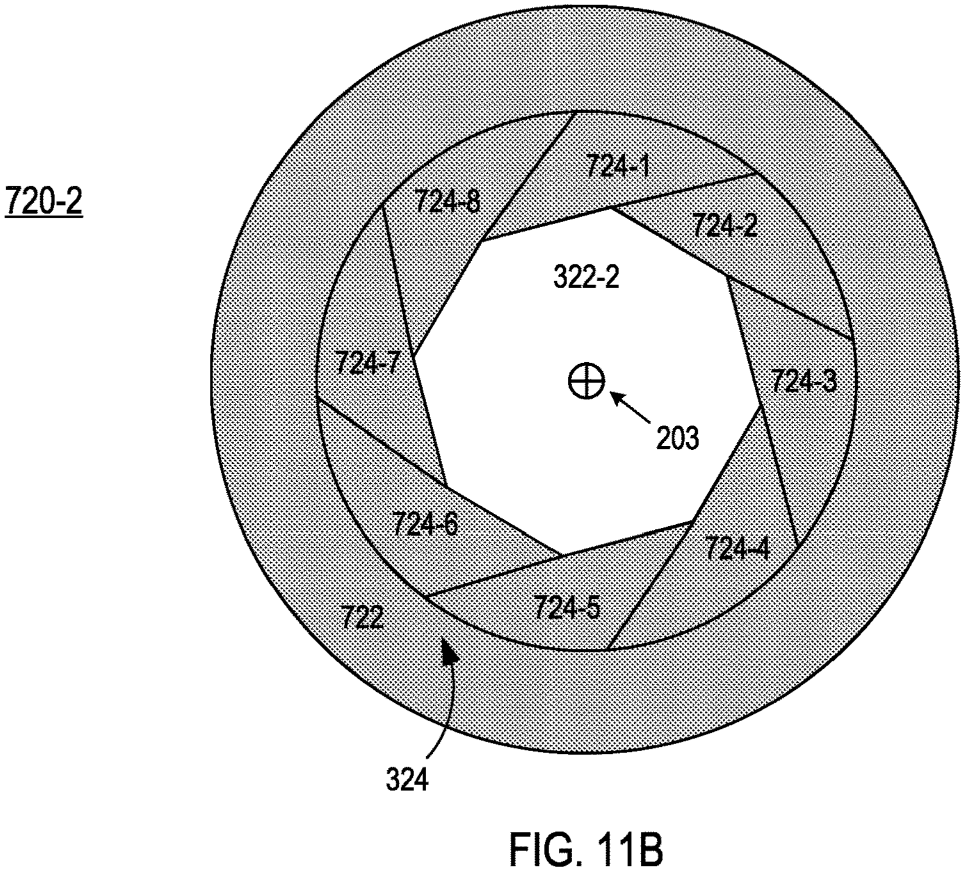
Figure 11C:
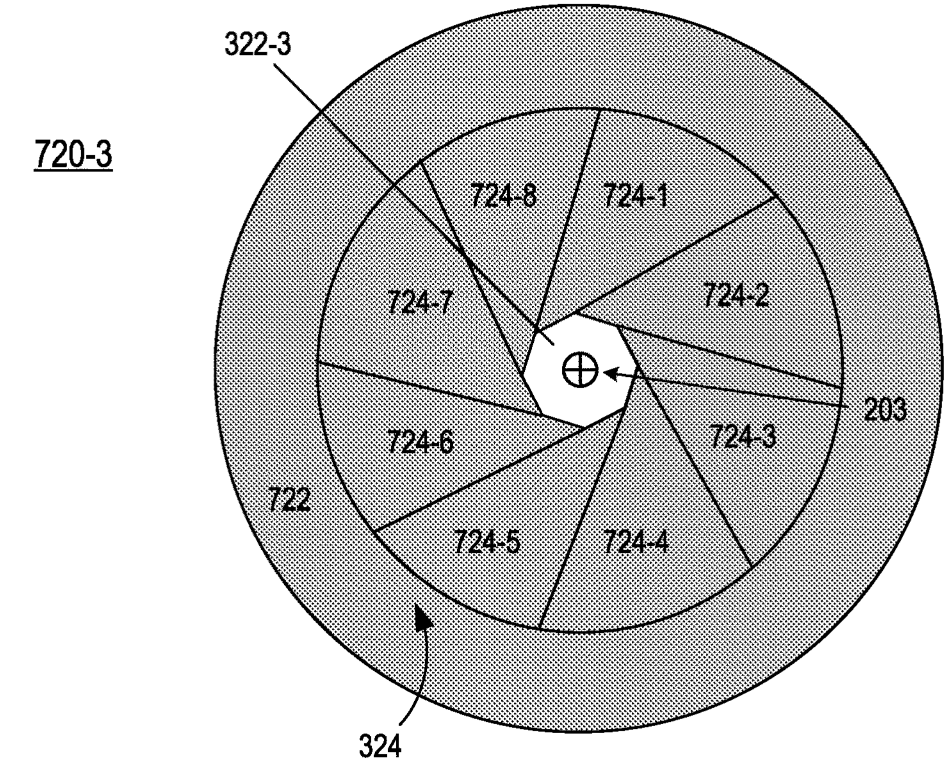
Figure 11D:
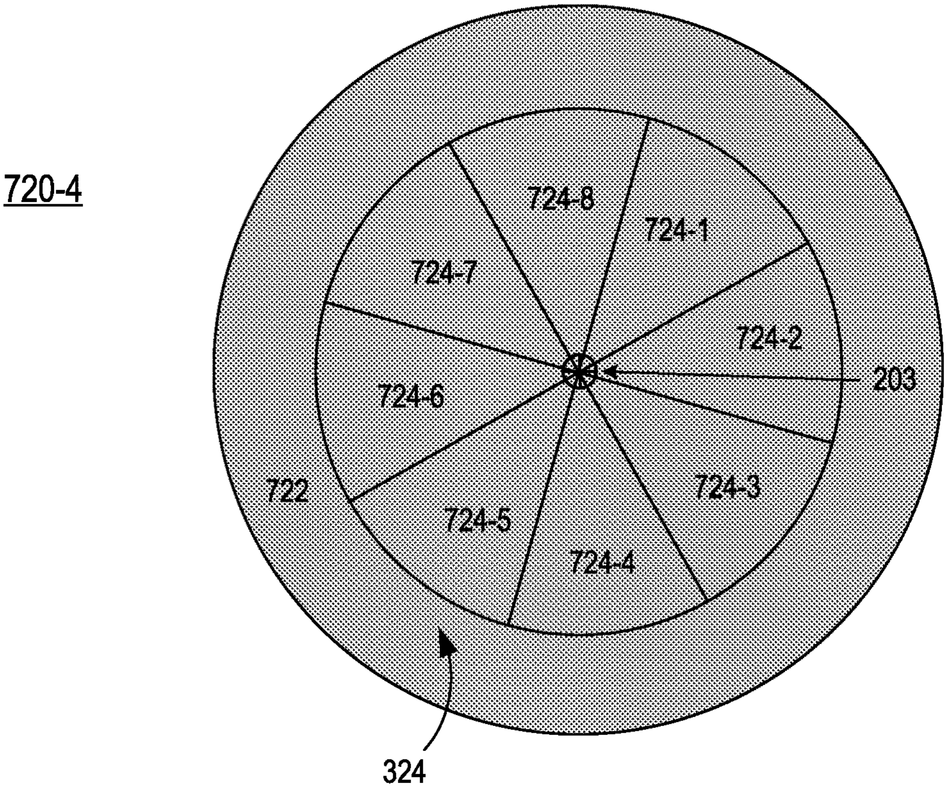

FIGS. 9A-9C are renders depicting an adjustable patient platform 902 (e.g., a robotic couch) that includes a mounting assembly 910 for attaching different neutron beam collimators 320 to the patient platform 902. Patient platform 902 can be used in conjunction with any and all examples of NCA 300, MRS 360, and/or safety cover 370 described herein, with or without the mounting assembly 910. For example, the platform 902 can position a patient 80 relative to an NCA 300 (e.g., any of those depicted in FIGS. 7A-8E) to receive a neutron beam 70 along a beam axis 203. When the platform 902 includes the mounting assembly 910, platform 902 can also provide variable neutron beam sizes in combination with the NCA 300. Alternatively, platform 902 can provide variable neutron beam sizes in lieu of the NCA 300, see FIGS. 9B-9C for example.

Referring to FIG. 9A, a first collimator 320-1 is releasably secured to the mounting assembly 910 that supports the collimator 320-1 on the patient platform 902. Hence, different neutron beam collimators 320 can be attached to the mounting assembly 910 depending on a desired beam size. For example, the mounting assembly 910 can include releasable fasteners that secure a particular collimator 320 in place on the platform 902 but also permit removal of the collimator 320. A variety of releasable and/or temporary fasteners can be implemented such as, nuts and bolts, screws, wing nuts, keys and keyways, T-slot fasteners, drop-in and push-in fasteners, Clevis and cotter pins, among others. Custom fasteners can also be implemented to provide certain functionalities.

The mounting assembly 910 can align the collimator 320-1, relative to the patient body 80, at any particular angle or height, to ensure a resultant collimated neutron beam 70 is predominately directed at target sites on the patient 80. For example, the mounting assembly 910 can include one or more devices, e.g., rotating, swivel, and/or extending joints, that permit rotation and elevation of the collimator 320-1. Positioning of the collimator 320-1 relative to the patient 80 can be performed by a clinician. Alternatively, or in addition, the mounting assembly 910 can include one or more electro-mechanical actuators 312 coupled to the collimator 320-1 that automatically adjust the position and orientation of the collimator 320-1 relative to the patient 80.

Platform 902 supports the patient body 80 and generally includes mechanisms to facilitate transportation of the patient 80, as well as rotation and elevation of the patient 80. For example, the platform 902 can include wheels or be coupled to a guide rail that translates the platform 902 along a fixed path. Alternatively, or in addition, one or more electro-mechanical actuators 312 can be mechanically coupled to the platform 902 to adjust the position, elevation, and orientation of the patient 80 supported by the platform 902. For example, the platform 902 can be attached to a mechanical (e.g., robotic) arm that maneuvers the platform 902 in three dimensions. The electronic controller 340 can be programmed to generate control signals that cause the one or more electro-mechanical actuators 312 to execute a chosen sequence of movements (e.g., based on a control loop) for the platform 902.

FIG. 9B shows the patient platform 902 positioning the collimator 320-1 and patient 80 near a beam axis 203 in a BNCT treatment room 420. Collimator 320-1 has a specific aperture size 322-1 to attenuate a neutron beam 70 propagating along the beam axis 203 to a target beam diameter. In this case, an MRS 360 is situated on the beam axis 203 to provide gamma ray shielding between BNCT treatments. MRS 360 also supports two beam stops 330-1 and 330-2 on peripheral plates 364-1 and 364-2 respectively for additional gamma ray shielding along beam axis 203. The platform 902 can be electronically controlled by a clinician via the electronic controller 340, or an automated guiding system implemented on the electronic controller 340, to adjust the elevation, proximity, and angle of collimator 320-1 and patient 80 relative to the beam axis 203.

FIG. 9C shows a beam port 366 of the MRS 360 aligned with the beam axis 203, indicating an active neutron beam 70 condition. MRS 360 can horizontally translate 360.*x* from the position shown in FIG. 9B to the position shown in FIG. 9C. Patient 80 can then receive the neutron beam 70 with the target beam diameter.

After performing an iteration of BNCT, MRS 360 can return to the position depicted in FIG. 9B to shield the treatment room 420 from any lingering gamma radiation. Alternatively, or in addition, platform 902 can transport the patient 80 outside the treatment room 420 to employ a different neutron beam collimator 320, e.g., with a different sized aperture 322, to facilitate a different neutron beam size. For example, a clinician can remove the first collimator 320-1 from the mounting assembly 910 and secure a second collimator 320-2 to the mounting assembly 910. The clinician can also adjust the patient 80 and second collimator 320-2 relative to one another. Subsequently, platform 902 can return the patient 80 to the treatment room 420 and align the second collimator 320-2 and patient 80 relative to the beam axis 203 for another iteration of BNCT. This process can repeat for any desired number of beam sizes. Hence, the platform 902 with attachable neutron beam collimators 320 can achieve variable neutron beam sizes without the clinician entering the treatment room 420 and being unnecessarily exposed to neutron and/or gamma radiation.

Examples of Variable Aperture Neutron Beam Collimators

The following examples of variable aperture neutron beam collimators (FIGS. 10A-11D) elucidate additional solutions to automated neutron beam collimation. In these examples, a single neutron beam collimator with an adjustable aperture can fill the role of multiple neutron beam collimators 320, as well as a beam stop 330. Variable aperture collimators can provide considerable flexibility for BNCT and other neutronics applications since, in general, a high degree of aperture variation can be realized. In order to effectively scatter, redirect, and/or absorb neutrons, as well as absorb residual gamma radiation, the examples of variable aperture collimators (620 and 720) described with respect to FIGS. 10A-11D can utilize the same materials as the collimators 320 described above with respect to FIGS. 5A-5E. As such, the many combinations of materials already described will not be repeated with respect to the following examples.

FIGS. 10A-10H are front and cross-sectional views of an example nested neutron beam collimator 620 with a variable aperture size 322. While in operation, the nested collimator 620 is typically aligned centrally with a beam axis 203 to receive a neutron beam 70. Here, beam axis 203 is represented as a cross indicating a direction coming out of the page. FIGS. 10A-10H show the nested collimator 620 in different states 620-1 through 620-4 corresponding to different aperture sizes 322-1 through 322-4.

The nested collimator 620 includes a frame 622 that has an opening defining a largest aperture 322-1. Frame 622 can be a neutron beam collimator 320 with a fixed aperture size 322-1, e.g., the neutron beam collimator 320 shown in FIGS. 5A-5B. Nested collimator 620 also includes one or more elements that are moveable relative to the beam axis 203. In this example, the one or more elements include multiple solid plates 624-1 through 624-3 that can be arranged at different circumferential locations around the beam axis 203 to vary the size of the aperture 322-2 to 322-4. The nested collimator 620 includes three plates 624 but any number of plates 624 can be implemented to achieve a specific level of aperture 322 variation, e.g., one, two, three, four, five, six, seven eight, nine, ten, or more plates 624. In isolation, each plate 624 can be a respective neutron beam collimator 320 with different dimensions, hence, various combinations of the frame 622 and plates 624 can be utilized for a desired range of aperture 322 sizes.

In general, the plates 624 are sized and shaped such that an inner surface of each plate 624 is coincident with an outer surface of another plate 624 (or the frame 622). Thus, the frame 622 and plates 624 can be aligned coaxial with one another. Although the frame 622 and plates 624 are circularly symmetric in this example, different aperture 322 geometries can also be implemented, such as semicircles and various polygons. Consequently, the aperture 322 size is varied in accordance with the relative size of each nested plate 624. Note that an appropriately sized solid plate 624 can also reduce the aperture size to zero by obstructing the aperture 322. Therefore, the nested collimator 620 can also double as a beam stop 330.

Although not shown in FIGS. 10A-10D, nested collimator 620 can include one or more electro-mechanical actuators mechanically coupled to the plates 624 in order to move the plates 624 relative to the beam axis 203. The electro-mechanical actuators can enable a suitable sequence of movements to sequentially align the plates 624-1 through 624-3 with the frame 610. For example, the electro-mechanical actuators can include linear actuators that independently translate each plate 624 to the beam axis 203 and subsequently align each plate 624 coaxial with the preceding plate 624 (or the frame 622).

Since the frame 622 can be fixed relative to the beam axis 203, the frame 622 and each nested plate 624, can act as a guide for the proceeding plate 624 in the sequence. This can aid in alignment and position reproducibility. Moreover, the nested collimator 620 can conserve materials as a separate neutron beam collimator 320 is generally not needed for each particular aperture 322 size.

To enable automated variation of the aperture 322, the electro-mechanical actuators are typically in communication with an electronic controller. Similar to an NCA 300, the controller can be programmed to generate control signals that cause the electro-mechanical actuators to execute the chosen sequence of movements, e.g., according to a control loop. Thus, the plates 624 are arranged coaxially depending on a target aperture size and/or a target neutron beam size determined by the controller programming.

FIGS. 11A-11D are front views of an example neutron beam collimator 720 with a diaphragm iris for variation of an aperture size. While in operation, the variable collimator 720 is typically aligned centrally with a beam axis 203 to receive a neutron beam 70. Here, beam axis 203 is represented as a cross indicating a direction coming out of the page. FIGS. 11A-11D show the variable collimator 720 in different states 720-1 through 720-3 corresponding to different aperture sizes 322-1 through 322-3, as well as a beam stop state 720-4 with no aperture.

The variable collimator 720 includes a frame 722 that has an opening defining a largest aperture 322-1. The frame 722 supports a circular diaphragm iris that is configured to adjust the aperture size 322 of the variable collimator 720. Although any shape can be implemented, circular irises are generally advantageous since movable elements can be positioned symmetrically about the beam axis 203. In this case, the moveable elements are iris blades 724-1 through 724-8 that can be positioned at different circumferential locations within the frame 722 to realize different aperture sizes 322. In general, the variable collimator 720 can realize a continuously variable aperture size 322, accommodating a continuously variable neutron beam size. Moreover, since the iris blades 724 can be housed in the variable collimator 720 itself (e.g., in the frame 722), the iris blades 724 can change positions relatively quickly to adjust the aperture 322. Both of these properties can provide considerable versatility for BNCT applications, e.g., by effectively directing neutron beams to target sites and reducing total treatment times. Moreover, the variable collimator 720 can conserve materials and space since a separate neutron beam collimator 320 is not needed for each particular aperture 322 size.

The example variable collimator 720 shown in FIGS. 11A-11D includes eight triangular iris blades 724 that form an octagonal shaped aperture 322. However, any number of appropriately designed iris blades 724 can be implemented to achieve a specific aperture shape, e.g., one, two, three, four, five, six, seven, eight, nine, ten, fifteen, twenty, or more iris blades 724. For example, a relatively large number of iris blades 724, e.g., about eight or more, can be utilized to form a polygonal aperture shape approaching a circle. Alternatively, or in addition, curved iris blades 724 can be implemented which can improve aperture shapes approximating circles. In this case, five iris blades 724 are often sufficient to obtain a circular-like aperture 322. Curved iris blades 724 can also conserve space since they can be compactly housed in the circular frame 722.

The different states 720-1 through 720-4 of the variable collimator 720 show the iris blades 724 expanding toward the beam axis 203 to close the iris or contracting away from the beam axis 203 to open the iris. To accomplish this, the variable collimator 720 can include one or more electro-mechanical actuators mechanically coupled to the iris blades 724 in order to move the blades 724 relative to the beam axis 203. For example, the electro-mechanical actuators can include a rotary actuator coupled to a rotatable gear, e.g., by a belt drive. The gear can be coaxially housed in the frame 722 and configured to rotate within the frame 722. The rotatory actuator can be housed in the frame 722 or be external the frame 722 depending on the implementation. Each of the iris blades 724-1 through 724-8 can be attached to the gear such that they move as the gear rotates. Hence, the gear can rotate clockwise or counterclockwise to cause the blades 724 to expand or contract relative toward or away from the beam axis 203. Other types of rotating mechanisms can also be implemented, e.g., the iris blades 724 can slide or roll along slotted guides in the frame 722.

The electro-mechanical actuators can be in communication with an electronic controller to facilitate automated variation of the variable collimator 720's aperture 322. Referring to the rotatable gear example described above, the controller can generate control signals for the rotary actuator that regulate the speed and direction of the gear. Thus, the iris blades 724 expand or contract depending on a target aperture size and/or a target neutron beam size determined by the controller programming.

Example Materials

FIGS. 12A-12Q are graphs of cross-section versus neutron energy for materials of various types suitable for use in a NCA 300. The materials described below are generally suitable for BNCT and other neutronics applications. For example, an NBC 200 and a collection of neutron beam collimators 320 (e.g., including a beam stop 330) supported by an NCA 300 can include the following materials in order to adequately attenuate a neutron beam 70 to targeted deliverable beam sizes. Variable aperture neutron beam collimators 620 and 720 may also utilize the following materials to scatter, redirect, and/or absorb neutrons of the neutron beam 70, as well as absorb residual gamma radiation in the neutron beam 70.

The effectiveness of a material to scatter and reduce the energy of a neutron is inversely proportional to its atomic mass number A, governed by the number of protons and neutrons in the nucleus. The maximum and average fractional energy loss for a material is approximated by the following equation:

$$\left(\frac{\Delta E}{E_{initial}}\right)_{max} = (1-\alpha) \text{ and } \left(\frac{\Delta E}{E_{initial}}\right)_{avg} = \frac{1-\alpha}{2}, \text{ where } \alpha = \left(\frac{A-1}{A+1}\right)^2$$

As an example, a neutron interacting with a hydrogen nucleus (A≈1) will lose on average half of the initial energy per collision and can lose potentially all its energy in that single collision. For comparison, a neutron interacting with a nucleus of lead-208 (Pb-208, A≈208) or beryllium-9 (Be-9, A≈9) will result in ≈1% and 18% average energy losses, respectively, with maximum energy losses of ≈2% and 36%. This makes hydrogen 50 times more effective than lead and 2.5 times more effective than beryllium as a scattering material. For BNCT, however, a more effective scattering material is not necessarily more useful since a small value of a means a few collisions is sufficient to push the neutron below the epithermal energy range.

The number of collisions, on average, a neutron must undergo to down scatter from some incident neutron energy to a specific energy is based on another parameter ζ, which is given by the relationship:

$$\zeta \approx \frac{2}{A+\frac{2}{3}}(A>1);\quad \zeta = 1(A=1)$$

The number of collisions, N, can be approximated using the following relationship:

$$N = -\frac{1}{\zeta}\ln\left(\frac{E_{initial}}{E_{final}}\right)$$

From this equation it can be shown that on average 24 times more collisions are needed in lead than in beryllium to reduce the incident neutron energy by half.

Each material, in addition to mass, has an energy dependent probability that a neutron will interact within the material, called the total macroscopic cross-section ($\Sigma_{tot}$), or probability of collision per unit distance (e.g., 1/unit distance). At energies above thermal and below the first nuclear state the cross section is generally constant, and is referred to herein as the non-resonant region. Higher energies are referred to as the resonant region (defined by the discrete nuclear states) where peaks and valleys for the cross section are present, with the peaks corresponding to the energy of each discrete nuclear state and the valleys corresponding to the energy regions between resonances. If a neutron encounters a material with a large cross section resonance at the energy of the neutron, the probability of scattering to a lower energy is high. Conversely, relatively few scattering events will occur for neutron energies in a cross-section valley.

The type and amount of material present within each region can be selected to perform these various functions. Materials adept at scattering neutrons, classified generally herein as "S" materials, can be further classified as having substantial cross-sections for scattering from fast to epithermal energies ("Fast-S"), from fast and epithermal energies to lower energies ("Epi-S"), and as having substantial cross-sections in non-resonant regions ("NR-S") for scattering fast and/or epithermal neutrons. Different scattering materials, regardless of class, can be indicated by a numeric suffix (e.g., S1, S2, and S3). Materials adept at absorbing thermal neutrons are generally referred to herein as "Ab" materials. Materials adept at redirecting neutrons and absorbing gamma rays are generally referred to herein as "R" materials.

Example Fast-S Materials

Particularly useful Fast-S elements can have an atomic number (Z) of nine or greater, examples of which are magnesium, fluorine, and aluminum. FIG. 12A is a graph depicting cross-section versus energy for magnesium fluoride ($MgF_2$), magnesium, and aluminum. As can be seen fluorine (~27 keV) and aluminum (~33 keV) have significant resonance peaks 1400 that start in close proximity to the 30 keV ($3\times10^2$ MeV) transition between epithermal and fast neutron energy regions. The resonance peaks continue at intervals as energies increase therefrom. The fast neutron scattering occurs either in the relatively lower energy region having discrete resonance peaks or the relatively higher energy, unresolved resonance region, where the resonance peaks are so crowded and close in energy they effectively no longer look like individual resonances. Fast-S materials selected for NBC 200 and/or components of NCA 300 preferably have a resonance region that starts at the upper limit of the target energy (e.g., epithermal) region needed for a specific treatment. Magnesium has a first resonant peaks at 20 keV, then again at ~80 keV and higher energies. Neutrons having fast energies coinciding with these resonant peaks are relatively more likely to be scattered and thus reduced in energy towards the epithermal region. Conversely, neutrons in the epithermal region are less likely to be scattered by these materials as they travel through.

Aluminum is a highly versatile material with structural strength, relative ease of manufacture, and the ability to be combined with other elements in a wide variety of compounds. Aluminum alloy blends are divided into three distinct categories based on the alloying material, which can be other elements such as magnesium and silicon with desirable scattering properties. Aluminum 6000 series alloys include greater than 97% aluminum (by weight percent) and the remaining elements can be either silicon or magnesium. Aluminum 5000 series alloys include greater than 90% aluminum with the dominant alloying element being up to 10% magnesium. Some 5000 series cast metals can have as little as 32% aluminum with the remainder being magnesium. Aluminum 4000 series alloys include greater than 85% aluminum and up to 12.5% silicon, with the remaining balance being magnesium, manganese, or copper. Some 4000 series cast metals can have up to 22% silicon.

The scattering properties of fluorine can be utilized effectively within NBC 200 and/or components of NCA 300 with one or more other materials in the form of a compound. For example, fluorine can be combined as an alloy with aluminum (e.g., $AlF_3$), titanium (e.g., $TiF_3$), barium (e.g., $BaF_2$), bismuth (e.g., $BiF_3$), lead (e.g., $PbF_2$), tungsten (e.g., $WF_6$), vanadium (e.g., $VF_3$), magnesium (e.g., $MgF_2$), calcium (e.g., $CaF_2$), or with carbon and hydrogen (e.g., ethylene tetrafluoroethylene (ETFE, $C_4H_4F_4$)). By mass the fluorine content can generally range from approximately 15% (as with lead fluoride ($PbF_2$)) to 54% (as with $TiF_3$) or 68% (as with $AlF_3$). FIG. 12B is a graph depicting cross sections for magnesium fluoride ($MgF_2$), lead fluoride ($PbF_2$), and bismuth fluoride ($BiF_3$). The term fluorine as used herein is intended to cover the element itself and fluorides.

Materials that undergo relatively high radiation exposure preferably exhibit sufficient radiation resistance to prevent degradation. Some materials are radiation tolerant up to a minimum of 10,000 Gray (Gy). Some fluorine bearing polymers, like polytetrafluoroethylene (PTFE, $C_2F_4$), have poor radiation resistance, where physical changes (e.g., degradation, crumbling) can occur as low as 100 Gy, and are not suitable.

The fast-scattering effect of aluminum and fluorine can be enhanced by combination of those elements with magnesium into compounds of two or more elements, such as magnesium fluoride (see FIG. 12A) and the aluminum 4000, 5000, and 6000 series. Magnesium can be combined with numerous other S materials desired for scattering, such as zinc, manganese, and silicon. All aforementioned Fast-S example materials can be used in the examples of NBC 200 and/or NCA 300 alone, in combination with each other, or in combination with other materials (e.g., Epi-S, NR-S, Ab, R) to achieve the desired structural characteristics and scattering capability.

Example Epi-S Materials

Epi-S elements can have an atomic number (Z) of 12 or greater. Particularly useful examples of these Epi-S elements are titanium and vanadium, and to a lesser extent magnesium. FIG. 12C is a graph depicting cross sections for titanium, vanadium, and magnesium in the epithermal energy region, from which the large resonant cross-sections 1402 for titanium and vanadium in the upper epithermal range is visible. Titanium and vanadium can be used in combination with each other, in combination with other elements, or alone. Titanium and vanadium can be readily combined with aluminum (or another Fast-S material) to take advantage of its Fast-S scattering potential. Common titanium alloys have both vanadium and aluminum, and the aluminum content can range from 6% to 30% (by weight percent) while the vanadium content can range from 2.5% to 4.0%. Alloys of titanium and aluminum (without vanadium) can be used and can have as little as 12% or as much as 35% aluminum. Alloys of titanium and vanadium (without aluminum) can be used and can have as little as 10% vanadium up to 81% vanadium, with the remainder being titanium. Like aluminum, some titanium compounds can contain as much as 10% silicon, while vanadium can be a silicide ($VS_2$, $VS_3$, etc.). Other examples of Epi-S materials include scandium (Sc), nickel (Ni), and zinc (Zn). All aforementioned Epi-S materials can be used in the examples of NBC 200 and/or NCA 300 alone, in combination with each other, or in combination with other materials (e.g., Fast-S, NR-S, Ab, R) to achieve the desired structural characteristics and scattering capability.

Example NR-S Materials

Certain elements exhibit a broad non-resonant region for cross-sections at lower energies after termination of the 1/V region and extending to higher energies where resonance cross-sections commence. The non-resonance region of the cross-section can have a constant slope, e.g., flat, and can be decreasing (to a substantially lesser extent than in the 1/V region) or constant. These elements are referred to herein as non-resonant scattering materials ("NR-S"), examples of which include hydrogen, lithium, boron, beryllium, carbon, nitrogen, and oxygen. In many examples, the NR-S material exhibits deviation of 20% or less over the target energy range (e.g., epithermal), more preferably 10% or less (e.g., like carbon's cross-section up to ~120 keV).

Figure 12D:
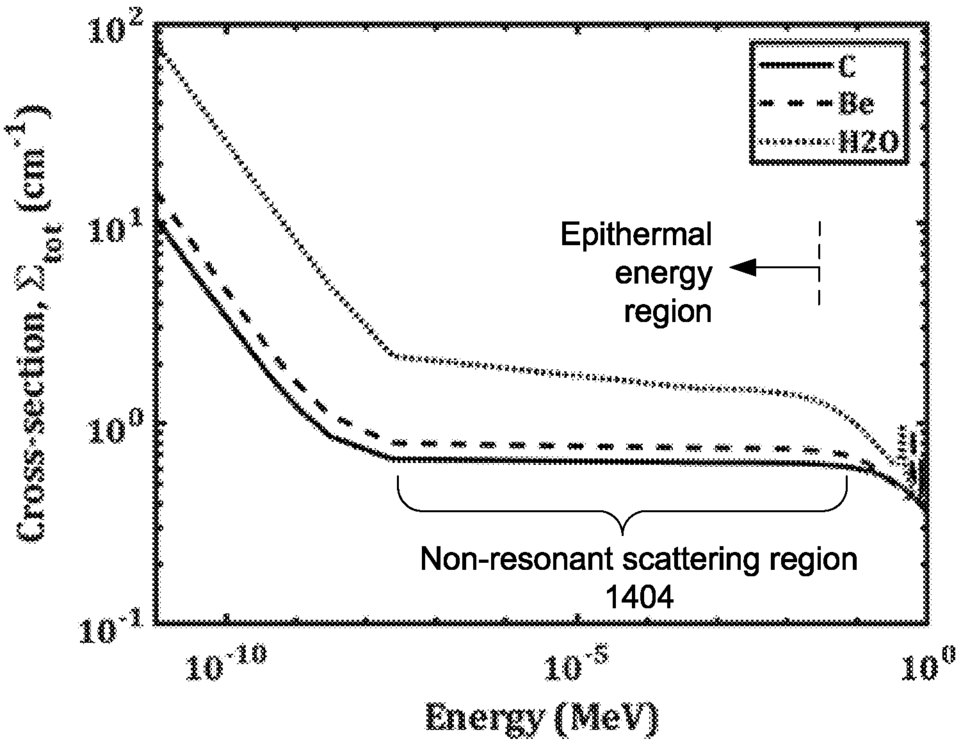

FIG. 12D is a graph depicting cross-sections for carbon, beryllium, and water ($H_2O$). Carbon and beryllium have a non-resonant scattering region 1404 with a slope at or near zero from approximately 0.05 eV to 50 keV. Water has a non-resonant scattering region with a relatively small negative slope from approximately 0.05 eV to 10 keV. All NR-S elements can be used in the examples of NBC 200 and/or NCA 300 alone, in combination with each other, or in combination with other materials (e.g., Fast-S, Epi-S, R) to achieve the desired structural characteristics and scattering capability.

Example Ab Materials

Figure 12E:
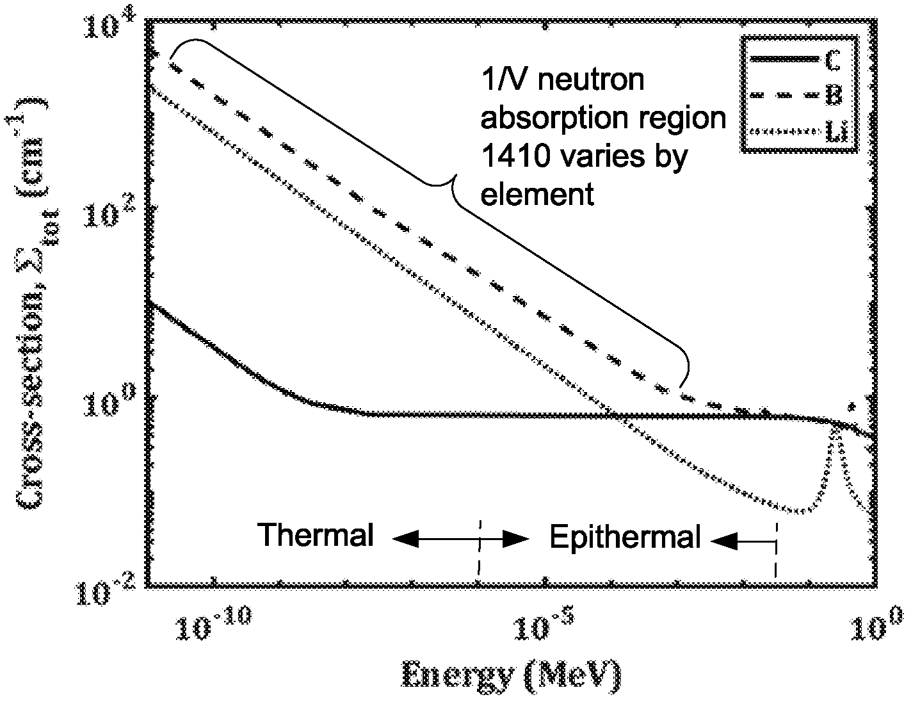
Figure 12F:
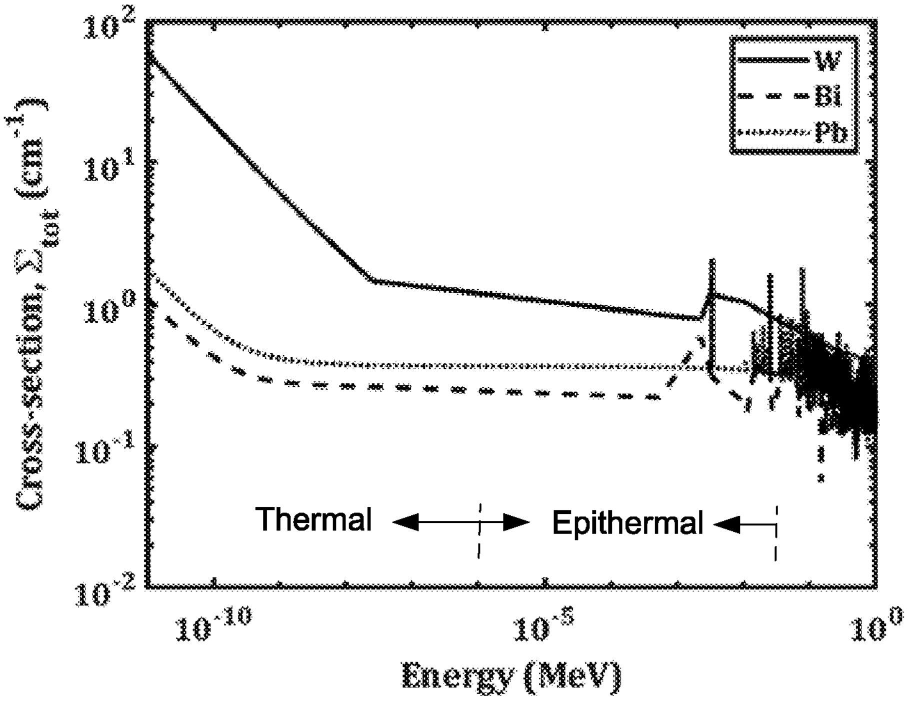
Figure 12G:
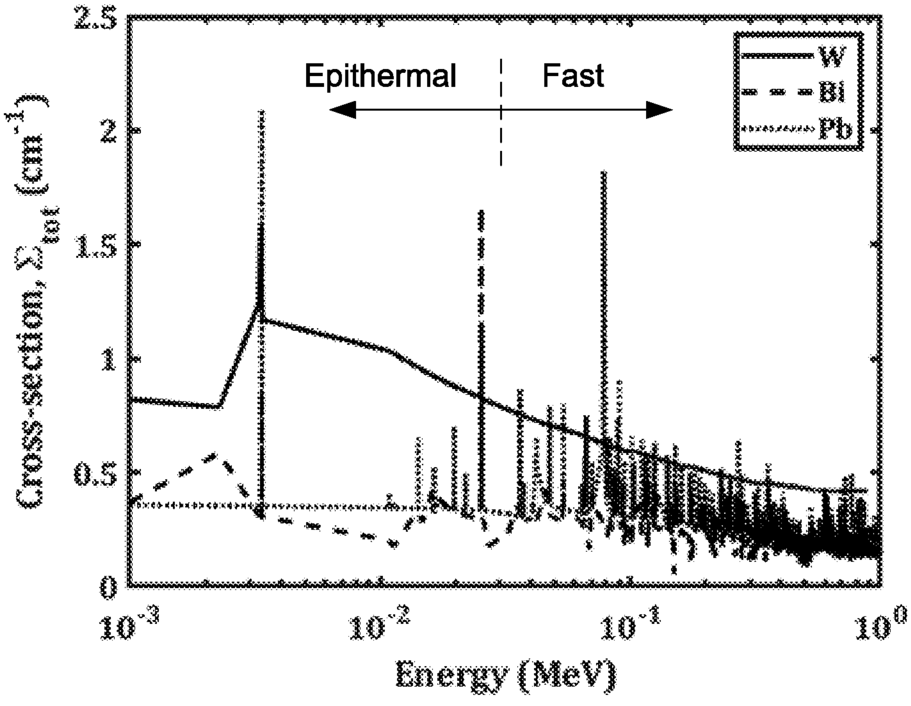
Figure 12H:
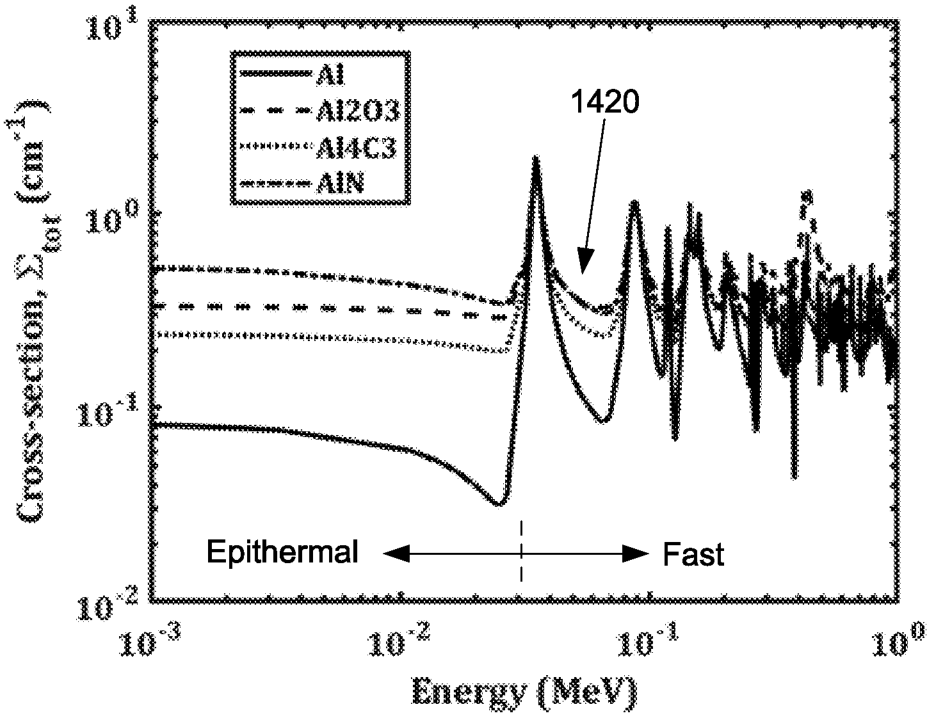
Figure 12I:
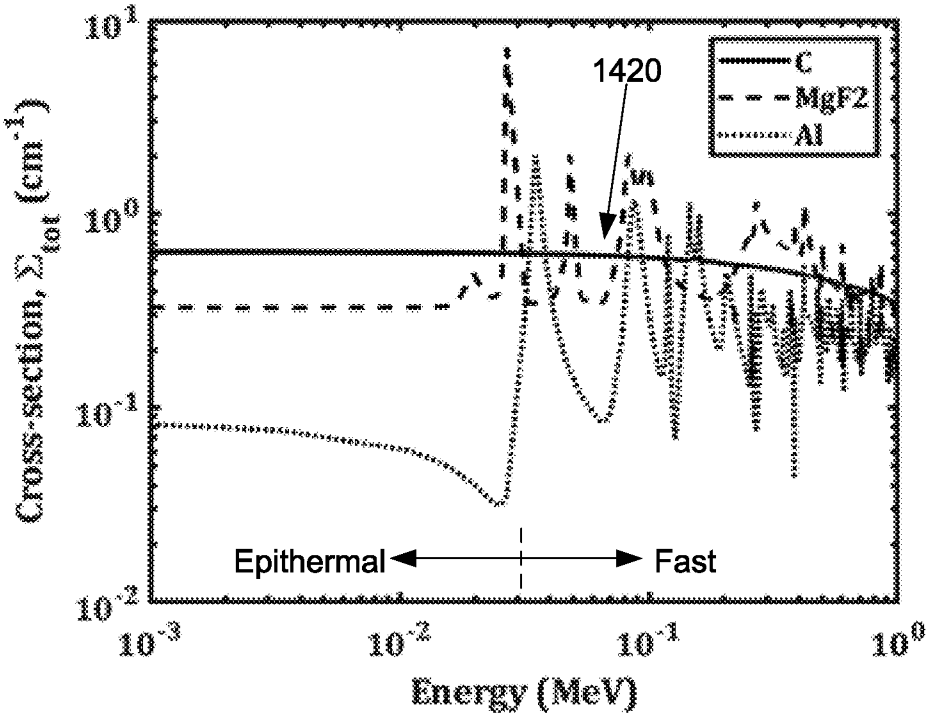
Figure 12J:
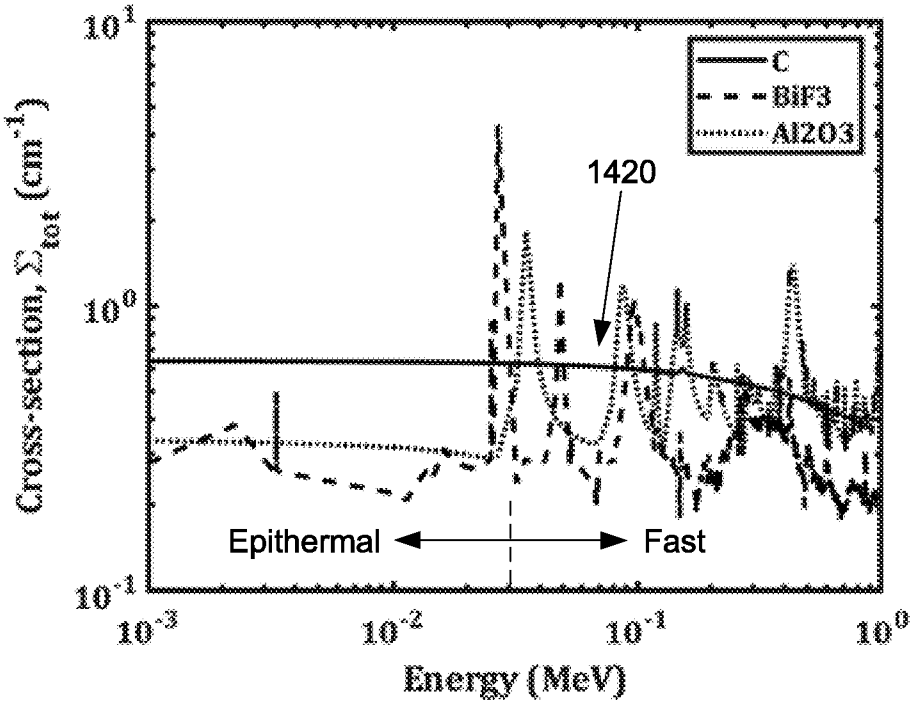
Figure 12K:
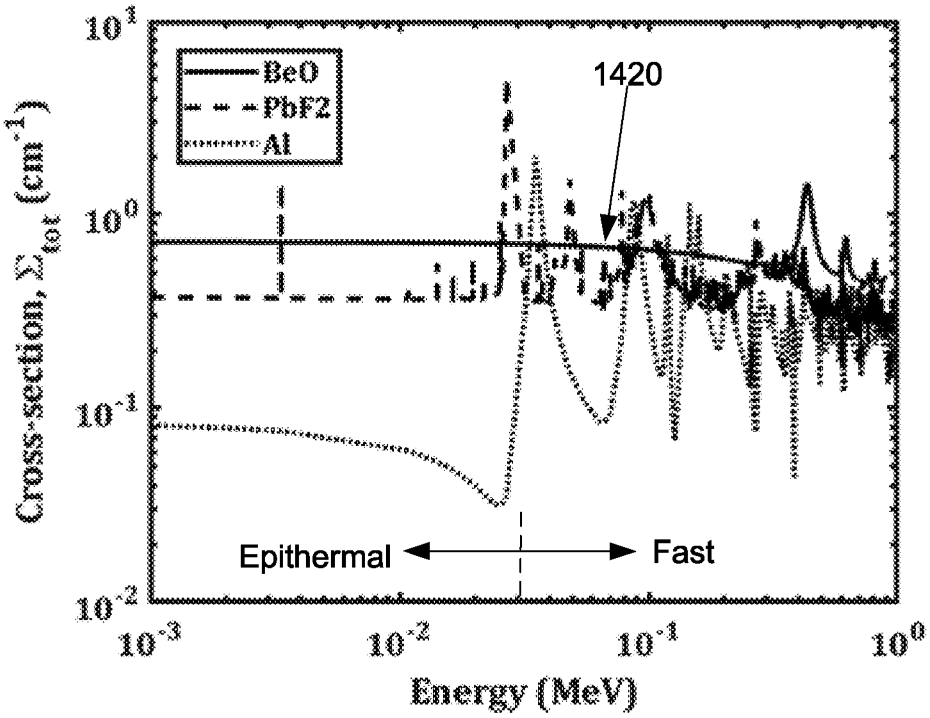
Figure 12L:
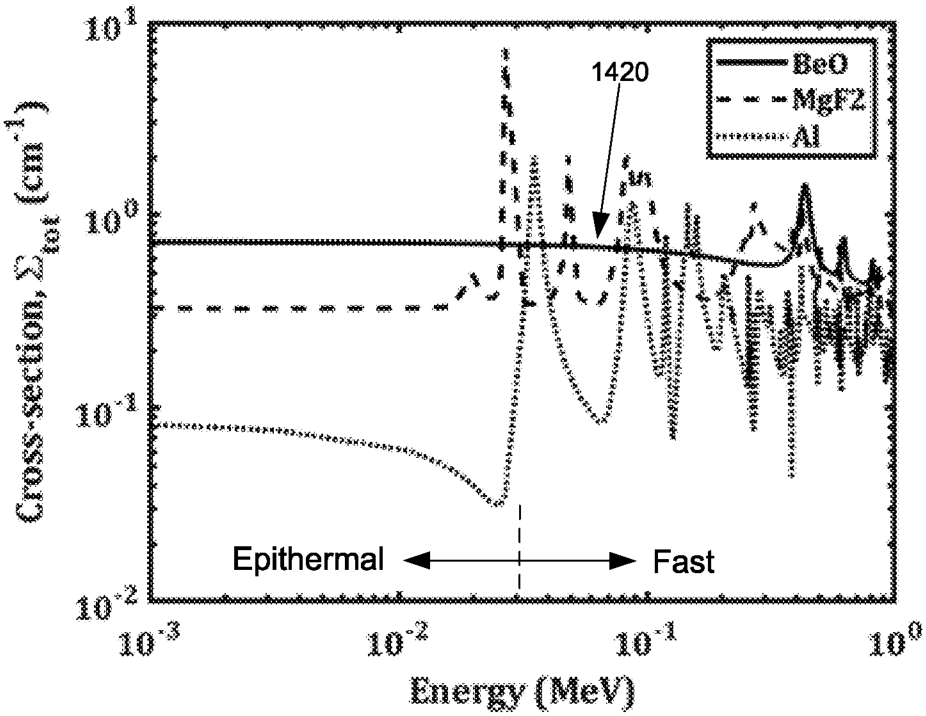
Figure 12M:
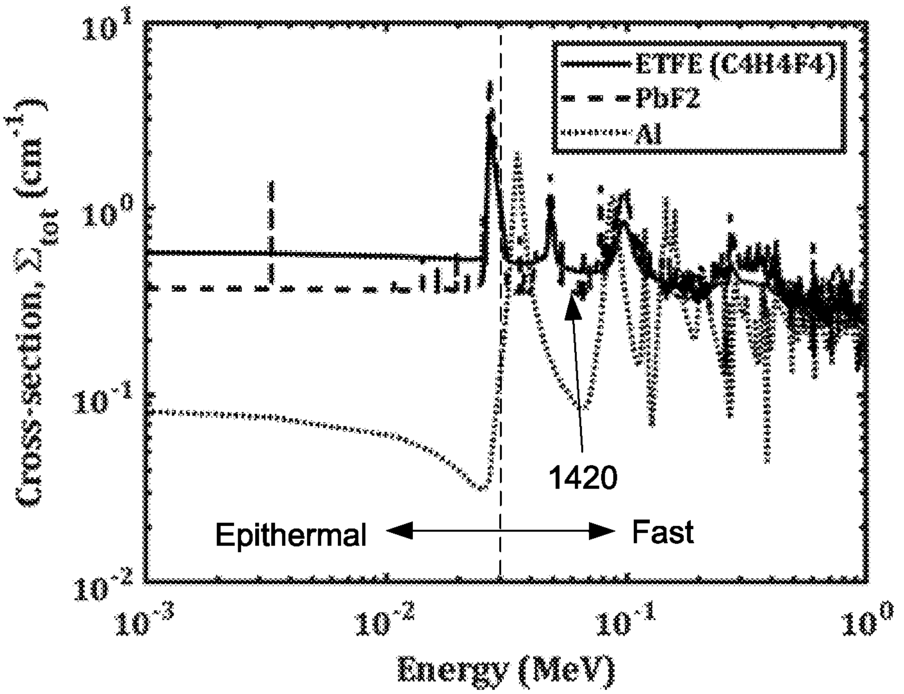
Figure 12N:
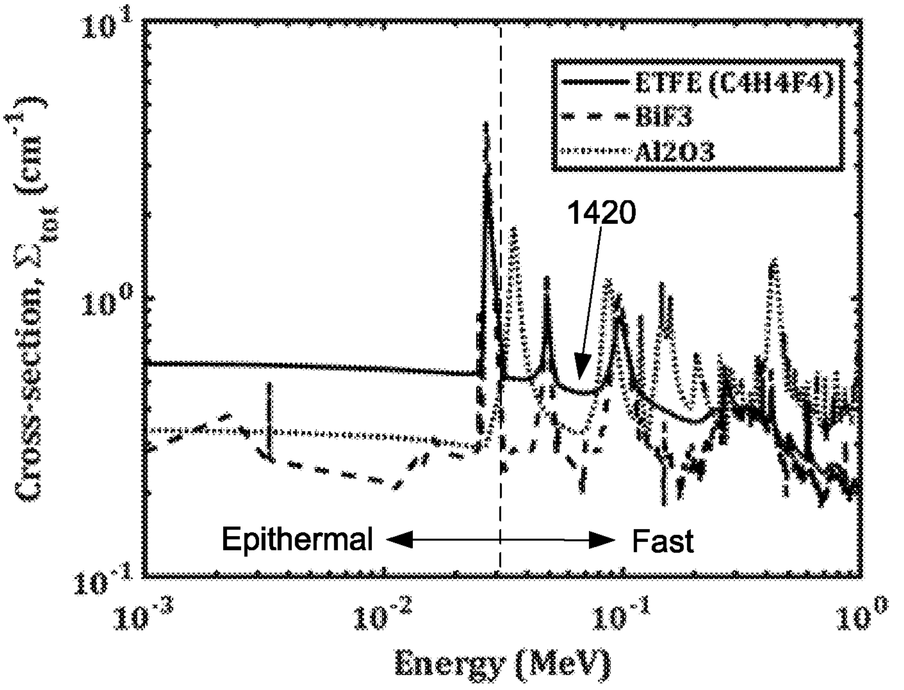

Certain elements exhibit a broad 1/V region with significant cross-sections that can extend across the thermal energy region and at least a substantial portion of the epithermal energy region. The 1/V region of the cross-sections can have a constant slope, e.g., flat, and can be decreasing with a substantial slope. These elements are particularly useful at absorbing neutrons and are referred to herein as absorption materials ("Ab"), examples of which include hydrogen, lithium, boron, and carbon. These materials can be referred to either as Ab materials or as NR-S materials given the context. FIG. 12E is a graph depicting cross-sections for carbon, boron, and lithium. Boron has a 1/V region 1410 that extends across the thermal energies and most of the epithermal energy region up to approximately 10 keV, while lithium's 1/V region 1410 extends across both the thermal and epithermal regions up to approximately 50 keV.

Figure 12O:
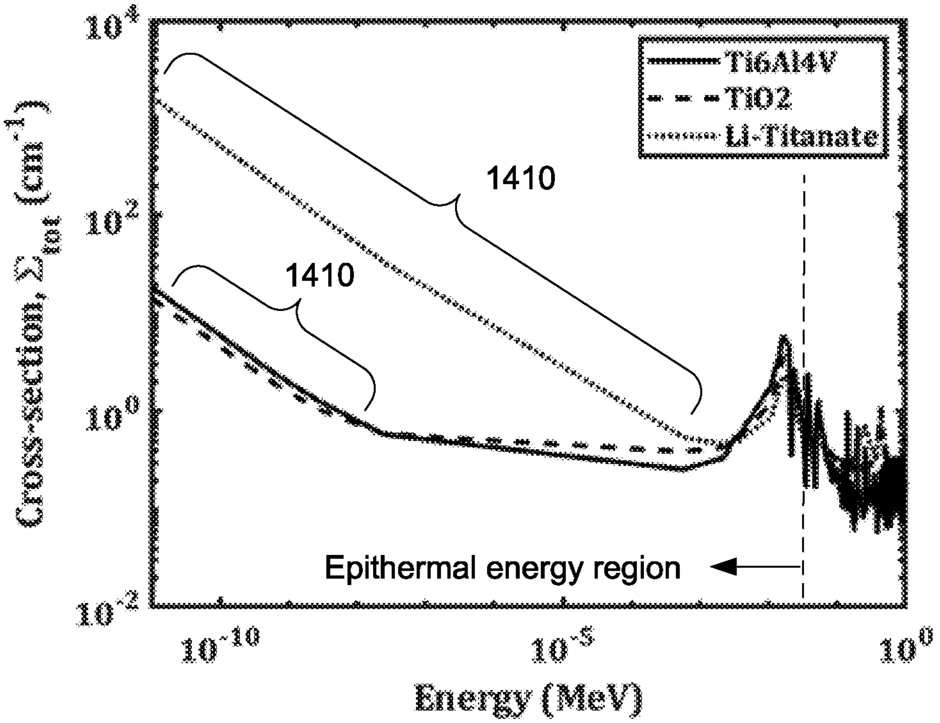
Figure 12P:
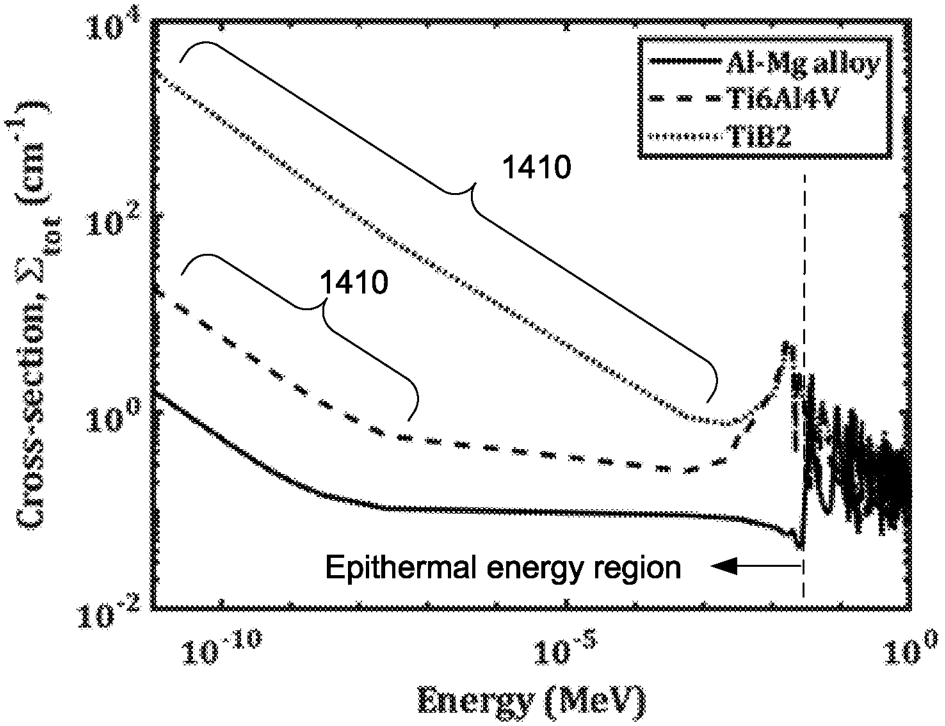
Figure 12Q:
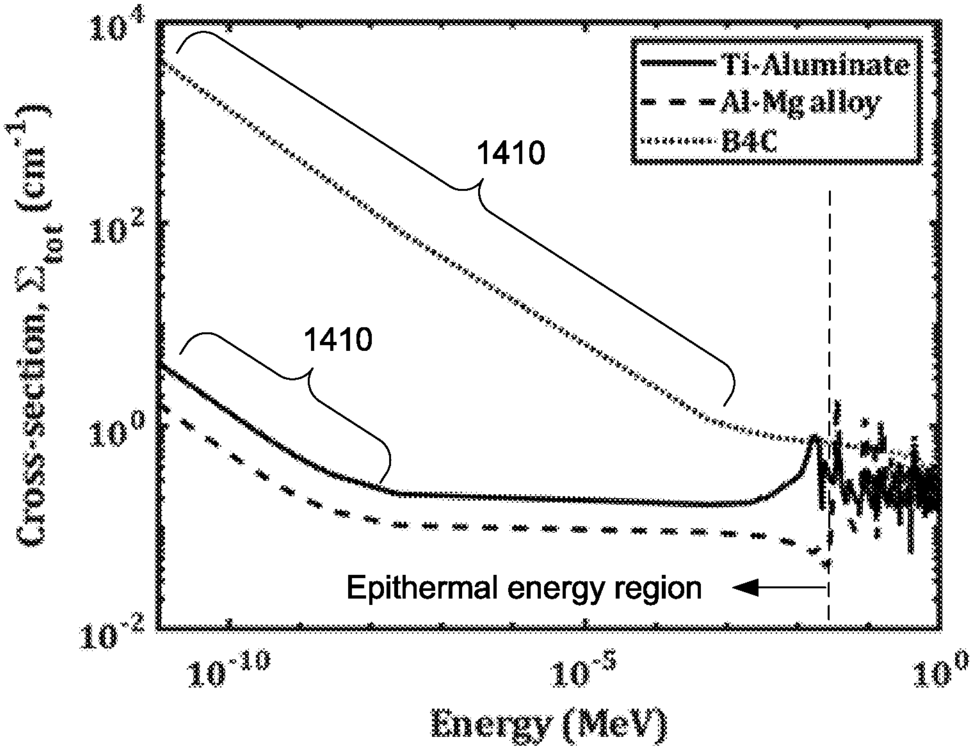

FIG. 12O depicts lithium titanate, alongside two Epi-S materials, a titanium-aluminum-vanadium alloy (Ti-6Al-4V) and titanium dioxide (TiO2). FIG. 12P depicts titanium diboride, alongside the Epi-S material Ti6Al4V and a Fast-S aluminum-magnesium compound. FIG. 12Q depicts boron carbide ($B_4C$) alongside the Epi-S and NR-S material titanium aluminate and the Fast-S aluminum-magnesium compound. As can be seen here lithium titanate, titanium diboride, and boron carbide have significant 1/V regions that extend across most of the epithermal energy range. Lithium titanate and titanium diboride both have significant resonance peaks at the upper epithermal energy range, and boron carbide has a significant cross section across the entire epithermal energy range, which contributes to the usefulness of these materials in scattering epithermal neutrons for absorption. As such, materials having lithium or boron make excellent neutron absorbers and can also be used as significant Epi-S materials.

Ab materials can be used in regions where elimination of the neutrons is desirable. All Ab elements can be used in the examples of NBC 200 and/or NCA 300 alone, in combination with each other, or in combination with other materials (e.g., Fast-S, Epi-S, NR-S, R) to achieve the desired structural characteristics and absorptive capability. Additional examples of combinations include hydrogenous materials such as polymers like polyethylene (PE) and boronated polyethylene (B-PE). Additional examples of Ab materials include cadmium (Cd), gadolinium (Gd), indium (In), and hafnium (Hf)

Example R Materials

Certain elements tend to redirect neutrons through elastic scattering with minimal neutron energy loss. This process is proportional to the Z value of the element in contrast to the structure of the cross-section. Each element with a Z value of from and including 74 (tungsten) up to and including 92 (uranium) are elements that are particularly adept at redirecting neutrons, and are referred to generally herein as redirection ("R") materials. These materials are also adept at absorbing gamma radiation. FIG. 12F is a graph depicting cross-sections for R materials tungsten, bismuth, and lead across thermal and epithermal energies, while FIG. 12G is a graph depicting the same cross-sections for energies from one keV to one MeV. Of the three materials tungsten has the largest cross-section outside of resonance peaks and thus the greatest scattering capability. All R elements can be used alone, in combination with each other (e.g., lead and bismuth alloys (e.g., 40-50% Pb by weight)), or in combination with other materials (e.g., Fast-S, Epi-S, NR-S, Ab) in regions where increased redirection is desired and/or increased gamma radiation shielding. R materials can be used in combination with one or more S materials (e.g., $PbF_2$ and $BiF_3$ as depicted in FIG. 12B) in order to redirect neutrons with minimal energy loss into collisions with materials (Fast-S, Epi-S, NR-S) having the desired scattering characteristics to locally intensify the number of energy reducing neutron collisions that take place (referred to generally herein as an "R+S" combination).

Example Carbide, Nitride, Oxide Compounds for Non-Resonant Effects

Carbon, nitrogen, and oxygen are NR-S materials that can be combined with other scattering elements to add or enhance non-resonant scattering capabilities of the overall material. For example, aluminum is a Fast-S element that can be formed as an oxide (e.g., $Al_2O_3$), carbide (e.g., $Al_4C_3$), and nitride (e.g., AlN). Examples of each are depicted in the cross-section versus energy graph of FIG. 12H. When aluminum is formed into an oxide, carbide, or nitride compound the resulting material's resonant cross-sections are equal to that of bare aluminum, but the cross-sections within gaps are significantly higher, as evidenced by the cross-sections within gap 1420 in FIG. 12H. As such, aluminum has a higher average cross-section in the epithermal and fast energy regions resulting from the addition of the NR-S material. Similar gap-raising results can be obtained when other Fast-S, Epi-S, and NR-S elements (e.g., magnesium, titanium, vanadium, beryllium, lithium, boron, hydrogen and/or fluorine) are formed into oxides, nitrides, carbides, or carbonates. Aluminum oxides and titanium oxides can be combined with other elements (X) to become aluminates ($X+Al_2O_3$) or titanates ($X+TiO_2$). When such combinations are formed, the oxygen, nitrogen, or carbon content is preferably 20-80% by mass of the overall material. Oxides, nitrides, and carbides are advantageous in that they can be readily sintered into numerous complex shapes.

Various aspects of the present subject matter are set forth below, in review of, and/or in supplementation to, the examples described thus far, with the emphasis here being on the interrelation and interchangeability of the following embodiments and the aspects thereof. In other words, an emphasis is on the fact that each aspect of the embodiments can be combined with each and every other aspect unless explicitly stated or taught otherwise.

In a first group of embodiments, a neutron collimator assembly (NCA) is provided, the NCA including: a beam axis defining a path of a neutron beam; multiple neutron beam collimators each having an aperture of a different size; a mounting assembly mechanically supporting the neutron beam collimators; one or more electro-mechanical actuators mechanically coupled to the mounting assembly and configured to move the neutron beam collimators relative to the beam axis; and an electronic controller communicatively coupled with the one or more electro-mechanical actuators, the electronic controller programmed to generate control signals that cause the one or more electro-mechanical actuators to remove a first of the neutron beam collimators from the beam axis and align a second of the neutron beam collimators with the beam axis.

In some embodiments of the first group, the mounting assembly can position each of the neutron beam collimators in a common plane orthogonal to the beam axis. The one or more electro-mechanical actuators can be configured to simultaneously translate all of the neutron beam collimators along a first axis orthogonal to the beam axis. The one or more electro-mechanical actuators can be configured to simultaneously translate all of the neutron beam collimators along a first axis orthogonal to the beam axis. The mounting assembly can maintain the neutron beam collimators at a constant separation from each other along the first axis while simultaneously translating the neutron beam collimators. The one or more electro-mechanical actuators can be configured to independently translate the neutron beam collimators along a second axis orthogonal to the beam axis and non-parallel to the first axis. The first axis can be offset from the beam axis. The second axis can intersect the beam axis.

In some embodiments of the first group, the mounting assembly can include a rigid body mechanically attached to each of the neutron beam collimators to maintain a fixed spatial relationship between each of the neutron beam collimators. The rigid body can position each of the neutron beam collimators in a common plane. The rigid body can position each of the neutron beam collimators on a straight line segment. The rigid body can position each of the neutron beam collimators on a circular arc. The one or more electro-mechanical actuators can be configured to move the rigid body to remove the first of the neutron beam collimators from the beam axis and align the second of the neutron beam collimators with the beam axis. Movement of the rigid body can include translations of the rigid body in a translation plane. The translation plane can be orthogonal to the beam axis. Movement of the rigid body can include a rotation of the rigid body about a rotation axis. The rotation axis can be offset from and parallel to the beam axis. The rotation axis can be orthogonal to the beam axis. The rotation axis can intersect the beam axis.

In some embodiments of the first group, the mounting assembly can include a guide rail mechanically supporting the neutron beam collimators and defining a fixed path of movement for the neutron beam collimators. The one or more electro-mechanical actuators can be configured to move the neutron beam collimators along the fixed path defined by the guide rail to remove the first of the neutron beam collimators from the beam axis and align the second of the neutron beam collimators with the beam axis.

In the embodiments of the first group, the NCA can include an adjustable platform for positioning a patient relative to the beam axis to receive the neutron beam. The one or more electro-mechanical actuators can be mechanically coupled to the adjustable platform. The electronic controller can be programmed to generate control signals that cause the one or more electro-mechanical actuators to move the adjustable platform relative to the beam axis.

In the embodiments of the first group, the NCA can include a safety cover between the adjustable platform and the neutron beam collimators. The safety cover can conceal the neutron beam collimators from view of the patient and prevent the patient from interacting with the neutron beam collimators. The safety cover can include at least one of: carbon fiber, wood, fiber panels, gypsum, fiberglass, glass, boron carbide, or beryllium oxide. The safety cover can have a thickness in a range from 3 millimeters (mm) to 13 mm. The safety cover can include a transmission panel configured to transmit neutrons along the beam axis. The transmission panel can include at least one of: lithium, carbon, boron, or silicon. The transmission panel can have a thickness in a range from 0.5 mm to 10 mm.

In a second group of embodiments, a neutron collimator assembly (NCA) is provided, the NCA including: a beam axis defining a path of a neutron beam; multiple neutron beam collimators each having an aperture of a different size; an adjustable platform for positioning a patient relative to the beam axis to receive the neutron beam; a mounting assembly attached to the adjustable platform and configured to releasably secure any of the neutron beam collimators to the adjustable platform; one or more electro-mechanical actuators mechanically coupled to the adjustable platform; and an electronic controller communicatively coupled with the one or more electro-mechanical actuators, the electronic controller programmed to generate control signals that cause the one or more electro-mechanical actuators to move the adjustable platform relative to the beam axis to align a neutron beam collimator secured to the adjustable platform with the beam axis.

In the embodiments of the first and second groups, the NCA can include a radiation shield arranged in a plane orthogonal to the beam axis and configured to move in the plane. The one or more electro-mechanical actuators can be mechanically coupled to the radiation shield. The electronic controller can be programmed to generate control signals that cause the one or more electro-mechanical actuators to move the radiation shield in the plane to position the radiation shield relative to the beam axis. The radiation shield can have a dimension of 1 meter or more in a first direction in the plane. The radiation shield can have a dimension of 0.5 meters or more in a second direction in the plane. The second direction can be orthogonal to the first direction. The radiation shield can include one or more solid plates configured to absorb gamma rays. Each of the one or more plates of the radiation shield can include lead. Each of the one or more plates of the radiation shield can have a thickness of 10 centimeters (cm) or less. The radiation shield can include one or more beam ports, each beam port can be configured to transmit neutrons in a direction parallel to the beam axis. Each of the one or more beam ports can include an air gap traversing through the radiation shield. Each of the one or more beam ports can be lined with a material configured to scatter neutrons. The material lining each of the one or more beam ports can include at least one of: beryllium, carbon, ethylene tetrafluoroethylene, or lead. The beryllium can be in beryllium oxide. The beryllium and the carbon can be in beryllium carbide or beryllium carbonate. Each of the one or more beam ports can have a circular shape. At least one of the one or more beam ports can have a conical portion. Each of the one or more beam ports can have a diameter in a range from 1 cm to 30 cm. The radiation shield can be positioned so that each of the one or more beam ports is offset the beam axis. The radiation shield can be positioned so that one of the one or more beam ports is aligned with the beam axis.

In some embodiments of the first and second groups, the NCA has at least four neutron beam collimators.

In some embodiments of the first and second groups, the aperture of each of the neutron beam collimators can be a circular aperture. The circular aperture of each of the neutron beam collimators can have a diameter in a range from 1 cm to 30 cm. The circular aperture of each of the neutron beam collimators can have a conical portion.

In some embodiments of the first and second groups, each of the neutron beam collimators can include a solid plate defining the aperture. The plate of each of the neutron beam collimators can have a maximum thickness of 10 cm or less. The plate of each of the neutron beam collimators can have a maximum lateral dimension of 60 cm or less. The plate of each of the neutron beam collimators can have an outer perimeter having a circular shape. The plate of each of the neutron beam collimators can have a conical outer surface.

In some embodiments of the first and second groups, each of the neutron beam collimators can include: a central region defining the aperture and configured to scatter neutrons; an intermediate region located laterally around the central region and configured to absorb neutrons; and a peripheral region encapsulating the central region and the intermediate region, where the peripheral region can be configured to absorb gamma rays. The central region can include a first material configured to scatter epithermal neutrons into a thermal energy range. The first material can include at least one of: beryllium, carbon, ethylene tetrafluoroethylene, or lead. The beryllium can be in beryllium oxide. The beryllium and the carbon can be in beryllium carbide or beryllium carbonate. The intermediate region can include a second material configured to absorb thermal neutrons. The second material can include boron carbide. The peripheral region can include lead. Each of the neutron beam collimators can be manufactured by three-dimensional (3D) printing.

In some embodiments of the first and second groups, the neutron beam collimators can be sized and shaped to receive the neutron beam having a beam diameter in a range from 20 cm to 30 cm.

In some embodiments of the first and second groups, the neutron beam collimators can include a beam stop having no aperture. The beam stop can include a solid plate configured to absorb gamma rays. The plate of the beam stop can include lead. The plate of the beam stop can have a thickness of 10 cm or less. The plate of the beam stop can have a maximum lateral dimension of 60 cm or less. The plate of the beam stop can have an outer perimeter having a circular shape. The plate of the beam stop can have a conical outer surface. An outer profile of each of the neutron beam collimators and the beam stop can have the same size and shape.

In the embodiments of the first and second groups, the NCA can include an interlock system communicatively coupled with the electronic controller, the interlock system configured to verify the aperture size of any of the neutron beam collimators aligned with the beam axis agrees with an aperture size determined by the control signals generated by the electronic controller. The interlock system can include one or more collision sensors, each collision sensor can be configured to detect possible collisions between objects. The interlock system can be configured to halt movement of the one or more electro-mechanical actuators when any of the one or more collision sensors detects a possible collision between objects.

In some embodiments of the first and second groups, the neutron beam can be in an epithermal energy range.

In some embodiments of the first and second groups, the NCA can be configured for use in a boron neutron capture therapy (BNCT) system.

In a third group of embodiments, a method for collimating the neutron beam to multiple beam sizes using the NCA of any embodiment of the first and second groups of embodiments is provided. The method includes: propagating the neutron beam along the beam axis; and generating, using the electronic controller, the control signals that cause the one or more electro-mechanical actuators to: (i) remove the first of the neutron beam collimators from the beam axis and align the second of the neutron beam collimators with the beam axis, or (ii) move the adjustable platform relative to the beam axis to align the neutron beam collimator secured to the adjustable platform with the beam axis, where the aperture of each neutron beam collimator corresponds to a respective beam size of the neutron beam.

In a fourth group of embodiments, a method for treating a patient with BNCT using the NCA of any embodiment of the first and second groups of embodiments is provided. The method includes: propagating the neutron beam along the beam axis toward the patient; and generating, using the electronic controller, the control signals that cause the one or more electro-mechanical actuators to: (i) remove the first of the neutron beam collimators from the beam axis and align the second of the neutron beam collimators with the beam axis, or (ii) move the adjustable platform relative to the beam axis to align the neutron beam collimator secured to the adjustable platform with the beam axis, where the aperture of each neutron beam collimator corresponds to a respective beam size of the neutron beam.

In a fifth group of embodiments, a method for moving the adjustable platform relative to the beam axis using the NCA of any appropriate embodiment of the first and second groups of embodiments is provided. The method includes: generating, using the electronic controller, the control signals that cause the one or more electro-mechanical actuators to move the adjustable platform relative to the beam axis.

In a sixth group of embodiments, a method for moving the radiation shield in the plane using the NCA of any appropriate embodiment of the first and second groups of embodiments is provided. The method includes: generating, using the electronic controller, the control signals that cause the one or more electro-mechanical actuators to move the radiation shield in the plane.

In a seventh group of embodiments, a neutron beam collimator is provided, the neutron beam collimator including: an aperture for passage of a neutron beam along a beam axis; a frame having an opening corresponding to a largest aperture; one or more elements moveable relative to the axis to vary a size of the aperture; one or more electro-mechanical actuators mechanically coupled to the one or more elements; and an electronic controller communicatively coupled with the one or more electro-mechanical actuators, the electronic controller programmed to generate control signals that cause the one or more electro-mechanical actuators to move the one or more elements relative to the beam axis to vary the size of the aperture.

In some embodiments of the seventh group, the one or more elements can include multiple plates arranged at different circumferential locations around the beam axis.

In some embodiments of the seventh group, the frame can include a diaphragm iris and the one or more elements can be multiple iris blades of the diaphragm iris. The neutron beam collimator can have at least five iris blades. The iris blades can be curved.

In an eighth group of embodiments, a method for varying the size of the aperture of the neutron beam collimator of any embodiment of the seventh group of embodiments is provided. The method includes: generating, using the electronic controller, the control signals that cause the one or more electro-mechanical actuators to move the one or more elements relative to the beam axis to vary the size of the aperture.

To the extent the examples disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein and in the appended claims, the singular forms "a," "an," and "the" include plural referents unless the context clearly dictates otherwise.

While the examples are susceptible to various modifications and alternative forms, specific examples thereof have been shown in the drawings and are herein described in detail. It should be understood, however, that these examples are not to be limited to the particular form disclosed, but to the contrary, these examples are to cover all modifications, equivalents, and alternatives falling within the spirit of the disclosure. Furthermore, any features, functions, steps, or elements of the examples may be recited in or added to the claims, as well as negative limitations that define the inventive scope of the claims by features, functions, steps, or elements that are not within that scope.

What is claimed is:

1. A neutron collimator assembly (NCA), comprising:
- a beam axis defining a path of a neutron beam;
- a plurality of neutron beam collimators each having an aperture of a different size;
- a mounting assembly mechanically supporting the neutron beam collimators;
- one or more electro-mechanical actuators mechanically coupled to the mounting assembly and configured to move the neutron beam collimators relative to the beam axis; and
- an electronic controller communicatively coupled with the one or more electro-mechanical actuators, the electronic controller programmed to generate control signals that cause the one or more electro-mechanical actuators to remove a first of the neutron beam collimators from the beam axis and align a second of the neutron beam collimators with the beam axis.

2. The NCA of claim 1, wherein the mounting assembly positions each of the neutron beam collimators in a common plane orthogonal to the beam axis.

3. The NCA of claim 1, wherein the one or more electro-mechanical actuators are configured to simultaneously translate all of the neutron beam collimators along a first axis orthogonal to the beam axis.

4. The NCA of claim 3, wherein the mounting assembly maintains the neutron beam collimators at a constant separation from each other along the first axis while simultaneously translating the neutron beam collimators.

5. The NCA of claim 3, wherein the one or more electro-mechanical actuators are configured to independently translate the neutron beam collimators along a second axis orthogonal to the beam axis and non-parallel to the first axis.

6. The NCA of claim 3, wherein the first axis is offset from the beam axis.

7. The NCA of claim 5, wherein the second axis intersects the beam axis.

8. The NCA of claim 1, wherein the mounting assembly comprises a rigid body mechanically attached to each of the neutron beam collimators to maintain a fixed spatial relationship between each of the neutron beam collimators.

9. The NCA of claim 8, wherein rigid body positions each of the neutron beam collimators in a common plane.

10. The NCA of claim 9, wherein the rigid body positions each of the neutron beam collimators on a straight line segment.

11. The NCA of claim 9, wherein the rigid body positions each of the neutron beam collimators on a circular arc.

12. The NCA of claim 8, wherein the one or more electro-mechanical actuators are configured to move the rigid body to remove the first of the neutron beam collimators from the beam axis and align the second of the neutron beam collimators with the beam axis.

13. The NCA of claim 12, wherein movement of the rigid body comprises translations of the rigid body in a translation plane.

14. The NCA of claim 13, wherein the translation plane is orthogonal to the beam axis.

15. The NCA of claim 12, wherein movement of the rigid body comprises a rotation of the rigid body about a rotation axis.

16. The NCA of claim 15, wherein the rotation axis is offset from and parallel to the beam axis.

17. The NCA of claim 15, wherein the rotation axis is orthogonal to the beam axis.

18. The NCA of claim 17, wherein the rotation axis intersects the beam axis.

19. The NCA of claim 1, wherein the mounting assembly comprises a guide rail mechanically supporting the neutron beam collimators and defining a fixed path of movement for the neutron beam collimators.

20. The NCA of claim 19, wherein the one or more electro-mechanical actuators are configured to move the neutron beam collimators along the fixed path defined by the guide rail to remove the first of the neutron beam collimators from the beam axis and align the second of the neutron beam collimators with the beam axis.

21. The NCA of claim 1, further comprising:

an adjustable platform for positioning a patient relative to the beam axis to receive the neutron beam.

22. The NCA of claim 21, wherein the one or more electro-mechanical actuators are mechanically coupled to the adjustable platform, the electronic controller programmed to generate control signals that cause the one or more electro-mechanical actuators to move the adjustable platform relative to the beam axis.

23. The NCA of claim 21, further comprising:

a safety cover between the adjustable platform and the neutron beam collimators, the safety cover concealing the neutron beam collimators from view of the patient and preventing the patient from interacting with the neutron beam collimators.

24. The NCA of claim 23, wherein the safety cover comprises at least one of: carbon fiber, wood, fiber panels, gypsum, fiberglass, glass, boron carbide, or beryllium oxide.

25. The NCA of claim 23, wherein the safety cover has a thickness in a range from 3 millimeters (mm) to 13 mm.

26. The NCA of claim 23, wherein the safety cover comprises a transmission panel configured to transmit neutrons along the beam axis.

27. The NCA of claim 26, wherein the transmission panel comprises at least one of: lithium, carbon, boron, or silicon.

28. The NCA of claim 26, wherein the transmission panel has a thickness in a range from 0.5 mm to 10 mm.

29. The NCA of claim 1, further comprising:

a radiation shield arranged in a plane orthogonal to the beam axis and configured to move in the plane.

30. The NCA of claim 29, wherein the one or more electro-mechanical actuators are mechanically coupled to the radiation shield, the electronic controller programmed to generate control signals that cause the one or more electro-mechanical actuators to move the radiation shield in the plane to position the radiation shield relative to the beam axis.

31. The NCA of claim 29, wherein the radiation shield has a dimension of 1 meter or more in a first direction in the plane.

32. The NCA of claim 31, wherein the radiation shield has a dimension of 0.5 meters or more in a second direction in the plane, the second direction orthogonal to the first direction.

33. The NCA of claim 29, wherein the radiation shield comprises one or more solid plates configured to absorb gamma rays.

34. The NCA of claim 33, wherein each of the one or more solid plates of the radiation shield comprises lead.

35. The NCA of claim 33, wherein each of the one or more solid plates of the radiation shield has a thickness of 10 centimeters (cm) or less.

36. The NCA of claim 29, wherein the radiation shield comprises one or more beam ports, each beam port configured to transmit neutrons in a direction parallel to the beam axis.

37. The NCA of claim 36, wherein each of the one or more beam ports comprises an air gap traversing through the radiation shield.

38. The NCA of claim 37, wherein each of the one or more beam ports is lined with a material configured to scatter neutrons.

39. The NCA of claim 38, wherein the material lining each of the one or more beam ports comprises at least one of: beryllium, carbon, ethylene tetrafluoroethylene, or lead.

40. The NCA of claim 39, wherein the beryllium is in beryllium oxide.

41. The NCA of claim 39, wherein the beryllium and the carbon are in beryllium carbide or beryllium carbonate.

42. The NCA of claim 36, wherein each of the one or more beam ports has a circular shape.

43. The NCA of claim 42, wherein at least one of the one or more beam ports has a conical portion.

44. The NCA of claim 42, wherein each of the one or more beam ports has a diameter in a range from 1 cm to 30 cm.

45. The NCA of claim 36, wherein the radiation shield is positioned so that each of the one or more beam ports is offset the beam axis.

46. The NCA of claim 36, wherein the radiation shield is positioned so that one of the one or more beam ports is aligned with the beam axis.

47. The NCA of claim 1, having at least four neutron beam collimators.

48. The NCA of claim 1, wherein the aperture of each of the neutron beam collimators is a circular aperture.

49. The NCA of claim 48, wherein the circular aperture of each of the neutron beam collimators has a diameter in a range from 1 cm to 30 cm.

50. The NCA of claim 48, wherein the circular aperture of each of the neutron beam collimators has a conical portion.

51. The NCA of claim 1, wherein each of the neutron beam collimators comprises a plate defining the aperture.

52. The NCA of claim 51, wherein the plate of each of the neutron beam collimators has a maximum thickness of 10 cm or less.

53. The NCA of claim 51, wherein the plate of each of the neutron beam collimators has a maximum lateral dimension of 60 cm or less.

54. The NCA of claim 51, wherein the plate of each of the neutron beam collimators has an outer perimeter having a circular shape.

55. The NCA of claim 51, wherein the plate of each of the neutron beam collimators has a conical outer surface.

56. The NCA of claim 1, wherein each of the neutron beam collimators comprises:

a central region defining the aperture and configured to scatter neutrons;

an intermediate region located laterally around the central region and configured to absorb neutrons; and a peripheral region encapsulating the central region and the intermediate region, wherein the peripheral region is configured to absorb gamma rays.

57. The NCA of claim 56, wherein the central region comprises a first material configured to scatter epithermal neutrons into a thermal energy range.

58. The NCA of claim 57, wherein the first material comprises at least one of: beryllium, carbon, ethylene tetrafluoroethylene, or lead.

59. The NCA of claim 58, wherein the beryllium is in beryllium oxide.

60. The NCA of claim 58, wherein the beryllium and the carbon are in beryllium carbide or beryllium carbonate.

61. The NCA of claim 56, wherein the intermediate region comprises a second material configured to absorb thermal neutrons.

62. The NCA of claim 61, wherein the second material comprises boron carbide.

63. The NCA of claim 56, wherein the peripheral region comprises lead.

64. The NCA of claim 56, wherein each of the neutron beam collimators is manufactured by three-dimensional (3D) printing.

65. The NCA of claim 1, wherein the neutron beam collimators are sized and shaped to receive the neutron beam having a beam diameter in a range from 20 cm to 30 cm.

66. The NCA of claim 1, wherein the neutron beam collimators include a beam stop having no aperture.

67. The NCA of claim 66, wherein the beam stop comprises a solid plate configured to absorb gamma rays.

68. The NCA of claim 67, wherein the solid plate of the beam stop comprises lead.

69. The NCA of claim 67, wherein the solid plate of the beam stop has a thickness of 10 cm or less.

70. The NCA of claim 67, wherein the solid plate of the beam stop has a maximum lateral dimension of 60 cm or less.

71. The NCA of claim 67, wherein the solid plate of the beam stop has an outer perimeter having a circular shape.

72. The NCA of claim 67, wherein the solid plate of the beam stop has a conical outer surface.

73. The NCA of claim 66, wherein an outer profile of each of the neutron beam collimators and the beam stop has a same size and shape.

74. The NCA of claim 1, further comprising:

an interlock system communicatively coupled with the electronic controller, the interlock system configured to verify an aperture size of any of the neutron beam collimators aligned with the beam axis agrees with an aperture size determined by the control signals generated by the electronic controller.

75. The NCA of claim 74, wherein the interlock system comprises one or more collision sensors, each collision sensor configured to detect possible collisions between objects.

76. The NCA of claim 75, wherein the interlock system is configured to halt movement of the one or more electro-mechanical actuators when any of the one or more collision sensors detects a possible collision between objects.

77. The NCA of claim 1, wherein the neutron beam is in an epithermal energy range.

78. The NCA of claim 1, configured for use in a boron neutron capture therapy (BNCT) system.

79. A method for collimating a neutron beam to a plurality of beam sizes using a neutron collimator assembly (NCA) comprising:

a beam axis defining a path of the neutron beam;

a plurality of neutron beam collimators each having an aperture of a different size;

a mounting assembly mechanically supporting the neutron beam collimators;

one or more electro-mechanical actuators mechanically coupled to the mounting assembly and configured to move the neutron beam collimators relative to the beam axis; and an electronic controller communicatively coupled with the one or more electro-mechanical actuators, the electronic controller programmed to generate control signals that cause the one or more electro-mechanical actuators to remove a first of the neutron beam collimators from the beam axis and align a second of the neutron beam collimators with the beam axis, the method comprising:

propagating the neutron beam along the beam axis; and generating, using the electronic controller, the control signals that cause the one or more electro-mechanical actuators to remove the first of the neutron beam collimators from the beam axis and align the second of the neutron beam collimators with the beam axis, wherein the aperture of each neutron beam collimator corresponds to a respective beam size of the neutron beam.

80. The method of claim 79, wherein the NCA further comprises an adjustable platform for positioning a patient relative to the beam axis to receive the neutron beam, wherein the one or more electro-mechanical actuators are mechanically coupled to the adjustable platform, the electronic controller programmed to generate control signals that cause the one or more electro-mechanical actuators to move the adjustable platform relative to the beam axis, the method further comprising:

generating, using the electronic controller, the control signals that cause the one or more electro-mechanical actuators to move the adjustable platform relative to the beam axis.

81. The method of claim 79, wherein the NCA further comprises a radiation shield arranged in a plane orthogonal to the beam axis and configured to move in the plane, wherein the one or more electro-mechanical actuators are mechanically coupled to the radiation shield, the electronic controller programmed to generate control signals that cause the one or more electro-mechanical actuators to move the radiation shield in the plane to position the radiation shield relative to the beam axis, the method further comprising:

generating, using the electronic controller, the control signals that cause the one or more electro-mechanical actuators to move the radiation shield in the plane.

82. A neutron collimator assembly (NCA), comprising:

a beam axis defining a path of a neutron beam;

a plurality of neutron beam collimators each having an aperture of a different size;

an adjustable platform for positioning a patient relative to the beam axis to receive the neutron beam;

a mounting assembly attached to the adjustable platform and configured to releasably secure any of the neutron beam collimators to the adjustable platform;

one or more electro-mechanical actuators mechanically coupled to the adjustable platform; and an electronic controller communicatively coupled with the one or more electro-mechanical actuators, the electronic controller programmed to generate control signals that cause the one or more electro-mechanical actuators to move the adjustable platform relative to the beam axis to align a neutron beam collimator secured to the adjustable platform with the beam axis.

83. A method for treating a patient with BNCT using a neutron collimator assembly (NCA) comprising:

a beam axis defining a path of a neutron beam;

a plurality of neutron beam collimators each having an aperture of a different size;

an adjustable platform for positioning the patient relative to the beam axis to receive the neutron beam;

a mounting assembly attached to the adjustable platform and configured to releasably secure any of the neutron beam collimators to the adjustable platform;

one or more electro-mechanical actuators mechanically coupled to the adjustable platform; and an electronic controller communicatively coupled with the one or more electro-mechanical actuators, the electronic controller programmed to generate control signals that cause the one or more electro-mechanical actuators to move the adjustable platform relative to the beam axis to align a neutron beam collimator secured to the adjustable platform with the beam axis, the method comprising:

propagating the neutron beam along the beam axis; and generating, using the electronic controller, the control signals that cause the one or more electro-mechanical actuators to move the adjustable platform relative to the beam axis to align the neutron beam collimator secured to the adjustable platform with the beam axis.

* * * * *